US012563511B2

(12) United States Patent
Manevich et al.

(10) Patent No.: US 12,563,511 B2
(45) Date of Patent: Feb. 24, 2026

(54) PHYSICAL LAYER SYNCHRONIZATION

(71) Applicant: Mellanox Technologies, Ltd., Yokneam (IL)

(72) Inventors: Natan Manevich, Nesher (IL); Dotan David Levi, Kiryat Motzkin (IL); Wojciech Wasko, Pomeranian (PL); Ran Ravid, Tel Aviv (IL); Guy Lederman, Rishon LeZion (IL); Liron Mula, Hertzlia (IL); Eitan Zahavi, Zichron Yaakov (IL); Peter Paneah, Nesher (IL)

(73) Assignee: Mellanox Technologies, Ltd., Yokneam (IL)

( * ) Notice: Subject to any disclaimer, the term of this patent is extended or adjusted under 35 U.S.C. 154(b) by 266 days.

(21) Appl. No.: 18/143,509

(22) Filed: May 4, 2023

(65) Prior Publication Data

US 2024/0373378 A1 Nov. 7, 2024

(51) Int. Cl.
*H04W 56/00* (2009.01)

(52) U.S. Cl.
CPC ..... *H04W 56/0015* (2013.01); *H04W 56/009* (2013.01)

(58) Field of Classification Search
CPC ............. H04W 56/0015; H04W 56/009; H04J 3/0644; H04J 3/0664; H04J 3/0667; H04J 3/0658
See application file for complete search history.

(56) References Cited

U.S. PATENT DOCUMENTS

| | | | |
|---|---|---|---|
| 8,675,686 | B2 | 3/2014 | Aweya et al. |
| 9,256,247 | B2 | 2/2016 | Banerjea et al. |
| 10,505,651 | B1 * | 12/2019 | Garrett .................. H04J 3/0682 |
| 11,283,481 | B2 | 3/2022 | Iwai |
| 11,469,843 | B2 | 10/2022 | Li et al. |
| 11,916,661 | B2 * | 2/2024 | Gareau ................. H04J 3/0667 |
| 2010/0061491 | A1 * | 3/2010 | Choi ..................... H04L 1/0071 |
| | | | 375/341 |

(Continued)

FOREIGN PATENT DOCUMENTS

| | | | | |
|---|---|---|---|---|
| CN | 104115432 A | * | 10/2014 | ............... G06F 1/04 |
| CN | 106850116 A | | 6/2017 | |

(Continued)

OTHER PUBLICATIONS

JP_WO2020021597_A1—English Translation of original Document (Year: 2020).*

(Continued)

*Primary Examiner* — Kevin T Bates
*Assistant Examiner* — Poonam Sharma
(74) *Attorney, Agent, or Firm* — Lowenstein Sandler LLP

(57) ABSTRACT

A system including a device, coupled to a link and including a transmitter, generates a control block for synchronization via a physical layer of the link, the control block including a header portion of bits corresponding to a header indicating the message is a control block and a data portion of bits including synchronization information for synchronizing via the physical layer. The device interleaves the control block between two of a plurality of data blocks of a data packet, and transmits, via the link, the data packet and the control block.

38 Claims, 24 Drawing Sheets

(56)     References Cited

U.S. PATENT DOCUMENTS

| | | | |
|---|---|---|---|
| 2011/0286560 A1* | 11/2011 | Pignatelli ............... | H04J 3/0655 |
| | | | 375/356 |
| 2012/0263220 A1 | 10/2012 | Li et al. | |
| 2013/0208735 A1* | 8/2013 | Mizrahi ................ | H04J 3/0664 |
| | | | 370/503 |
| 2016/0226624 A1 | 8/2016 | Shoor et al. | |
| 2019/0190635 A1 | 6/2019 | Goel et al. | |
| 2020/0412471 A1 | 12/2020 | Gareau et al. | |
| 2021/0392065 A1 | 12/2021 | Sela et al. | |
| 2022/0045777 A1* | 2/2022 | Amicangioli ......... | H04J 3/0667 |
| 2023/0155709 A1* | 5/2023 | Speicher .................. | H04J 3/12 |
| | | | 370/503 |
| 2024/0163000 A1 | 5/2024 | Agarwal et al. | |

FOREIGN PATENT DOCUMENTS

| | | | | |
|---|---|---|---|---|
| CN | 118523861 A | 8/2024 | | |
| EP | 4447567 A1 * | 10/2024 | ............... | H04L 7/02 |
| JP | WO2020021597 A1 * | 7/2020 | ........... | H04L 7/0008 |
| TW | 1863171 B * | 11/2024 | ........... | H04J 3/0667 |
| WO | 2020021597 A1 | 1/2020 | | |

OTHER PUBLICATIONS

Extended European Search Report for European Application No. 24174220.4, mailed Sep. 26, 2024, 10 Pages.

Shrivastav V., et al., "Globally Synchronized Time via Datacenter Networks," IEEE/ACM Transactions on Networking, 2019, vol. 27 (4), 16 Pages.

* cited by examiner

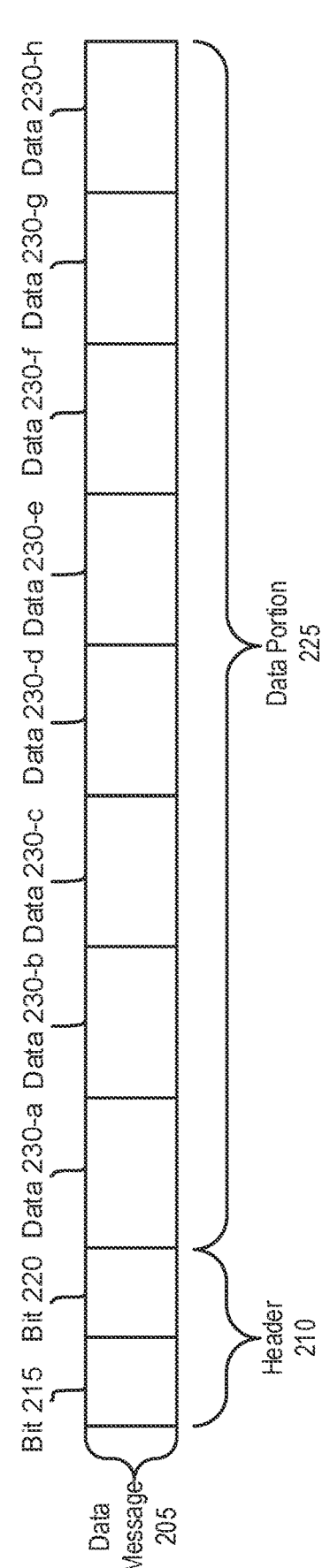
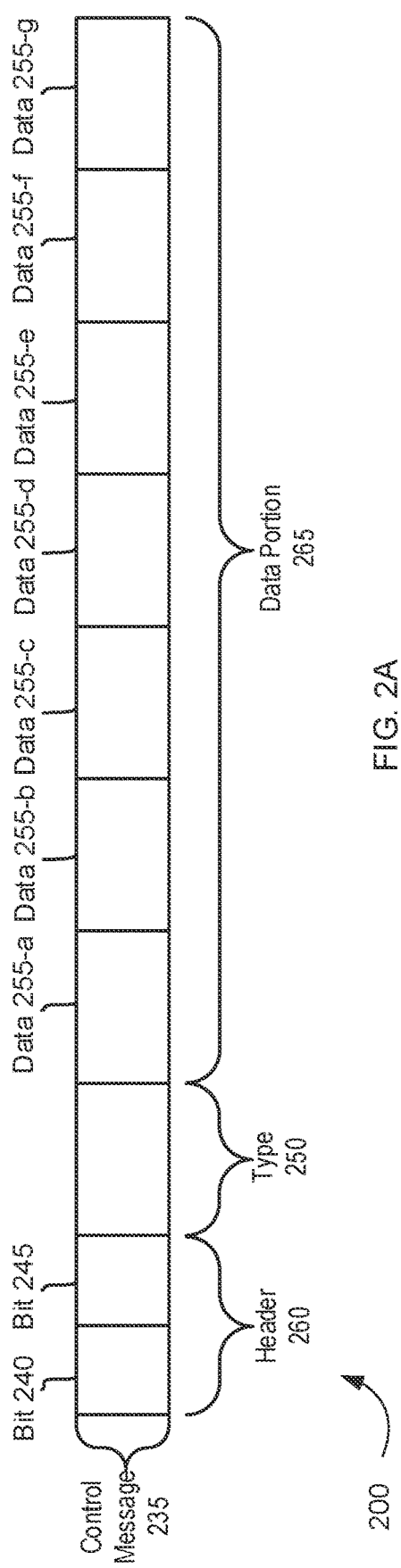
FIG. 2A

```
┌──────────────────┐                    ┌──────────────────┐
│    Device 110    │                    │    Device 112    │
└──────────────────┘                    └──────────────────┘
```

305

┌──────────────────┐
│  Generate First  │
│     Control      │
│   Message for    │
│       RTT        │
│   Measurement    │
└──────────────────┘

310

First Control Message →

315

┌──────────────────┐
│     Generate     │
│      Second      │
│     Control      │
│     Message      │
└──────────────────┘

320

← Second Control Message

325

┌──────────────────┐
│    Determine     │
│       RTT        │
│   Measurement    │
└──────────────────┘

300

FIG. 3

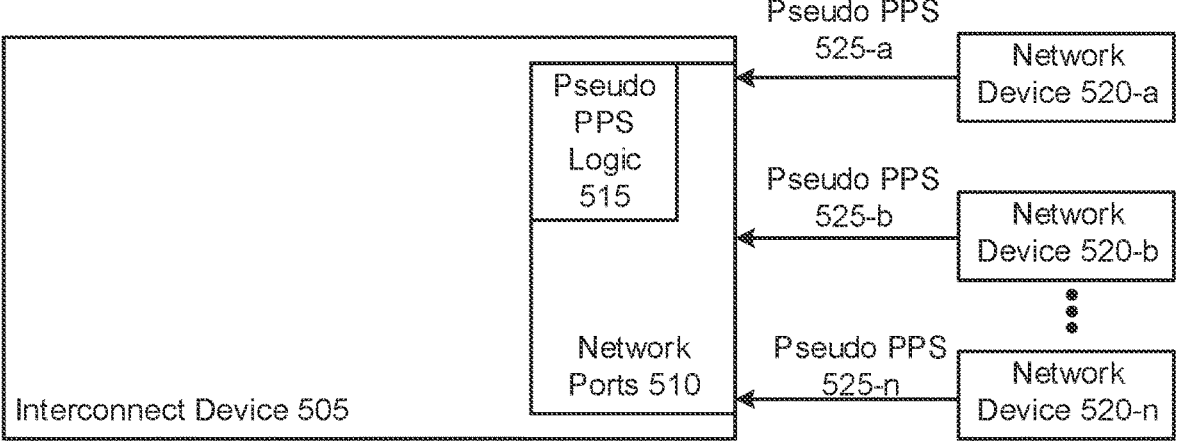
FIG. 5

700

1000

First Device
Time 1105

Second Device
Time 1110

Time
1115

Synchronization
Message 1125

Time
1120

Delay Request
1135

Time
1125

Time
1130

Time
1140

Delay Response
1145

Time
1150

1100

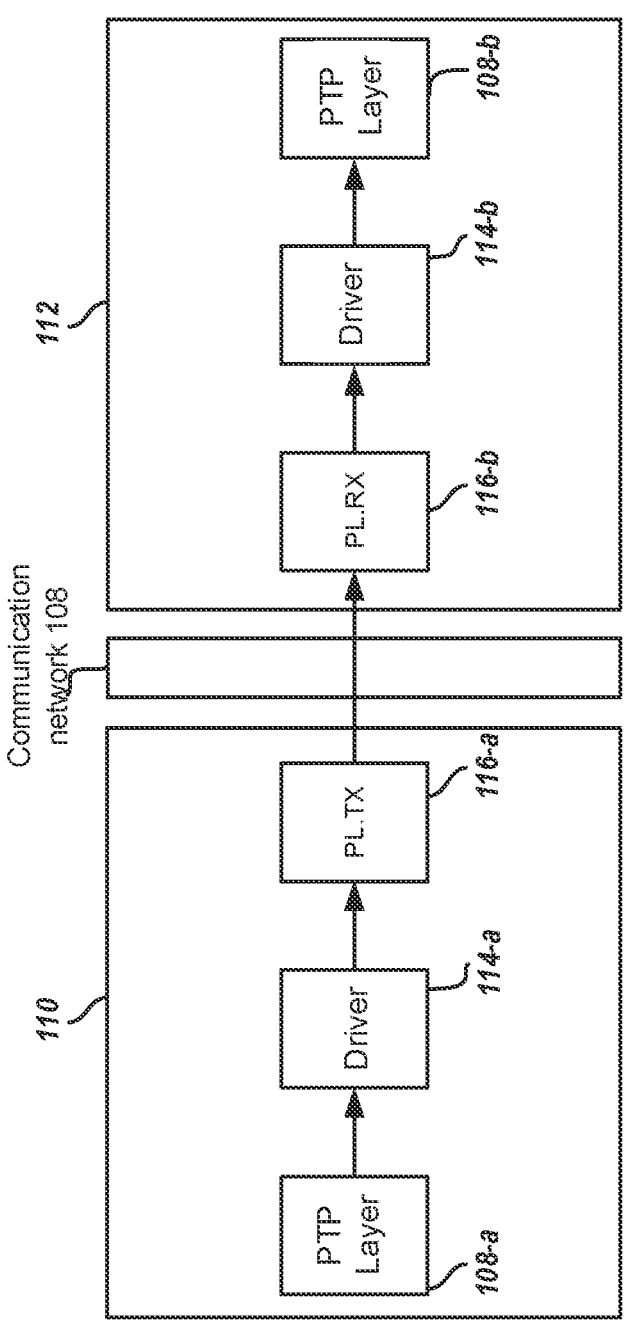
FIG. 12
PL – Physical Layer
TX – Transmitter
RX – Receiver

*1300*

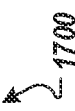
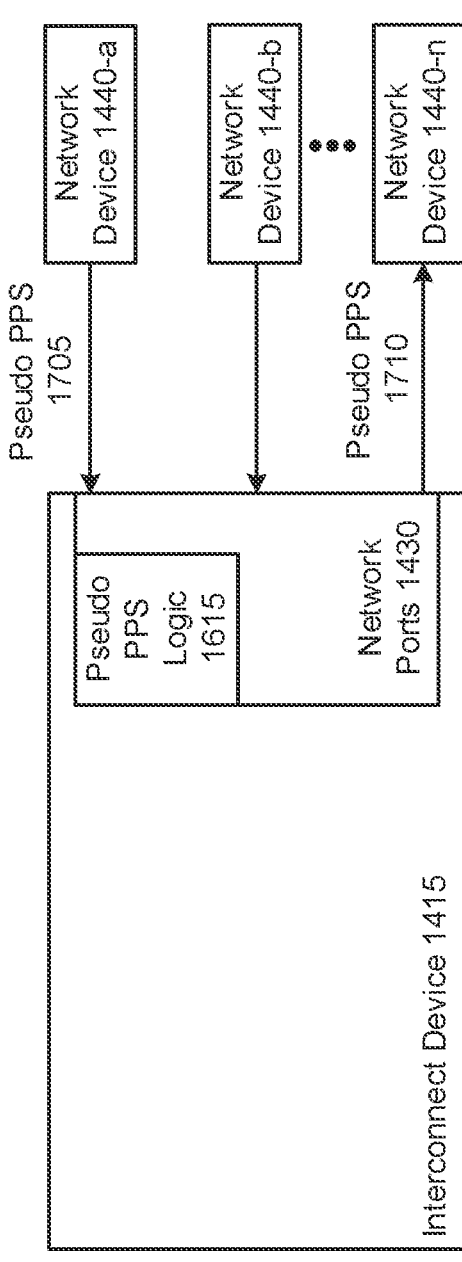
FIG. 17

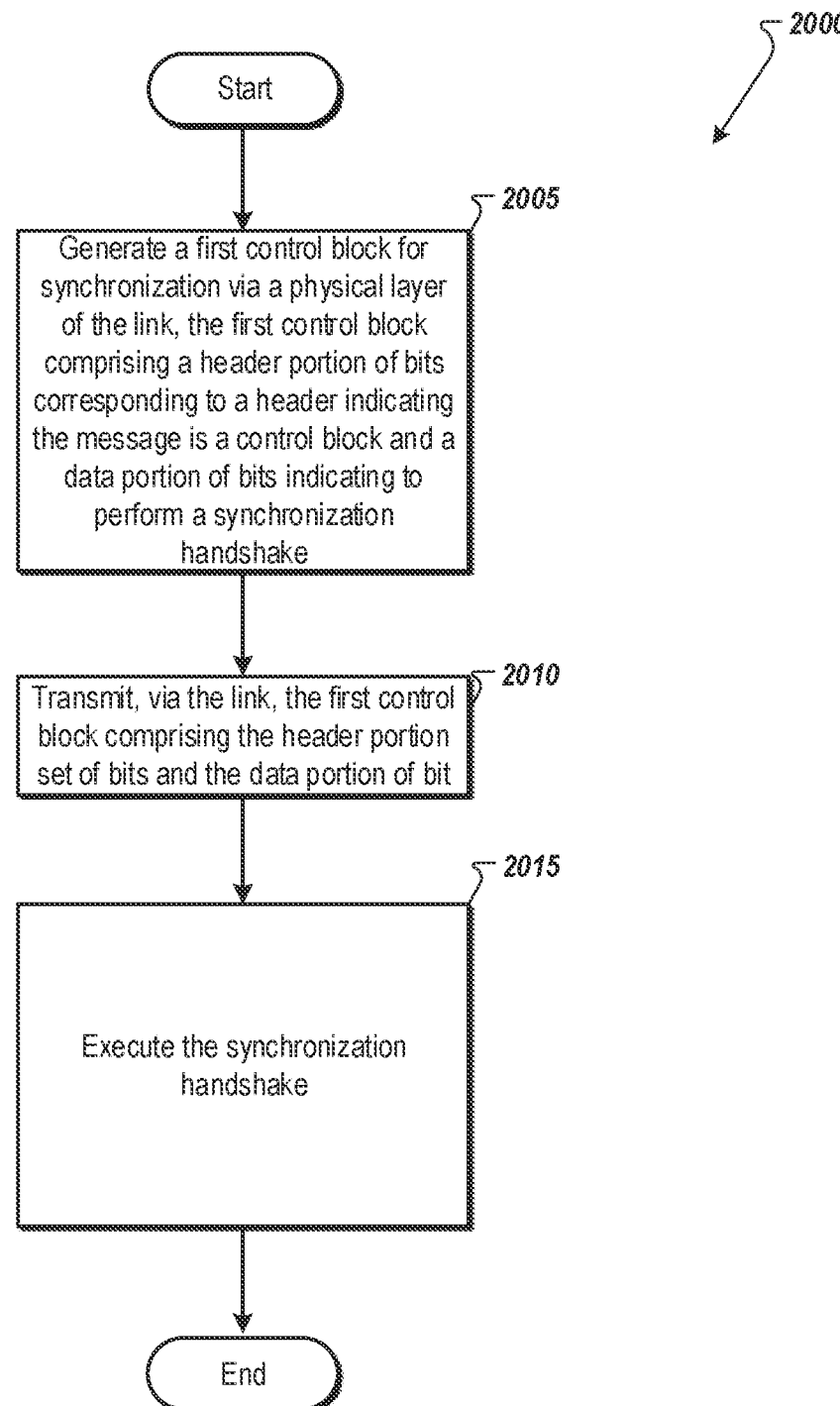

2000

Start

2005

Generate a first control block for synchronization via a physical layer of the link, the first control block comprising a header portion of bits corresponding to a header indicating the message is a control block and a data portion of bits indicating to perform a synchronization handshake

2010

Transmit, via the link, the first control block comprising the header portion set of bits and the data portion of bit

2015

Execute the synchronization handshake

End

FIG. 20

PHYSICAL LAYER SYNCHRONIZATION

TECHNICAL FIELD

At least one embodiment pertains to processing resources used to perform and facilitate high-speed communications. At least one embodiment pertains to technology for physical layer synchronization. For example, at least one embodiment pertains to synchronization via the physical layer by transmitting control blocks.

BACKGROUND

Communication systems transmit signals from a first device to a second device via a physical layer—e.g., a communication channel or medium (e.g., cables, printed circuit boards, links, wirelessly, etc.). Communicating from a transmitter of the first device to a receiver of the second device results in the need for the receiver to be synchronous with the transmitter as data may otherwise be corrupted—e.g., the transmitter and receiver are time-synchronous (e.g., a clock at both devices is synchronized or occur at a same time) or the transmitter and the receiver are frequency-synchronous (e.g., a clock at both devices ticks at a same frequency). Some communication systems may attempt synchronization between devices using a precision time protocol (PTP) or other protocol that transmits messages between an application layer or transport layer (e.g., a layer that specifies communication protocols and interface methods used by a system in a communications network) of the devices. The messages between the application layer can be shared tens to hundreds of times per second. However, drift can occur when the clocks between the devices are not synchronized. Some systems can require synchronization as accurately as a few nanoseconds. But the drift can be larger than a few nanoseconds. Accordingly, accurate synchronization of a few nanoseconds can be difficult.

BRIEF DESCRIPTION OF DRAWINGS

Various embodiments in accordance with the present disclosure will be described with reference to the drawings, in which:

FIGS. 2A and 2B illustrate examples of messages communicated in a communication system, in accordance with at least some embodiments;

FIG. 3 illustrates an example diagram for a round trip time (RTT) measurement, in accordance with at least some embodiments;

FIG. 5 illustrates an example communication system, in accordance with at least some embodiments;

FIG. 12 illustrates an example communication system, in accordance with at least some embodiments;

FIG. 17 is an example communication system for time synchronization, in accordance with at least some embodiments;

FIG. 20 illustrates an example method for synchronization via a physical layer, in accordance with at least some embodiments;

DETAILED DESCRIPTION

Figure 1:
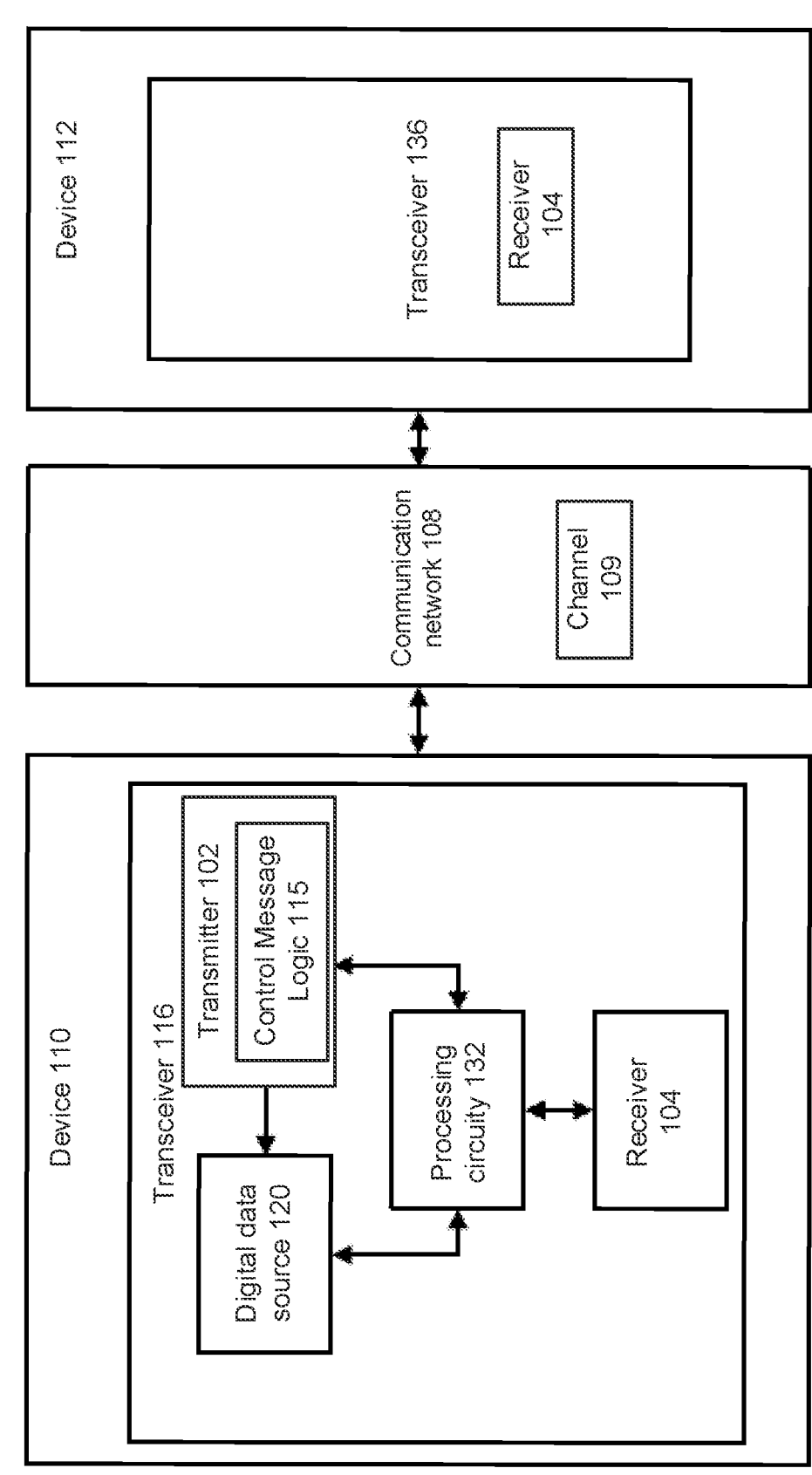
FIG. 1 is an example communication system, in accordance with at least some embodiments.

Communication systems transmit signals from a first device to a second device via a physical layer—e.g., a communication channel or medium (e.g., cables, printed circuit boards, links, wirelessly, etc.). The first device and second device can be time-synchronous if a clock at each device has a same time (e.g., a same time of day), or the first and second device can be frequency-synchronous if a clock at each device ticks at a same frequency. Both time and frequency synchronization can be used in network applications, including using a synchronized clock value for measuring latency between the first device and the second device. Time and frequency synchronization can also enable 5G and 6G networks and improve data center performance—e.g., with data transfer. Communicating from a transmitter of the first device to a receiver of the second device results in the need for the receiver to be synchronous with the transmitter as data may otherwise be corrupted. Additionally, if the first device and second device are not synchronized, the latency measurements can be inaccurate.

Some solutions attempt to synchronize the first device and the second device using a precision time protocol (PTP) or other protocols that transmit messages between an application layer or transport layer (e.g., a layer that specifies communication protocols and interface methods used by a system in a communications network) of the devices. For example, the PTP can synchronize a first device PTP hardware clock (PHC) to an accurate second clock at a second device and improve timestamping accuracy of transmitted and received packets (e.g., segments of data that are transmitted and received). However, accurate timestamping of packets using these protocols can reduce performance. For example, the first device can wait until a port (e.g., a connection to a second device) is empty (e.g., no data associated with a host system is transferred) before the PTP packet is transmitted. This can allow the PTP packet to be more accurate and experience less disruption, but waiting until the port is clear to transmit the PTP packet can reduce performance. Additionally, the protocols can introduce network bandwidth and computation overhead. For example, each packet of the protocol can include tens of bytes, and other synchronization information (e.g., time of day (TOD) nanosecond format) can include 64 bits of data. Each packet of the protocol also travels between the application layer or software layer and is analyzed by a PTP application (e.g., controller or daemon) to process the synchronization operation—e.g., the PTP application can process the protocol packets to make time or frequency adjustments. Going through the software layer can introduce latencies or disruptions to the packets and can limit a number of synchronization cycles at a given time—e.g., the protocol packet may wait to be sent until a port is available or sent in alignment with a start of a data packet transferred. Processing the protocol packets in the software layer can result in central processing unit (CPU) overhead and consume resources.

Further, the protocol packets can be based on a particular network—e.g., the PTP can be based on an Ethernet network and be unavailable for other networks. Accordingly, translation layers or translation components may be utilized for other networks (e.g., Ethernet to InfiniBand translation layers for an InfiniBand network), causing additional complexities and latencies in the system. Additionally, as the clocks between the first device and the second device are not synchronized, drift can occur while transmitting protocol packets. However, some systems can require synchronization as accurate as a few nanoseconds, while the drift can be larger than a few nanoseconds. Accordingly, accurate synchronization of a few nanoseconds can be difficult utilizing the protocol packets.

Advantageously, aspects of the present disclosure can address the deficiencies above and other challenges by providing a system and a method for performing physical layer synchronization (e.g., synchronization via the physical layer). For example, the system can utilize physical layer line encoding mechanisms (e.g., a pattern of voltage or current used to represent data of a certain size) to transmit time and clock synchronization information between a first device and a second device. The physical layer can be configured to transmit and receive data across a link via input/output (I/O) buffers, parallel-to-serial and serial-to-parallel converters, impedance matching circuitry, logic circuitry, etc. The system can transmit a control block (e.g., a control vector, control message, or a control line encoding) that has a header portion indicating the message is a control block, a second portion indicating a type of control block (e.g., a type of synchronization operation to perform) and one or more additional portions that include the synchronization information associated with the indicated synchronization operation. By using the physical layer to transmit the control blocks, the system can reduce latencies and overhead—e.g., the control blocks can be transmitted without having to travel up to the software layer. Additionally, the control block can be interleaved with data packets transmitted between the first device and the second device, enabling the system to transmit the synchronization information at any time without having to wait for available ports. The control blocks can enable the first device and the second device to perform any number of synchronization operations.

For example, the control block can be used to determine a round trip time (RTT) between the first device and the second device—e.g., how much time it takes for data to be transmitted over a link or channel coupling the first device and the second device. The first device can transmit an initial control block that indicates the message is a control block for an RTT measurement. Accordingly, the first device and the second device can communicate back and forth to determine the RTT measurement as described with reference to FIG. 2. In other embodiments, the control block can be used to transmit pseudo pulse per second (pseudo-PPS) signals to synchronize a clock of either the first device or the second device. The system can also transmit the pseudo-PPS signal to the application layer or software layer for timestamping—e.g., the pseudo-PPS signal can be time-stamped and treated as a regular PPS signal.

In some embodiments, the control block can be bidirectional—e.g., either the first device or the second device can transmit the control block. Accordingly, a first device (e.g., a network switch) that provides synchronization timing to one or more additional devices can receive pseudo-PPS signals from each device to monitor the synchronization of each device. In some embodiments, the first device can receive the pseudo-PPS signal from each device and determine its internal clock is not synchronized—e.g., each of the one or more additional devices can transmit pseudo-PPS signals that each has a same delay or offset, indicating the first device is no longer synchronized. In some embodiments, the first device can receive the pseudo-PPS from the one or more devices and synchronize its internal clock based on each of the received pseudo-PPS—e.g., determine an average offset or delay from each device and use the information for synchronization. For example, the first device can determine it is not synchronized based on receiving the pseudo-PPS signal from each device and then use the information to temporarily synchronize its internal clock to the incoming pseudo-PPS signals until the first device is resynchronized.

In some embodiments, the system can utilize the control blocks to perform synchronization handshakes as described with reference to FIG. 11. In some embodiments, the system can convert PTP messages from an application layer into the control block for the physical layer—e.g., the system can reduce latencies and improve timestamping accuracy by translating PTP messages into the physical layer synchronization control blocks as described herein.

In some embodiments, the system can use the control blocks to compare a remote device clock with a global navigation satellite system (GNSS) or a global positioning system (GPS), as described with reference to FIG. 14. In some embodiments, the system can use control blocks to synchronize the remote device to the GNSS or GPS signal as described with reference to FIG. 15. Additionally, a system can use the control blocks to synchronize a first device with a second device at a first port, where the first device then synchronizes one or more additional devices coupled to remaining ports of the first device. Similarly, the system can use the control blocks to synchronize a first remote device coupled to a switch to a second device coupled to the switch.

By utilizing the control blocks via the physical layer of a device, the system can improve time stamping accuracy, reduce latencies, and improve the overall performance. Additionally, the physical layer messaging can be transmitted for any network without additional components—e.g., the physical layer messaging can be communicated in an Ethernet system, Infiniband system, universal flash storage (UFS) system, universal serial bus (USB) system, NVLink system, a display port system, a high-definition multimedia interface, etc.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to various embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100.

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, or wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 102, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 102 includes suitable software and/or hardware for receiving digital data from the digital data source 120 and outputting data signals according to the digital data for transmission over the communication network 108 to a receiver 104 of device 112. Additional details of the structure of the transmitter 102 are discussed in more detail below with reference to the figures. In some embodiments, the transmitter 102 can include control block logic 115. In such embodiments, the control block logic 115 can be configured to transmit control blocks via a physical layer of device 110 as described with reference to FIG. 2-23. For example, the control block logic 115 can transmit control blocks that have a first portion indicating the message is a control block and a second portion indicating a type of control block (e.g., a type of synchronization operation to perform). The control block logic 115 can also generate control blocks that include time and frequency synchronization information, time of day (TOD) information, pseudo-PPS signal information, etc. In at least one embodiment, the control block logic 115 can generate and transmit control blocks having a format as described with reference to FIG. 2.

The receiver 104 of devices 110 and 112 may include suitable hardware and/or software for receiving signals, such as data signals from the communication network 108. For example, the receiver 104 may include components for processing received signals to extract the data for storing in a memory, as described in detail below with respect to FIG. 2-FIG. 4. The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 120 may include other processing devices, storage devices, and/or communication interfaces generally associated with computing tasks, such as sending and receiving data.

FIG. 2A illustrates data blocks 205 and control blocks 235 for synchronization via the physical layer according to at least one example embodiment. In some embodiments, data blocks 205 and control blocks 235 can be transmitted from a transmitter 102 to a receiver 104 as described with reference to FIG. 1. In at least one embodiment, the control block 235 can be generated and transmitted by control block logic 115 as described with reference to FIG. 1.

Data message 205 (e.g., data vector or data encoded line) is configured to transmit data—e.g., data associated with a host system or user data. For example, system 100 can utilize line encoding to transform a chunk of data in a data stream to a larger "line code," enabling enough state changes in the chunk of data to allow for clock recovery and alignment of the data block 205. In some embodiments, the data block 205 can be transmitted in a line encoding structure to enable the data block 205 to be recovered at a receiver 104 of a second device (e.g., device 112 as described with reference to FIG. 1)—e.g., 64-bit data is converted into a 66-bit line code transmitted from the transmitter 102 to the receiver 104, where the receiver 104 can recover the original 64-bit data. In at least one embodiment, the data block 205 can include a header 210 and a data portion 225. In some embodiments, the header 210 can include bit 215 and bit 220. In at least one embodiment, the header 210 is configured to indicate whether the message is a data block 205 or a control block 235. For example, the header 210 can include a bit 215 having a value zero ('0') and a bit 220 having a value one ('1') when the message is a data block 205. In at least some embodiments, the header 210 can comprise two (2) bits (e.g., bits 215 and 220), and the data portion 225 can comprise 64 bits. For example, each data 230 can comprise eight (8) bits of data when the data block 205 is an example of a 64b/66b line encoding structure. In other embodiments, the data block 205 can have a different structure—e.g., a 128b/130b line encoding structure where the data block 205 includes additional portions of data 230. In one embodiment, the data block 205 can utilize an 8b/10b line encoding structure. In such embodiments, every eight (8) bits are encoded to a specific ten (10) bits. In one embodiment, there are ten (10) bit combinations that do not originate from an eight (8) bit combination—e.g., there are more ten (10) bit combinations than eight (8) bit combinations. The ten (10) bit combinations that do not originate from an eight (8) bit combination can be used for control blocks 235. In at least one embodiment, some of the free (10) bit combinations are utilized as control blocks 235 for a particular communication protocol. However, there are free ten (10) bit combinations that are reserved (e.g., not assigned to a control block). In this disclosure, some of the free ten (10) bit combinations that are reserved are used to pass control blocks 235 relating to synchronization or timing information. For example, one of the reserved ten (10) bit combinations can be used to indicated a control block 235 is a pseudo pulse per second (pseudo PPS) signal as described with reference to FIG. 4.

Control block 235 (e.g., control vector or control encoded line) is configured to transmit control information. In some embodiments, the control block 235 can be transmitted in a line encoding structure to enable the control block 235 to be recovered at a receiver 104 of a second device (e.g., device 112 as described with reference to FIG. 1)—e.g., 64-bit data is converted into a 66-bit line code transmitted from the transmitter 102 to the receiver 104, where the receiver 104 can recover the original 64-bit data. In some embodiments, the control block 235 is an example of a 64b/66b line encoding structure. In other embodiments, the control block 235 is an example of a 128b/130b line encoding structure. In at least one embodiment, the control block 235 can include a header 260, a type 250, and a data portion 265. In some embodiments, the header 260 can include bit 240 and bit 245. In at least one embodiment, the header 260 is configured to indicate whether the message is a data block 205 or a control block 235. For example, the header 260 can include a bit 240 having a value one ('1') and a bit 245 having a value one ('0') when the message is a control block 235. In at least some embodiments, the header 260 can comprise two (2) bits (e.g., bits 240 and 245), the type 250 can comprise eight (8) bits, and the data portion 265 can comprise 56 bits. For example, each portion of data 255 can comprise eight (8) bits of data when the control block 235 is an example of a 64b/66b line encoding structure.

In at least one embodiment, the type 250 is configured to indicate a type of the control block 245—e.g., indicate an operation or type of control information transmitted. In at least one embodiment, a number of bits in the type 250 can indicate a possible number of different types the control block 235 can include—e.g., an eight (8) bit type 250 could indicate 256 unique types. In most protocols or systems (e.g., Ethernet, InfiniBand, NVLink, a peripheral component interconnect express (PCIe) system, universal serial bus (USB), universal flash storage (UFS), etc.) not all types are defined, and there are reserved and spare types 250. Accordingly, aspects of the present disclosure utilize spare and reserved spare types 250 to define additional control types 250 for synchronization via the physical layer—e.g., to enable physical layer timing messaging or physical timing signaling. In such embodiments, the control block 235 can be utilized to transmit time and clock information. In at least one embodiment, the type 250 can indicate a type of synchronization operation or information as described with reference to FIGS. 3-17 (e.g., indicate a pseudo pulse per second (PPS) signal, indicate to perform a round trip time (RTT), etc.). In at least one embodiment, the control block 235 can transmit additional information associated with the type 250 in the data portion 265—e.g., the data portion 265 can include an actual time or time of day (TOD) along with a PPS signal (e.g., indicate a round second has passed and the time is now 8:00:00). In other embodiments, the data portion 265 can include time, phase, or frequency of a clock of the device. In at least one embodiment, if the synchronization information or operation comprises more bits than in the data portion 265, the transmitter 102 can transmit multiple control blocks 235. In at least one embodiment, because the control blocks 235 is transmitted via the physical layer, it can be transmitted at any time. For example, the control block 235 can be interleaved with data blocks 205 without much additional latencies or complexities. For instance, the transmitter 102 can transmit a data packet comprising several data blocks 205. The transmitter 102 can pause transmitting the data blocks 205 to transmit a control block 235 and then resume the data packet transmission after transmitting the control block 235.

Figure 2B:
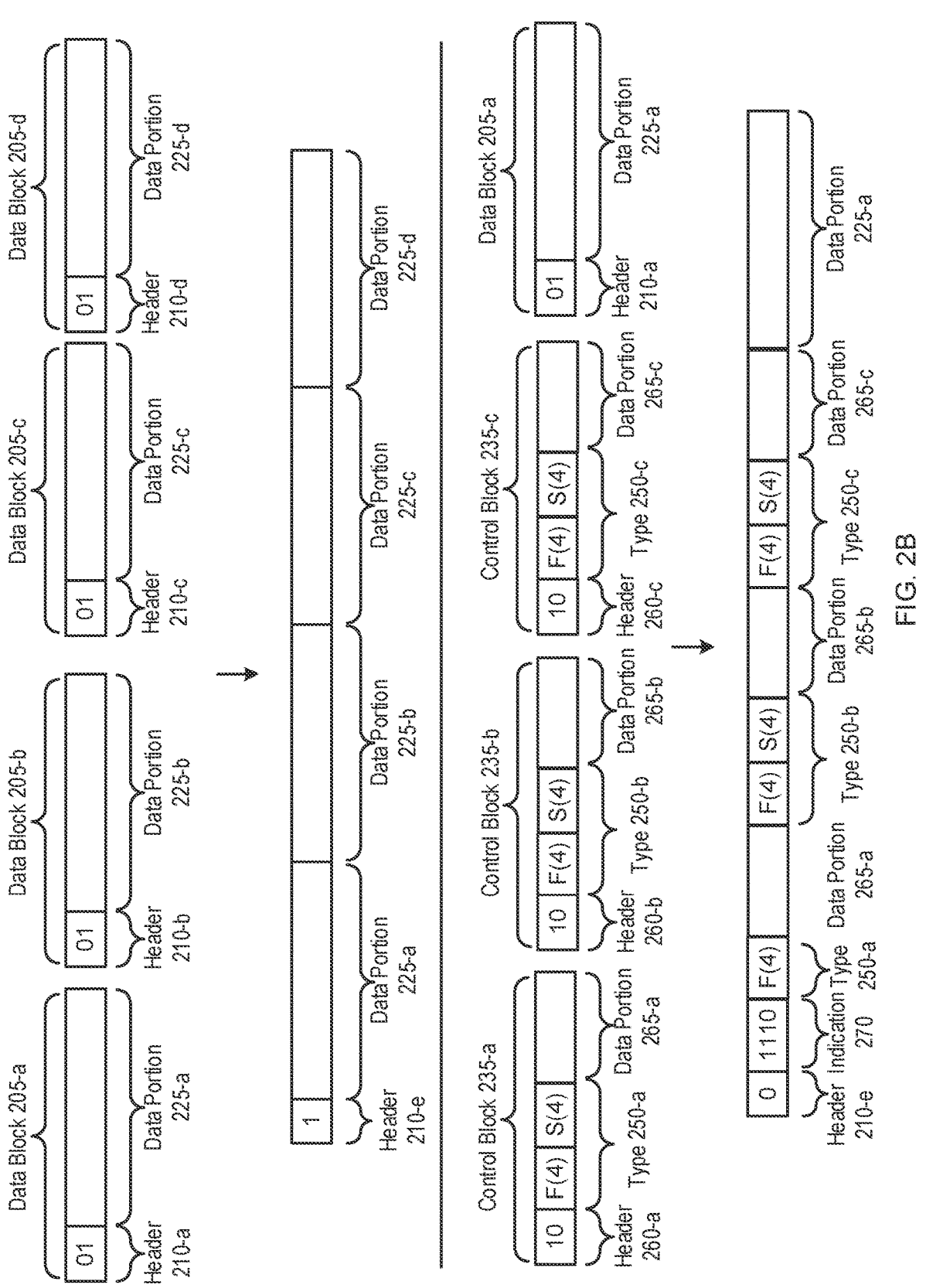

FIG. 2B illustrates data blocks 205 and control blocks 235 for synchronization via the physical layer according to at least one example embodiment. In some embodiments, data blocks 205 and control blocks 235 can be transmitted from a transmitter 102 to a receiver 104 as described with reference to FIG. 1. In at least one embodiment, the control block 235 can be generated and transmitted by control block logic 115 as described with reference to FIG. 1. In at least one embodiment, FIG. 2B can illustrate transmitting data blocks 205 and control blocks 235 utilizing a 256b/257b encoding scheme.

As described with reference to FIG. 2A, each data block 205 can include a header 210 and a data portion 225. In total, each data block 205 can include 66 bits—e.g., the header 210 of the data block 205 can include two (2) bits and the data portion 225 can include 64 bits. In at least one embodiment, a 256*b*/257*b* encoding scheme can be utilized to transmit data blocks 205 and control blocks 235. For example, the 256*b*/257*b* encoding scheme can combine four incoming 66 bit blocks into a 256 bit payload including a one bit header 210. In a first example, each of the four 66 bit blocks is a data block. In one embodiment, if the four incoming bit blocks are all data blocks, the header 210 from each data block 205 is dropped and a single bit (e.g., header 210-*e* having a value "1") can indicate the message the incoming 264 bit payload includes only data blocks. That is, the resultant 257*b*/256*b* line encoding can include a header 210-*e* having a value "1" indicating the payload is only data, and data portion 225-*a*, data portion 225-*b*, data portion 225-*c*, and data portion 225-*d*.

In at least one embodiment, the 256 bit payload includes at least one control block 235. For example, FIG. 2B illustrates an example of the 256 bit payload including three (3) control blocks. In such embodiments, each header of the data blocks 205 and control blocks 235 is still dropped (e.g., header 260-*a*, header 260-*b*, header 260-*c*, and header 210-*d* is dropped or deleted when converting to the 256 bit payload). As described above, a single bit (e.g., a bit having a value "0") is used as the header of the 257 bit block, indicating that at least one of the subsequent blocks is a control block 235. In addition to deleting the headers of each data block 205 and control block 235, a second portion of type 250 of the first control block in the 256 bit payload is also dropped (e.g., deleted). For example, as illustrated in FIG. 2B, the second portion (e.g., S(4)) of type 250-*a* of the first control block 235-*a* is deleted. In at least one embodiment, the first portion of the type 250-*a* indicates the type of control block 235. Accordingly, this portion is kept for each control block 235. In at least one embodiment, both the first portion and second portion of the type 250 includes four (4) bits.

In at least one embodiment, the space in the payload freed by dropping the second portion of the type 250 of the first control block 235 frees up four (4) bits in the 256 bit payload. That is, after dropping the header of each block, there are 256 remaining bits, and after dropping the second portion, there are 252 remaining bits. This enables the 256*b*/257*b* line encoding scheme to add an indication 270 including four (4) bits. In at least one embodiment, the indication 270 can indicate whether the following blocks in the payload are control blocks or data blocks. For example, a value "0" can indicate a block is a data block 205 and a value "1" can indicate the block is a control block 235. In the indication 270, the first bit can indicate if the first block is a data block 205 or control block 235, the second bit can indicate if the second block is a data block 205 or a control block 235, and an "$n^{th}$" bit can indicate if the "$n^{th}$" block is a data block 205 or control block 235. For example, a value "1110" as illustrated in FIG. 2B can indicate the first block is a control block 235, the second block is a control block 235, the third block is a control block 235, and the fourth block is a data block 205. Additional examples for illustrates purposes include the following values for the indicator 270; "0010" indicates the first, second, and fourth blocks are data blocks 205 and the third block is a control block 235, "0101" indicates the first and third blocks are data blocks 205 and the second and fourth blocks are control blocks 235, "0111" indicates the first block is a data block 205 and the remaining blocks are control blocks 235, etc. It should be noted the second portion of the type for any control block 235 after the first control block 235 remains unchanged—e.g., the second portion of type 250-*b* and type 250-*c* are kept. Accordingly, the 256*b*/257*b* line encoding scheme can utilize a one bit header, and then either include data portions 225 or include an indication 270, and then include the payload.

FIG. 3 illustrates an example diagram 300 for performing a round trip time (RTT) measurement via a physical layer according to at least one example embodiment. The methods of diagram 300 can be performed by processing logic comprising hardware, software, firmware, or any combination thereof. In at least one embodiment, the methods of diagram 300 are performed by device 110 and device 112 as described with reference to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 305, device 110 can generate a first control block to initiate a round trip time (RTT) measurement of a link or channel coupling the device 110 and device 112— e.g., the RTT can be an amount of time it takes for a signal to go from device 110 to device 112 and then back from device 112 to device 110. In some embodiments, the RTT measurement can indicate a delay or latency between the nodes. In at least one embodiment, a one-way delay (e.g., an amount of time for a signal to propagate from device 110 to device 112 or from device 112 to device 110) can be approximated by taking half of the RTT measurement. In at least one embodiment, the one-way delay can be calculated by using previous signal propagation times. In some embodiments, the RTT measurement can be utilized for synchronization or building timing solutions. For example, device 110 (e.g., a synchronization device, a network switch, or a primary time-synchronization device) can transmit a control block with timing information (e.g., that the control block is transmitted at a time "X") to device 112 (e.g., a network device or secondary device that follows the primary time-synchronization device clock). The device 112 can use the RTT measurement or one-way delay to adjust its clock— e.g., subtract the one-way delay to synchronize its clock to the time indicated by device 110.

In at least one embodiment, the device 110 can generate the first control block to include a first portion of bits that indicate the first message is a control block—e.g., the first control block can include a header '10' to indicate the first message is a control block. The device 110 can further generate the first control block to include a second portion of bits that indicate a type of the first control block—e.g., the device 110 can generate the first control block to include a type 250 that indicates the first control block is initiating an RTT measurement. In some embodiments, the device 110 can generate the control block to include a third portion of bits that include additional synchronization information. For example, the device 110 can generate the first control block to include one or more data portions 255 that indicate a time of day (TOD).

At operation 310, the device 110 can transmit the first control block to device 112 via a link. In at least one embodiment, the first control block is transmitted via a physical layer—e.g., via hardware that can comprise input/output (I/O) buffers, parallel-to-serial and serial-to-parallel converters, impedance matching circuitry, logic circuitry, etc. In at least one embodiment, device 112 can process the incoming first control block upon receipt. For example, the device 112 can receive data and determine that the data is associated with a control block responsive to determining the header is '10.' Further, device 112 can determine a type associated with the first control block—e.g., the device 112 can recover the bits associated with the type and determine which synchronization operation to perform. For example, the device 112 can process the first control block and determine whether the message is associated with an RTT measurement.

At operation 315, the device 112 can generate a second control block. In at least one embodiment, the device 112 can generate the second control block to respond to the first control block and complete the RTT measurement. In at least one embodiment, the device 112 can generate the second control block to include the first portion of bits—e.g., the second control block can include a header '10' to indicate the second message is a control block. In at least one embodiment, the device 112 can generate the second control block to include a second portion of bits that indicates a type. In some embodiments, the second control block can include a same type as the first control block (e.g., that the control block is associated with an RTT measurement), or the second control block can include a different type (e.g., that the second control block is a response to an RTT measurement request). In at least one embodiment, the device 112 can generate the second control block to include a third portion of bits (e.g., data portions 255) that can indicate a time the first message was received, a time to process the first control block, and/or a time associated with transmitting the second control block.

At operation 320, the device 112 can transmit the second control block to device 110 via the link—e.g., via the physical layer. In at least one embodiment, device 110 can process the incoming second control block upon receipt. For example, the device 110 can receive data and determine that the data is associated with the second control block responsive to determining the header is '10.' Further, device 110 can determine a type associated with the second control block—e.g., the device 110 can recover the bits associated with the type and determine which synchronization operation to perform. For example, the device 110 can process the second control block and determine whether the message is associated with an RTT measurement response.

At operation 325, the device 110 can determine the RTT measurement. In at least one embodiment, the device 110 can determine a time the first control block was sent and a time the second control block was received. In at least one embodiment, the second control block can include the time the device 112 took to process the first control block. Accordingly, the device 110 can determine the RTT measurement by determining a difference between the time the first control block was transmitted and the second control block was received and subtracting the time to process the first control block at the device 112. In at least one embodiment, the device 110 can transmit additional control blocks to find an average RTT measurement or verify the RTT measurement by repeating operations 305-325.

Figure 4:
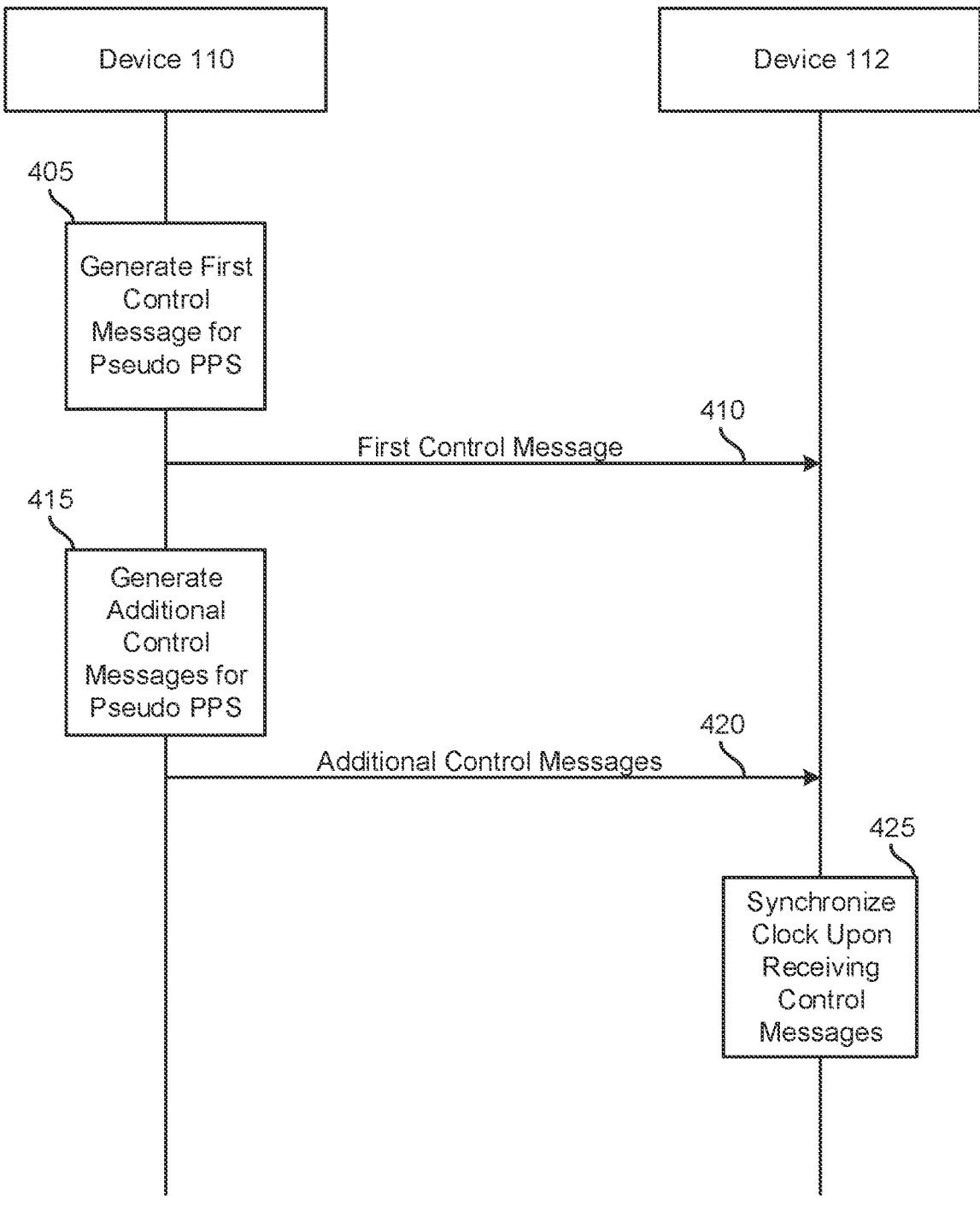
FIG. 4 illustrates an example diagram for a pseudo pulse per second (PPS) signal, in accordance with at least some embodiments.

FIG. 4 illustrates an example diagram 400 for transmitting pseudo pulse per second (PPS) signals via a physical layer according to at least one example embodiment. The methods of diagram 400 can be performed by processing logic comprising hardware, software, firmware, or any combination thereof. In at least one embodiment, the methods of diagram 400 are performed by device 110 and device 112 as described with reference to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 405, device 110 can generate a first control block to transmit a first pseudo-PPS signal to device 112. In some embodiments, the PPS signal is transmitted once every second—e.g., once every round second. In other embodiments, the PPS signal can be transmitted any number of times in a second—e.g., a "number" of times per second (e.g., NPPS) or transmitted at a certain frequency (e.g., 10 megahertz or at any frequency (NHz)). In some embodiments, a PPS signal is an analog signal from a GPS or GNSS receiver that can be used to synchronize a device. In other embodiments, the PPS signal is used to test how accurate a synchronization of a clock of a device is. For example, a testing device (e.g., an oscilloscope) can be coupled with the device 110 and a signal generator (e.g., signal generator) and compare pulse per second signals from each device to determine a synchronization accuracy. In this embodiment, the device 110 can generate a pseudo-PPS signal via the control block transmitted through the physical layer to device 112. For example, the device 110 can generate the control block each time a round second passes—e.g., the device 110 can have a pin outside the silicon that propagates the control blocks once every second or at a desired rate.

In at least one embodiment, the device 110 can generate the first control block to include a first portion of bits that indicate the first message is a control block—e.g., the first control block can include a header '10' to indicate the first message is a control block. The device 110 can further generate the first control block to include a second portion of bits that indicate a type of the first control block—e.g., the device 110 can generate the first control block to include a type 250 that indicates the first control block is a pseudo-PPS signal. In some embodiments, the device 110 can generate the control block to include a third portion of bits that include additional synchronization information. For example, the device 110 can generate the first control block to include any known inaccuracies with the pseudo-PPS signal—e.g., that the pseudo-PPS signal is transmitted a certain number of nanoseconds before an actual round second has passed. In other embodiments, the third portion of bits can indicate a time of day (TOD). In at least one embodiment, the TOD can be at a one (1) second granularity or less (e.g., at nanoseconds or even more accurately (e.g., picoseconds)). In some embodiments, the third portion of bits can include any time offsets—e.g., that the pseudo-PPS signal is transmitted after a certain number of microseconds or nanoseconds following or before a round second. In some embodiments, the third portion of bits can include RTT measurements or one-way delays. In at least one embodiment, the third portion of bits can include uncertain or unknown inaccuracies as well. For example, the transmitter can indicate a signal is transmitted within a range—e.g., plus or minus a certain number of microseconds or nanoseconds from a round second desired. This can occur when the device 110 has sampling challenges or is synchronized to a device with accuracy uncertainties—e.g., synchronized to a signal generator whose accuracy can depend on a quality of satellite reception.

At operation 410, the device 110 can transmit the first control block to device 112 via a link. In at least one embodiment, the first control block is transmitted via a physical layer. In at least one embodiment, device 112 can process the incoming first control block upon receipt. For example, the device 112 can receive data and determine that the data is associated with a control block responsive to determining the header is '10.' Further, device 112 can determine a type associated with the first control block—e.g., the device 112 can recover the bits associated with the type and determine which synchronization operation to perform. For example, the device 112 can process the first control block and determine the message is associated with a pseudo-PPS signal. Additionally, the device 112 can process the first control block and recover the time of day, a time offset, an RTT measurement, or any known or unknown inaccuracies information included in the first control block.

At operation 415, the device 110 can generate additional control blocks to transmit additional pseudo-PPS signals. For example, the device 110 can generate additional control blocks each second or at a desired rate—e.g., transmit the control blocks an "n" number of times per second or at a "n" frequency. In at least one embodiment, each additional control block can include the header '10' to indicate the message is a control block and a same type 250 to indicate the message is associated with a pseudo-PPS signal. In some embodiments, each additional control block can have a third portion of data bits that indicate one of a time of day, a time offset, an RTT measurement, or any known or unknown inaccuracies as described with reference to operation 405.

At operation 420, the device 110 can transmit the additional control block to device 112 via a link. In at least one embodiment, device 112 can process the incoming additional control blocks. For example, the device 112 can receive data and determine that the data is associated with a control block responsive to determining the header is '10.' Further, device 112 can determine a type associated with the additional control block—e.g., the device 112 can recover the bits associated with the type and determine which synchronization operation to perform. For example, the device 112 can process the additional control block and determine whether the messages are associated with pseudo-PPS signals. Additionally, the device 112 can process the additional control block and recover the time of day, a time offset, an RTT measurement, or any known or unknown inaccuracies information included in the first control block.

At operation 425, the device 112 can synchronize its clock upon receiving the first control block and the one or more additional control blocks associated with pseudo-PPS signals. For example, if the delay or time offset is constant amongst the pseudo-PPS signals, the device 112 can synchronize its clock based on the delay or time offset—e.g., if each message is transmitted twelve (12) nanoseconds before a round second, the device 112 can synchronize itself with a round second based on the known delay. In some embodiments, the device 112 can weigh certain pseudo-PPS signals more than others. For example, the device 112 can rely more on pseudo-PPS signals with known inaccuracies for synchronization rather than pseudo-PPS signals that include unknown inaccuracies—e.g., the device 112 can ignore messages with high levels of inaccuracy or uncertainty and instead rely on pseudo-PPS signals with smaller time inaccuracies and delays. In at least one embodiment, the device 112 can determine a quality of synchronization based on the received pseudo-PPS signals. For example, the device 112 can determine it is synchronized if the delay associated with each pseudo-PPS signal is the same—e.g., the device 112 determines the delay on the wire is the only delay in the system. In other embodiments, the device 112 can determine its clock is not synchronized if the delay continues to increase—e.g., the device 112 can determine there is clock skewness if each pseudo-PPS signal received as a greater delay.

In at least one embodiment, device 112 can be an oscilloscope that is used to measure the quality of synchronization of the device 110. In such embodiments, the oscilloscope can receive additional PPS signals from a GPS or signal generator and compare the signals to determine the accuracy of synchronization of the device 112. In some embodiments, the device 110 is a network switch or network adapter, and the device 112 is one of several network devices coupled to device. In such embodiments, the device 110 can transmit a pseudo-PPS signal to each network device to synchronize all of the network devices to the clock of device 110.

FIG. 5 illustrates an example communication system 500 according to at least one example embodiment. The system 500 includes a interconnect device 505 (e.g., a network switch, a network adapter, a network interface controller (NIC), a central processing unit (CPU), or any other device coupled with multiple other devices or having multiple ports) and network devices 520 (e.g., network devices 520-*a*, 520-*b* . . . 520-*n*). In at least one embodiment, the interconnect device 505 and network devices 520 can be examples of devices 110 or devices 112, as discussed with reference to FIG. 1. In at least one embodiment, the interconnect device 505 can include network ports 510. In one embodiment, the interconnect device 505 can include a pseudo-PPS logic 515.

In at least one embodiment, interconnect device 505 is configured to communicate with one or more network devices 520. For example, the interconnect device 505 can include network ports 510, where each network device 520 is coupled to a different port of the network ports 510. In some embodiments, the interconnect device 505 can be synchronized to a clock with a high level of accuracy—e.g., to a GNSS or GPS receiver. In at least one embodiment, the interconnect device 505 is configured to synchronize the network devices 520—e.g., the interconnect device 505 can be a primary time-synchronization device. In such embodiments, the pseudo-PPS logic 515 can generate pseudo-PPS signals and transmit one or more pseudo-PPS signals to each network device as described with reference to FIG. 4. In at least one embodiment, the interconnect device 505 can be configured to monitor a synchronization quality of each network device 520-*a*. In such embodiments, the interconnect device 505 can request each network device 520 to transmit pseudo-PPS signals a predetermined number of times. For example, the interconnect device 505 can transmit control blocks with a header '10' to indicate the message is a control block and a type 250 that indicates to the network devices to transmit pseudo-PPS signals.

In at least one embodiment, each network device 520 is configured to transmit, receive, and process data. In at least one embodiment, each network device 520 is configured to transmit a pseudo-PPS signal to the interconnect device 505 at a predetermined rate—e.g., once per second or more than once per second as indicated by a control block transmitted by the interconnect device. For example, network device 520-*a* can transmit a pseudo-PPS signal 525-*a*, network device 520-*b* can transmit a pseudo-PPS signal 525-*b*, and so forth. In at least one embodiment, each pseudo-PPS signal 525 transmitted from a network device 520 to the interconnect device 505 can include a header '10' to indicate the message is a control block and a type 250 that indicates the control block is a pseudo-PPS signal. In at least one embodiment, each pseudo-PPS signal 525 can further include a respective time of day, a time offset, an RTT measurement, or any known or unknown inaccuracies information from each network device 520—e.g., network device 520-*a* can transmit a pseudo-PPS signal 525-*a* that includes time of day, a time offset, an RTT measurement, or any known or unknown inaccuracies information of the network device 520.

In at least one embodiment, the pseudo-PPS logic 515 is configured to receive each pseudo-PPS signal 525 from each respective network device 520. In some embodiments, the pseudo-PPS logic 515 is configured to determine a synchronization quality of each network device 520. For example, the pseudo-PPS logic 515 can monitor a delay or time offset of each pseudo-PPS signal 525 received for a respective network device 520. If the pseudo-PPS logic 515 determines the time offset or delay is increasing, the pseudo-PPS logic 515 can determine the respective network device 520 is out of synchronization—e.g., if a delay associated with pseudo-PPS signal 525-*a* increases each time the network device 520-*a* transmits the signal or the offset of the pseudo-PPS signal 525-*a* is relatively high versus a local clock of the interconnect device 505, the pseudo-PPS logic 515 can determine network device 520-*a* is asynchronous. In at least one embodiment, the interconnect device 505 can initiate an operation to re-synchronize or otherwise fix the synchronization of the asynchronous device.

By utilizing the control blocks in the physical layer, the interconnect device 505 is able to monitor the quality of synchronization—e.g., the interconnect device 505 does not have to rely on each network device 520 to indicate if they are synchronous or asynchronous. In that, the control vector and pseudo-PPS signals are bi-directional, and the pseudo-PPS signal can not only be used for synchronizing a network device 520, but also to monitor the synchronization quality of the respective network device 520.

Figure 6:
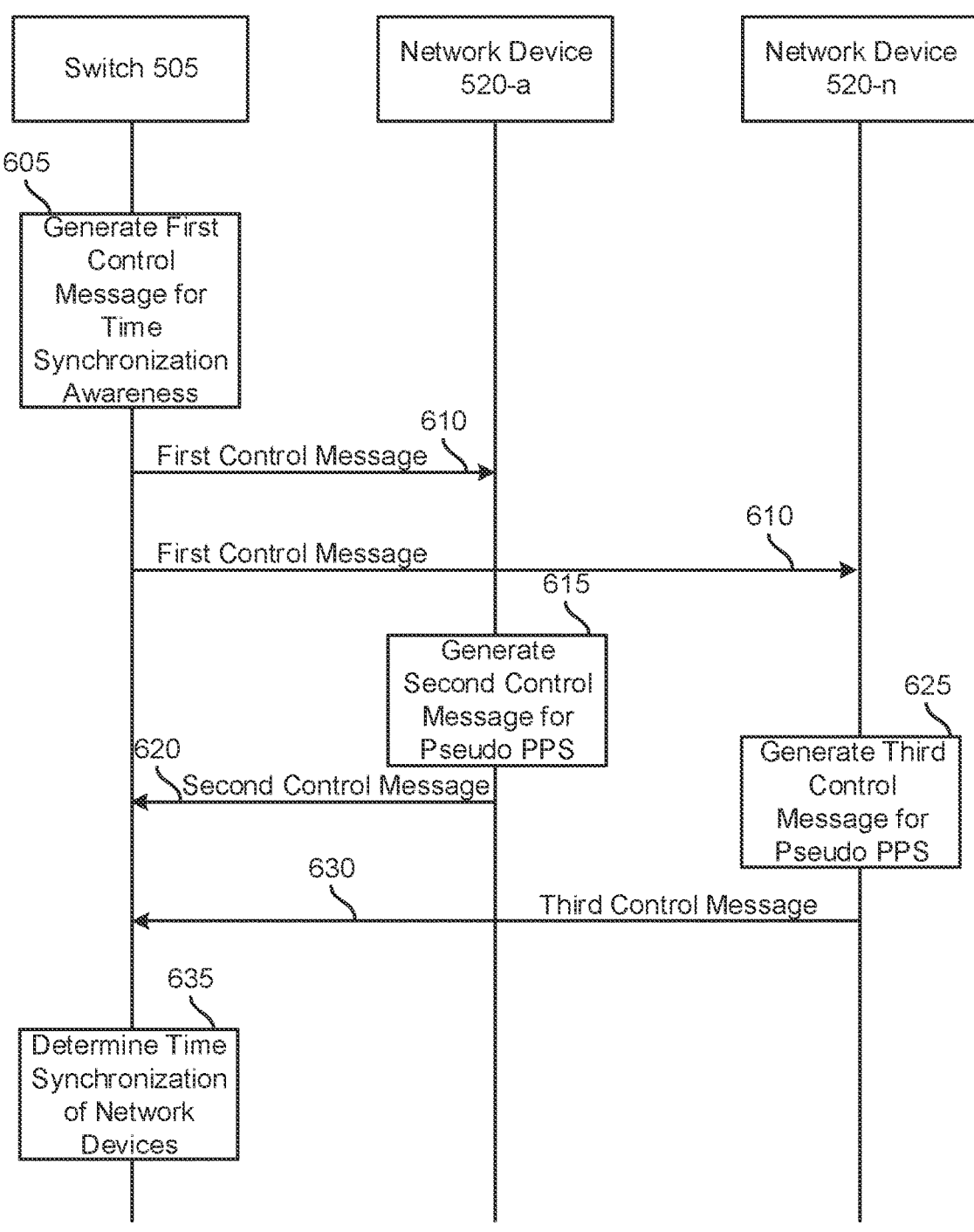
FIG. 6 is an example diagram for synchronization, in accordance with at least some embodiments.

FIG. 6 illustrates an example diagram 600 for synchronization awareness according to at least one example embodiment. The methods of diagram 600 can be performed by processing logic comprising hardware, software, firmware, or any combination thereof. In at least one embodiment, the methods of diagram 600 are performed by interconnect device 505 and network devices 520 as described with reference to FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 605, interconnect device 505 (e.g., a network switch, network adapter, or any other device coupled with multiple devices) can generate a first control block for time synchronization awareness. As described with reference to FIG. 5, interconnect device 505 can monitor synchronization of network devices 520. Accordingly, interconnect device 505 can generate the first control block to include a first portion of bits that indicate the first message is a control block—e.g., the first control block can include a header '10' to indicate the first message is a control block. The interconnect device 505 can further generate the first control block to include a second portion of bits that indicate a type of the first control block. For example, the interconnect device 505 can generate the first control block to include a type 250 that indicates the first control block is initiating a synchronization awareness operation and/or requesting pseudo-PPS signals from the receiver—e.g., request pseudo-PPS signal from one or more network devices 520. In some embodiments, the interconnect device 505 can generate the control block to include a third portion of bits that include additional synchronization information related to the synchronization awareness operation.

At operation 610, the interconnect device 505 can transmit the first control block to each network device 520 via link and physical layers—e.g., to network devices 520-*a* through 520-*n*. In at least one embodiment, each network device 520 can process the incoming first control block upon receipt. For example, the network devices 520 can receive data and determine that the data is associated with a control block responsive to determining the header is '10.' Further, network devices 520 can determine a type associated with the first control block—e.g., the network devices 520 can recover the bits associated with the type and determine which synchronization operation to perform. For example, the network devices 520 can process the first control block and determine the message is associated with a synchronization awareness operation and includes a request to transmit a pseudo-PPS signal to the interconnect device 505. Additionally, the network devices 520 can recover the third portion of bits associated with any additional synchronization information.

At operation 615, network device 520-*a* can generate a second control block corresponding to a pseudo-PPS signal. For example, network device 520-*a* can generate the second control block (e.g., pseudo-PPS signal 525-*a*) to include the header '10' to indicate the message is a control block and a type 250 to indicate the second control block is associated with a pseudo-PPS signal. In some embodiments, the network device 520-*a* can generate the second control block to include a third portion of data bits that indicate one of a time of day, a time offset, an RTT measurement, and/or any known or unknown inaccuracies respective to the network device 520-*a*.

At operation 620, the network device 520-*a* can transmit the second control block to the interconnect device 505. In at least one embodiment, interconnect device 505 can process the second control block. For example, the interconnect device 505 can receive data and determine that the data is associated with a control block responsive to determining the header is '10.' Further, interconnect device 505 can determine a type associated with the second control block—e.g., the interconnect device 505 can recover the bits associated with the type and determine which synchronization operation to perform. For example, the interconnect device 505 can process the second control block and determine the message is associated with a pseudo-PPS signal—e.g., pseudo-PPS signal 525-*a*. Additionally, the interconnect device 505 can process the second control block and recover the time of day, a time offset, an RTT measurement, and/or any known or unknown inaccuracies information included in the second control block. In at least one embodiment, the network device 520-*a* can repeat operations 615 and 625 to generate additional pseudo-PPS signals to transmit to the interconnect device 505.

At operation 625, network device 520-*n* can generate a third control block corresponding to a pseudo-PPS signal. For example, network device 520-*n* can generate the third control block (e.g., pseudo-PPS signal 525-*n*) to include the header '10' to indicate the third message is a control block and a type 250 to indicate the third control block is associated with a pseudo-PPS signal. In some embodiments, the network device 520-*n* can generate the third control block to include a third portion of data bits that indicate one of a time of day, a time offset, an RTT measurement, and/or any known or unknown inaccuracies respective to the network device 520-n. In at least one embodiment, operation 625 can be concurrent with operation 615.

At operation 630, the network device 520-n can transmit the third control block to the interconnect device 505. In at least one embodiment, interconnect device 505 can process the third control block. For example, the interconnect device 505 can receive data and determine that the data is associated with a control block responsive to determining the header is '10.' Further, interconnect device 505 can determine a type associated with the third control block—e.g., the interconnect device 505 can recover the bits associated with the type and determine which synchronization operation to perform or which synchronization information is included. For example, the interconnect device 505 can process the third control block and determine the message is associated with a pseudo-PPS signal—e.g., pseudo-PPS signal 525-n. Additionally, the interconnect device 505 can process the third control block and recover the time of day, a time offset, an RTT measurement, or any known or unknown inaccuracies information included in the third control block. In at least one embodiment, operation 630 can be concurrent with operation 620. In at least one embodiment, the network device 520-n can repeat operations 625 and 630 to generate additional pseudo-PPS signals to transmit to the interconnect device 505.

At operation 635, switch 505 can determine a time synchronization of each network device 520. For example, the pseudo-PPS logic 515 can receive each pseudo-PPS signal from each network device and determine if a respective network device 520 is synchronized. For example, the pseudo-PPS logic 515 can monitor a delay or time offset of each pseudo-PPS signal 525 received for a respective network device 520. If the pseudo-PPS logic 515 determines the time offset or delay is increasing, the pseudo-PPS logic 515 can determine the respective network device 520 is out of synchronization—e.g., if a delay associated with pseudo-PPS signal 525-a increases each time the network device 520-a transmits the signal or the offset of the pseudo-PPS signal 525-a is relatively high versus a local clock of the interconnect device 505, the pseudo-PPS logic 515 can determine network device 520-a is asynchronous. In at least one embodiment, the interconnect device 505 can initiate an operation to resynchronize or otherwise fix the synchronization of a network device 520 that is determined to be asynchronous. In at least one embodiment, if the interconnect device 505 determines all network devices 520 are synchronous, the interconnect device 505 can receive additional pseudo-PPS signals from each respective device to continue to monitor the synchronization quality of each network device 520.

Figure 7:
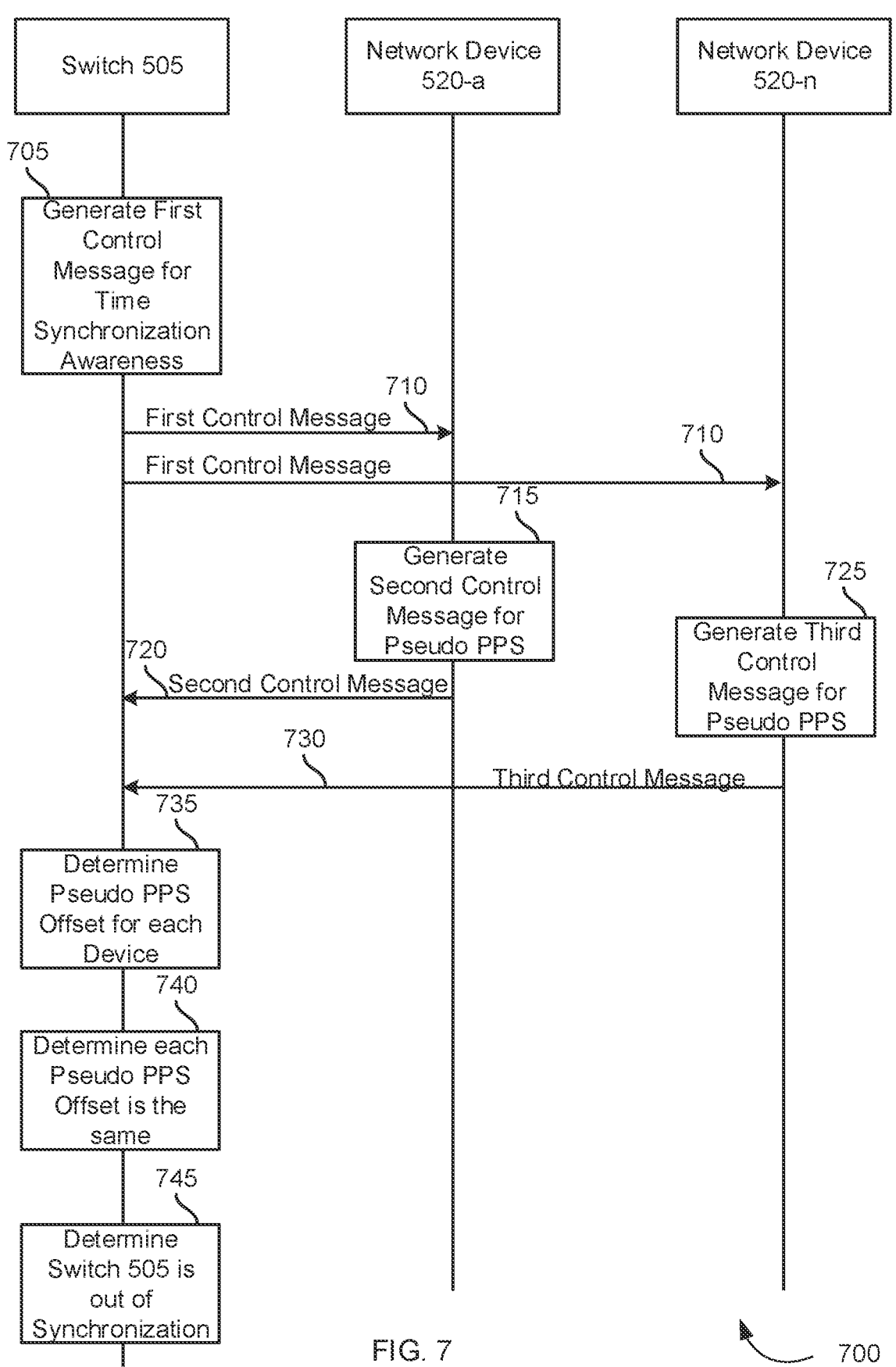
FIG. 7 is an example diagram for determining synchronization, in accordance with at least some embodiments.

FIG. 7 illustrates an example diagram 700 for synchronization awareness of a interconnect device 505 according to at least one example embodiment. The methods of diagram 700 can be performed by processing logic comprising hardware, software, firmware, or any combination thereof. In at least one embodiment, the methods of diagram 700 are performed by interconnect device 505 and network devices 520 as described with reference to FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In at least one embodiment, diagram 700 illustrates operations 705-730 that correspond to operations 605-630 as described with reference to FIG. 6. For example, at operation 705, the interconnect device 505 can generate a first control block that includes a first portion of bits corresponding to a header '10' to indicate the first message is a control block. Additionally, the first control block can include a type to indicate the first control block is initiating a synchronization awareness operation and/or requesting pseudo-PPS signals as well as any additional synchronization information. In at least one embodiment, during operation 710, the interconnect device 505 can transmit the first control block to one or more network devices 520—e.g., to network devices 520-a through network devices 520-n. Each network device 520 can be configured to process the first control block—e.g., determine incoming data is associated with the synchronization awareness operation and/or a request for pseudo-PPS signals based on the header '10' and the type of the first control block.

During operations 715 and 725, the network device 520-a and network device 520-n can generate a second control block and third control block, respectively, where the second and third control blocks each includes the header '10' and a type that indicates the respective message is a pseudo-PPS signal. In at least one embodiment, the second and third control blocks each include any time of day, time offset, RTT measurement, and/or any known or unknown inaccuracies of the respective network device. During operations 720 and 730, each network device can transmit its respective control block (e.g., pseudo-PPS signal) to the interconnect device— e.g., network device 520-a can transmit the pseudo-PPS signal 525-a to the interconnect device 505 during operation 720. In some embodiments, the interconnect device 505 can receive data and determine whether the data is associated with the second control block or the third control block based on the header '10,' the type information, and any respective time of day, a time offset, an RTT measurement, and/or any known or unknown inaccuracies information. In at least one embodiment, the network devices 520 can continue to transmit pseudo-PPS signals at a predetermined rate—e.g., at a rate specified in the first control block. For example, the network devices 520 can continue to transmit pseudo-PPS signals each second or more than once per second, as indicated in the first control block.

At operation 735, interconnect device 505 (e.g., pseudo-PPS logic 515) can determine a pseudo-PPS offset or a delay associated with each network device 520. For example, the interconnect device 505 can determine an average pseudo-PPS offset for each network device 520. In other embodiments, the interconnect device 505 can determine whether each network device 520 has a constant offset/delay or if the delay or offset is increasing—e.g., the interconnect device 505 can determine if the pseudo-PPS signal 525-a from the network device 520-a includes the same offset or if the offset increases each time the network device 520-a transmits an additional pseudo-PPS signal.

At operation 740, the interconnect device 505 (e.g., pseudo-PPS logic 515) can determine if the pseudo-PPS offset/delay is within an acceptable error range for each device—e.g., within ten (10) nanoseconds of a predetermined threshold value. That is, the interconnect device 505 is trying to ensure each device is substantially similar. In some embodiments, the interconnect device 505 can determine if the offset or delay is increasing at a similar rate or a same rate with respect to each network device 520. For example, the interconnect device 505 can determine the delay or offset associated with network device 520-*a* is increasing at a similar rate or the same rate as a delay or offset associated with network device 520-*n*.

At operation 745, the pseudo-PPS logic 515 can determine the interconnect device 505 is out of synchronization responsive to determining the pseudo-PPS delay or offset for each network device 520 is the same or similar—e.g., or increasing at a same or similar rate. In that, the interconnect device 505 can determine its internal clock is asynchronous with two or more of the network devices 520. For example, the interconnect device 505 can determine it is synchronous with each network device 520 if the delay or offset from each respective network device 520 stays constant—e.g., the constant delay can indicate the constant delay caused by the link or wire coupling the switch to the respective network device. In some embodiments, the interconnect device 505 clock is skewed if the delay or offset associated with each network device 520 increases—e.g., it is unlikely each network device 520 is asynchronous with the interconnect device 505; instead, the increased delay or offset associated with the pseudo-PPS signals can indicate a clock of interconnect device 505 is asynchronous, causing increased delays and offsets at each of the network devices 520. For example, the interconnect device 505 can determine it is asynchronous if each network device transmits its respective PPS signal 50 nanoseconds after an expected time. In some embodiments, the interconnect device 505 can initiate an operation to resynchronize or otherwise fix its internal clock synchronization responsive to determining the interconnect device 505 is asynchronous. For example, the interconnect device 505 can resynchronize with respect to a GNSS or GPS receiver after determining the interconnect device 505 is asynchronous.

Figure 8:
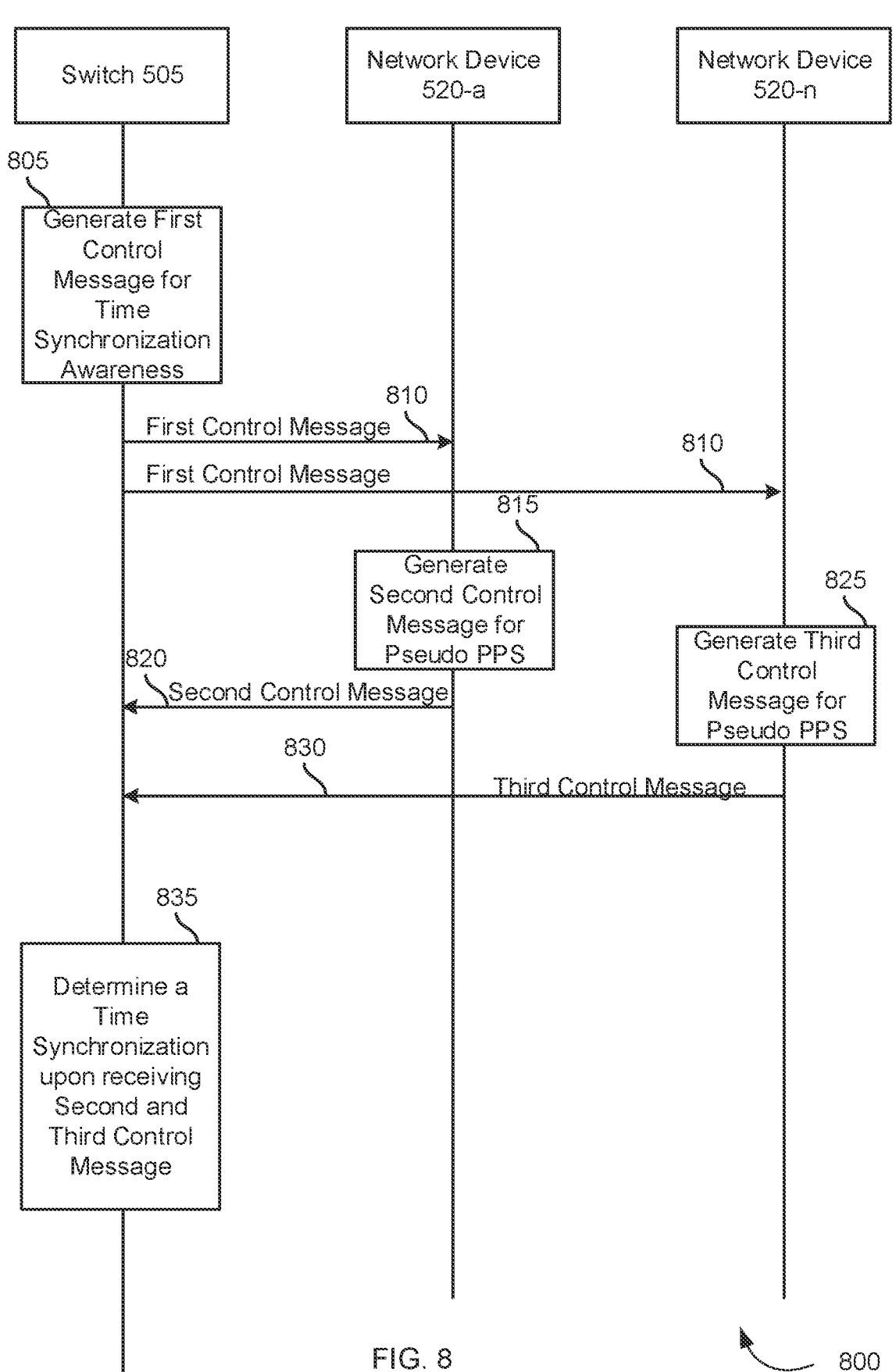
FIG. 8 is an example diagram for utilizing time synchronization information, in accordance with at least some embodiments.

FIG. 8 illustrates an example diagram 800 for synchronizing a interconnect device 505 according to a time synchronization determined from coupled devices, in at least one example embodiment. The methods of diagram 800 can be performed by processing logic comprising hardware, software, firmware, or any combination thereof. In at least one embodiment, the methods of diagram 800 are performed by interconnect device 505 and network devices 520 as described with reference to FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In at least one embodiment, diagram 800 illustrates operations 805-830 that correspond to operations 605-630 as described with reference to FIG. 6. For example, at operation 805, the interconnect device 505 can generate a first control block that includes a first portion of bits corresponding to a header '10' to indicate the first message is a control block. Additionally, the first control block can include a type to indicate the first control block is initiating a synchronization awareness operation and/or requesting pseudo-PPS signals as well as any additional synchronization information. In at least one embodiment, during operation 810, the interconnect device 505 can transmit the first control block to one or more network devices 520—e.g., to network devices 520-*a* through network devices 520-*n*. Each network device 520 can be configured to process the first control block—e.g., determine incoming data is associated with the synchronization awareness operation and/or a request for pseudo-PPS signals based on the header '10' and the type of the first control block.

During operations 815 and 825, the network device 520-*a* and network device 520-*n* can generate a second control block and third control block, respectively, where the second and third control blocks each includes the header '10' and a type that indicates the respective message is a pseudo-PPS signal. In at least one embodiment, the second and third control blocks include any time of day, time offset, RTT measurement, and/or any known or unknown inaccuracies of the respective network device. During operations 820 and 830, each network device can transmit its respective control block (e.g., pseudo-PPS signal) to the interconnect device—e.g., network device 520-*a* can transmit the pseudo-PPS signal 525-*a* to the interconnect device 505 during operation 820. In some embodiments, the interconnect device 505 can receive data and determine whether the data is associated with the second control block or the third control block based on the header '10,' the type information, and any respective time of day, a time offset, an RTT measurement, and/or any known or unknown inaccuracies information. In at least one embodiment, the network devices 520 can continue to transmit pseudo-PPS signals at a predetermined rate—e.g., at a rate specified in the first control block. For example, the network devices 520 can continue to transmit pseudo-PPS signals each second or more than once per second, as indicated in the first control block.

At operation 835, the interconnect device 505 can determine a time synchronization upon receiving the second and third control blocks—e.g., after receiving a plurality of pseudo-PPS signals from each network device 520 coupled to the interconnect device 505. As described with reference to FIG. 5, the interconnect device 505 can normally be configured to synchronize coupled network devices 520. In these embodiments, the interconnect device 505 can utilize the synchronization and pseudo-PPS signals received from each network device 520 to synchronize the interconnect device 505 clock—e.g., synchronize the interconnect device's 505 clock to the network devices 520. In at least one embodiment, the interconnect device 505 can utilize the methods described in diagram 800 if the interconnect device 505 is unable to synchronize from a different source (e.g., a signal generator or GPS receiver is unavailable to synchronize the interconnect device 505) or if the interconnect device 505 otherwise is to synchronize with all network devices 520. In some embodiments, the interconnect device 505 can determine the time synchronization by determining an average offset of each incoming pseudo-PPS signal from the respective network devices 520. For example, the interconnect device 505 can utilize the synchronization information received from each network device 520 to synchronize its internal clock—e.g., the interconnect device 505 can utilize any of a time of day, a time offset, an RTT measurement, or any known or unknown inaccuracies information included in each pseudo-PPS signal from each network device 520 to synchronize its internal clock. In some embodiments, the interconnect device 505 can also request resynchronization with a signal generator or GPS receiver while using the time synchronization from the network devices 520.

Figure 9:
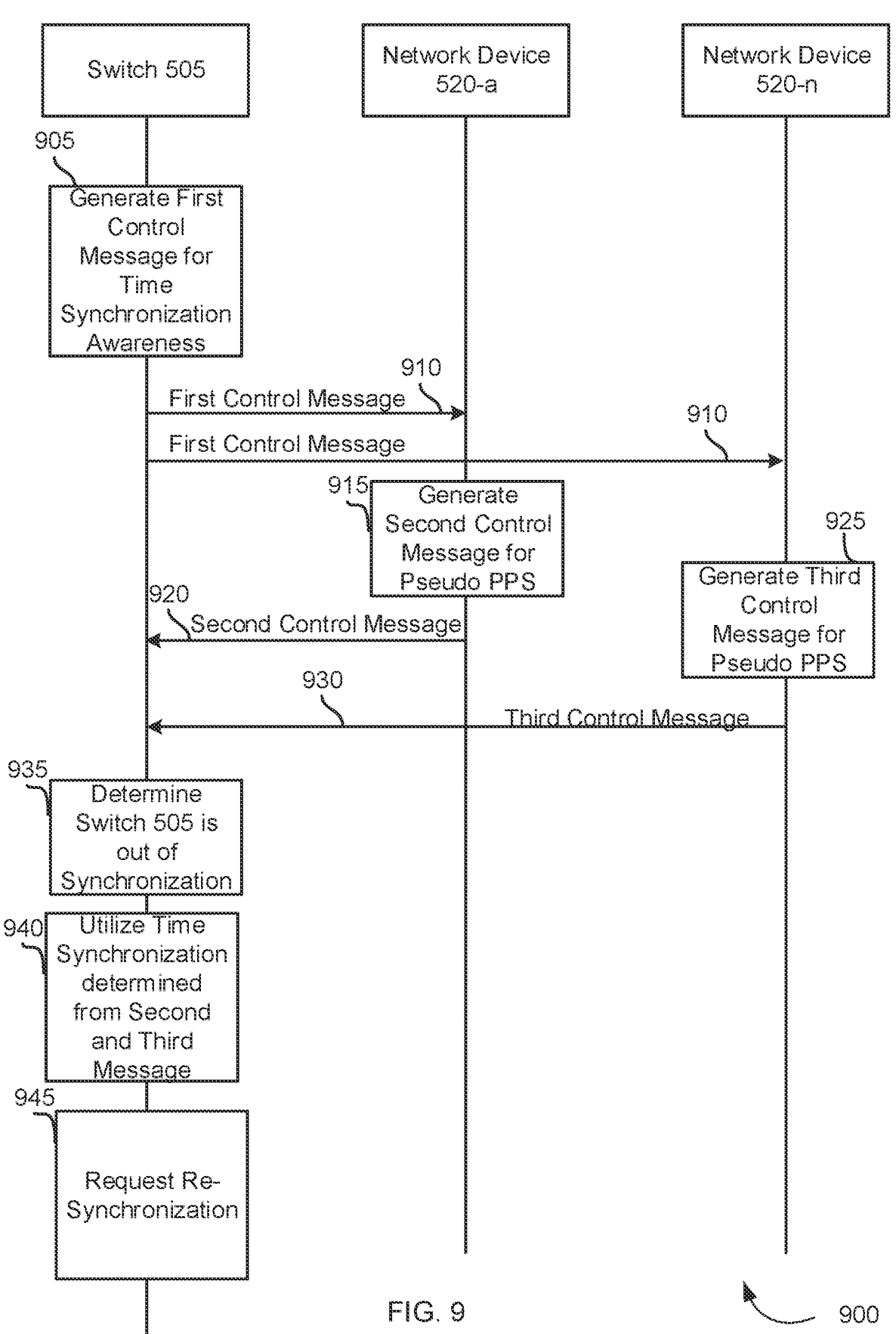
FIG. 9 illustrates an example for temporarily utilizing time synchronization information, in accordance with at least some embodiments.

FIG. 9 illustrates an example diagram 900 for synchronizing a interconnect device 505 according to a time synchronization determined from coupled devices, in at least one example embodiment. The methods of diagram 900 can be performed by processing logic comprising hardware, software, firmware, or any combination thereof. In at least one embodiment, the methods of diagram 900 are performed by interconnect device 505 and network devices 520 as described with reference to FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In at least one embodiment, diagram 900 illustrates operations 905-930 that correspond to operations 605-630 as described with reference to FIG. 6. For example, at operation 905, the interconnect device 505 can generate a first control block that includes a first portion of bits corresponding to a header '10' to indicate the first message is a control block. Additionally, the first control block can include a type to indicate the first control block is initiating a synchronization awareness operation and/or requesting pseudo-PPS signals as well as any additional synchronization information. In at least one embodiment, during operation 910, the interconnect device 505 can transmit the first control block to one or more network devices 520—e.g., to network devices 520-*a* through network devices 520-*n*. Each network device 520 can be configured to process the first control block—e.g., determine incoming data is associated with the synchronization awareness operation and/or a request for pseudo-PPS signals based on the header '10' and the type of the first control block.

During operations 915 and 925, the network device 520-*a* and network device 520-*n* can generate a second control block and third control block, respectively, where the second and third control blocks each includes the header '10,' a type that indicates the respective message is a pseudo-PPS signal. In at least one embodiment, the second control block and the third control block include any time of day, time offset, RTT measurement, and/or any known or unknown inaccuracies of the respective network device. During operations 920 and 930, each network device can transmit its respective control block (e.g., pseudo-PPS signal) to the interconnect device—e.g., network device 520-*a* can transmit the pseudo-PPS signal 525-*a* to the interconnect device 505 during operation 920. In some embodiments, the interconnect device 505 can receive data and determine whether the data is associated with the second control block or the third control block based on the header '10,' the type information, and any respective time of day, a time offset, an RTT measurement, and/or any known or unknown inaccuracies information. In at least one embodiment, the network devices 520 can continue to transmit pseudo-PPS signals at a predetermined rate—e.g., at a rate specified in the first control block. For example, the network devices 520 can continue to transmit pseudo-PPS signals each second or more than once per second, as indicated in the first control block.

At operation 935, the interconnect device 505 can determine the interconnect device 505 is asynchronous to the network devices 520. For example, as described with reference to FIG. 7, the interconnect device 505 can determine if it is asynchronous if a timing offset of each pseudo-PPS signal is the same or similar or increasing at a similar or same rate. For example, the interconnect device 505 can determine it is asynchronous if each network device 520 transmits a pseudo-PPS signal 25 nanoseconds after an expected time—e.g., each network device 520 has a same pseudo-PPS signal offset. In some embodiments, the pseudo-PPS logic 515 can determine the interconnect device 505 is asynchronous by determining averages or comparing the pseudo-PPS signal offsets received from each network device 520. As described with reference to operation 930, each network device 520 can transmit a plurality of pseudo-PPS signals at a predetermined rate. Accordingly, the pseudo-PPS logic 515 can determine that the interconnect device 505 is asynchronous based on monitoring the incoming pseudo-PPS signals from each network device 520 for a predetermined time.

At operation 940, the interconnect device 505 can temporarily utilize time synchronization determined from the second and third control blocks as described with reference to operation 835—e.g., after receiving a plurality of pseudo-PPS signals from each network device 520 coupled to the interconnect device 505. For example, the interconnect device 505 can utilize the synchronization and pseudo-PPS signals received from each network device 520 to synchronize the interconnect device 505 clock. In one embodiment, interconnect device 505 can determine the time synchronization by determining an average offset of each incoming pseudo-PPS signal from the respective network devices 520. For example, the interconnect device 505 can utilize the synchronization information received from each network device 520 to synchronize its internal clock—e.g., the interconnect device 505 can utilize any of a time of day, a time offset, an RTT measurement, or information regarding any known or unknown inaccuracies included in each pseudo-PPS signal from each network device 520 to synchronize its internal clock. In at least one embodiment, the time synchronization determined from the pseudo-PPS signals received from each network device 520 can be an approximation. Accordingly, the interconnect device 505 can temporarily use the time synchronization determined from the second and third control blocks and proceed to operation 945.

At operation 945, the interconnect device 505 can request a resynchronization operation or otherwise initiate an operation to synchronize the clock of the interconnect device 505. For example, the interconnect device 505 can request resynchronization to a GNSS or GPS receiver or any other accurate clock. In at least one embodiment, the interconnect device 505 can refrain from using the time synchronization determined from the pseudo-PPS signals received from the network devices 520 after the clock of the interconnect device 505 is synchronous again—e.g., the interconnect device 505 can temporarily use the determined time synchronization from the network devices 520 until the clock of the interconnect device 505 is synchronous gain.

Figure 10:
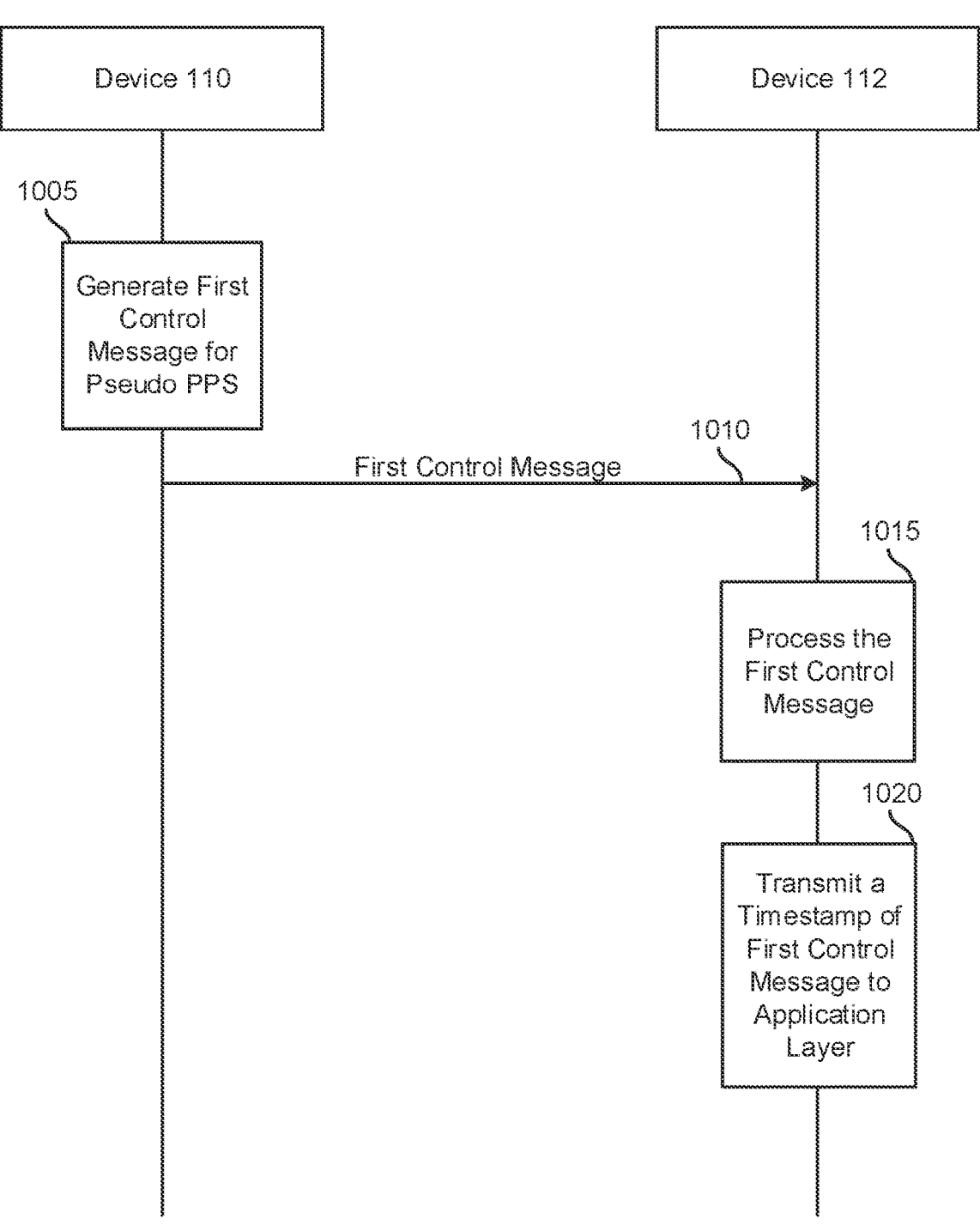
FIG. 10 is an example diagram for timestamping time synchronization information, in accordance with at least some embodiments.

FIG. 10 illustrates an example diagram 1000 for timestamping pseudo PPS signals via a physical layer according to at least one example embodiment. The methods of diagram 1000 can be performed by processing logic comprising hardware, software, firmware, or any combination thereof. In at least one embodiment, the methods of diagram 1000 are performed by device 110 and device 112 as described with reference to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 1005, device 110 can generate a first control block to transmit a first pseudo-PPS signal to device 112. In at least one embodiment, the device 110 can generate the first control block to include a first portion of bits that indicate the first message is a control block—e.g., the first control block can include a header '10' to indicate the first message is a control block. The device 110 can further generate the first control block to include a second portion of bits that indicate a type of the first control block—e.g., the device 110 can generate the first control block to include a type 250 that indicates the first control block is a pseudo-PPS signal. In some embodiments, the device 110 can generate the control block to include a third portion of bits that includes any time of day, time offset, RTT measurement, and/or any known or unknown inaccuracies associated with the device 110. In at least one embodiment, the type or data portion of the first control block can include information or instructions to timestamp the pseudo-PPS signal at an application layer (e.g., a layer that specifies communication protocols and interface methods used by a system in a communications network) of device 112—e.g., to receive the pseudo-PPS signal as a real PPS signal (e.g., as if the PPS signal were an analog signal from a GNSS or GPS receiver).

At operation 1010, the device 110 can transmit the first control block to device 112 via a link. In at least one embodiment, the first control block is transmitted via a physical layer.

At operation 1015, device 112 can process the incoming first control block upon receipt. For example, the device 112 can receive data and determine that the data is associated with a control block responsive to determining the header is '10.' Further, device 112 can determine a type associated with the first control block—e.g., the device 112 can recover the bits associated with the type and determine which synchronization operation to perform. For example, the device 112 can process the first control block and determine the message is associated with a pseudo-PPS signal that should be time stamped in the application layer. Additionally, the device 112 can process the first control block and recover the time of day, a time offset, an RTT measurement, or any known or unknown inaccuracies information included in the first control block. In at least one embodiment, the device 112 can also determine a time the first control block is received—e.g., a timestamp associated with receiving the first control block.

At operation 1020, device 112 can transmit a timestamp associated with receiving the first control block to the application layer of device 112. In at least one embodiment, the timestamp can be used internally by the application layer (e.g., software layer or operating system) for further synchronization. For example, the device 112 can transmit the timestamp from the physical layer of an operating system or synchronization controller (e.g., daemon) that receives or reads PPS signals received from a GPS or signal generator—e.g., transmit the timestamp to components associated with processing real PPS signals. In at least one embodiment, the software can use the timestamping for local synchronization. For example, the device 112 can receive the first control block at a time other than a round second after compensating for one-way delays and known offsets—e.g., the device 112 can receive the first control block at 8:00:00 plus ten (10) nanoseconds. In such embodiments, the software or controller can reduce a frequency of an internal clock of the device 112 such that a subsequent PPS signal is received more accurately with respect to the internal or local clock—e.g., closer to the round second. In at least one embodiment, the device 112 can continue to timestamp pseudo-PPS signals and transmit them to the software until a subsequent PPS signal is received as close as possible to a round second (e.g., to 8:00:05, for example). In at least one embodiment, the controller can be an example of a ts2phc open source precision time protocol (PTP) controller configured to synchronize one or more PTP clocks using an external timestamp—e.g., the timestamp from device 110.

Figure 11:
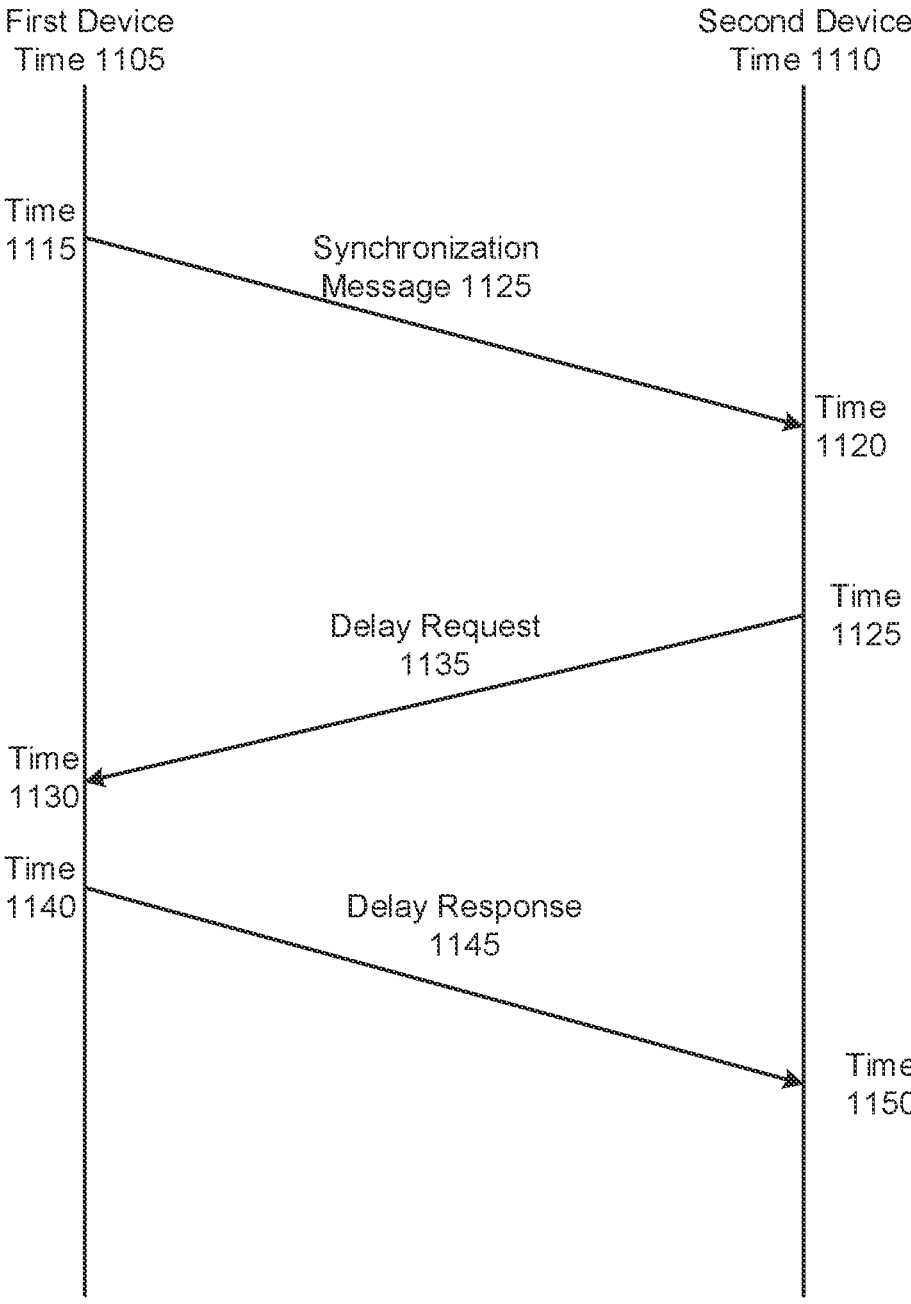
FIG. 11 is an example diagram for a time synchronization handshake, in accordance with at least some embodiments.

FIG. 11 illustrates an example diagram 1100 for a time synchronization handshake via a physical layer according to at least one example embodiment. The methods of diagram 1100 can be performed by processing logic comprising hardware, software, firmware, or any combination thereof. In at least one embodiment, the methods of diagram 1100 are performed by device 110 and device 112 as described with reference to FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In at least one embodiment, the diagram 1100 can illustrate a time at the device 110 (e.g., first device time 1105) and a time at the device 112 (e.g., second device time 1110).

Before time 1115, the device 110 can generate a synchronization message 1125 (e.g., a first control block) that includes a first portion of bits that indicate the synchronization message 1125 is a control block—e.g., the synchronization message 1125 can include a header '10' to indicate the synchronization message 1125 is a control block. The device 110 can further generate the synchronization message 1125 to include a second portion of bits that indicate a type—e.g., the device 110 can generate the type to indicate the message is a synchronization message 1125. In at least one embodiment, the synchronization message 1125 can indicate to initiate a time synchronization handshake between the devices 110 and 112—e.g., the synchronization message 1125 can initiate a full-time synchronization between device 110 and device 112. In some embodiments, the device 110 can generate the synchronization message 1125 to include a third portion of bits that include additional synchronization information. For example, the device 110 can generate the synchronization message 1125 to include a time when the synchronization message 1125 is transmitted or to be transmitted—e.g., time 1115.

At time 1115, the device 110 can transmit the synchronization message 1125 to the device 112 via the physical layer and the link. In at least one embodiment, the device 110 can transmit the synchronization message 1125 at any time. For example, the device 110 does not have to wait for a round second to transmit the synchronization message 1125—e.g., the device 110 can initiate the synchronization handshake operation at any point. Additionally, the device 110 can generate and transmit the synchronization message 1125 within the physical layer—e.g., the device 110 can refrain from having the synchronization message 1125 travel from a software or application layer to the physical layer before being transmitted over the link.

At a time 1120, the device 112 can receive the synchronization message 1125. In at least one embodiment, the device 112 can time stamp when the synchronization message 1125 is received or otherwise record the time 1120. In at least one embodiment, device 112 can process the synchronization message 1125 upon receipt. For example, the device 112 can receive data and determine that the data is associated with a control block responsive to determining the header is '10.' Further, device 112 can determine a type associated with the message—e.g., the device 112 can recover the bits associated with the type and determine the control block corresponds to the synchronization message 1125. In at least one embodiment, the device 112 can use the type to determine the synchronization operation to perform—e.g., the device 112 can determine to perform the time synchronization handshake responsive to receiving the bits associated with the type. In at least one embodiment, the device 112 can also recover the bits associated with the third portion of the synchronization message 1125—e.g., recover the bits representing the time 1115 the synchronization message 1125 is transmitted. In at least one embodiment, the device 112 can store the time 1115.

Before time 1125, the device 112 can generate a delay request 1135 (e.g., a second control block) that includes a first portion of bits that indicate the delay request 1135 is a control block—e.g., the delay request 1135 can include a header '10' to indicate the delay request 1135 is a control block. The device 112 can further generate the delay request 1135 to include a second portion of bits that indicate a type—e.g., the device 112 can generate the type to indicate the message is a delay request 1135. In at least one embodiment, the delay request 1135 can indicate to complete a time synchronization handshake between the devices 110 and 112—e.g., the delay request 1135 can request the device 110 respond back with a time the delay request 1135 is received so that the second device can execute the time synchronization handshake. In some embodiments, the device 112 can generate the delay request 1135 to include a third portion of bits that include additional synchronization information. For example, the device 112 can generate the delay request 1135 to include a time when the delay request 1135 is transmitted or to be transmitted—e.g., time 1125. In at least one embodiment, the device 112 can also store the time 1125.

At time 1125, the device 112 can transmit the delay request 1135 to the device 110 via the physical layer and the link. In at least one embodiment, the device 112 can transmit the delay request 1135 at any time. For example, the device 112 does not have to wait for a round second to transmit the delay request 1135—e.g., the device 112 can respond to the synchronization message 1125 at any point. Additionally, the device 112 can generate and transmit the delay request 1125 within the physical layer—e.g., the device 112 can refrain from having either the synchronization message 1125 or the delay request 1135 travel from a software or application layer to the physical layer before being transmitted over the link.

At time 1130, the device 110 can receive the delay request 1135. In at least one embodiment, the device 110 can time stamp when the delay request 1135 is received or otherwise record the time 1130. In at least one embodiment, device 110 can process the delay request 1135 upon receipt. For example, the device 110 can receive data and determine that the data is associated with a control block responsive to determining the header is '10.' Further, device 110 can determine a type associated with the message—e.g., the device 110 can recover the bits associated with the type and determine the control block corresponds to the delay request 1135. In at least one embodiment, the device 110 can use the type to determine the synchronization operation to perform—e.g., the device 110 can determine to respond to the delay request 1135 responsive to receiving the bits associated with the type.

Before time 1140, the device 110 can generate a delay response 1145 (e.g., a third control block) that includes a first portion of bits that indicate the delay response 1145 is a control block—e.g., the delay response 1145 can include a header '10' to indicate the delay response 1145 is a control block. The device 110 can further generate the delay response 1145 to include a second portion of bits that indicate a type—e.g., the device 110 can generate the type to indicate the message is a delay response 1145. In some embodiments, the device 110 can generate the delay response 1145 to include a third portion of bits that include additional synchronization information. For example, the device 110 can generate the delay response 1145 to include a time when the delay request 1135 is received—e.g., time 1130.

At time 1140, the device 110 can transmit the delay response 1145 to the device 112 via the physical layer and the link.

At time 1150, the device 112 can receive the delayed response 1145. In at least one embodiment, device 112 can process the delay response 1145 upon receipt. For example, the device 112 can receive data and determine that the data is associated with a control block responsive to determining the header is '10.' Further, device 112 can determine a type associated with the message—e.g., the device 112 can recover the bits associated with the type and determine the control block corresponds to the delay response 1145. In at least one embodiment, the device 112 can also recover the bits associated with the third portion of the delay response 1145—e.g., recover the bits representing the time 1130 the delay request 1135 was received by the device 110.

After time 1150, the device 112 can complete the time synchronization handshake. In at least one embodiment, the device 112 can determine a prorogation delay of either transmitting or receiving a message to and from the device 110. For example, device 112 can calculate a delay:

$$Delay = \frac{(time\ 1120 - time\ 1115) - (time\ 1130 - time\ 1125)}{2},$$

where time 1120–time 1115 is associated with transmitting messages from device 110 to device 112 and time 1130–time 1125 is associated with transmitting messages from device 112 to device 110. After determining the delay, the device 112 can determine an offset: offset=time 1120–time 1115–delay. Accordingly, using the physical layer control blocks, the device 112 can be synchronized with respect to device 110 as described herein.

FIG. 12 illustrates an example communication system 1200 according to at least one example embodiment. The system 1200 includes device 110 and device 112 as described with reference to FIG. 1. In at least one embodiment, the device 110 and device 112 are coupled via a communication network 108 (e.g., a link). In some embodiments, the device 110 can include a precision time protocol (PTP) layer 108-*a*, a driver 114-*a*, and a physical layer 116-*a*. In at least one embodiment, the physical layer 116-*a* is associated with a transmitter 102 of device 110 as described with reference to FIG. 1. In some embodiments, device 112 can include a physical layer 116-*b*, a driver 114-*b*, and a PTP layer 108-*b*. In at least one embodiment, the physical layer 116-*b* is associated with receiver 104 as described with reference to FIG. 1. In at least one embodiment, messages can also be communicated from device 110 to device 112—e.g., device 112 can include a physical layer 116 for its transmitter, and device 110 can include a physical layer 116 for its receiver. In at least one embodiment, PTP layer 108-*a* and driver 114-*a* can be considered part of a software or application layer of device 110, and driver 114-*b* and PTP layer 108-*b* can be considered part of a software or application layer of device 112.

In at least one embodiment, PTP layer 108-*a* is configured to generate packets or messages for time synchronization. For example, the PTP layer 108-*a* is configured to synchronize clocks throughout the system 1200. In some embodiments, device 110 can be an example of a primary time-synchronization device that is used to synchronize other devices in the system—e.g., used to synchronize device 112. In at least one embodiment, the PTP layer 108-*a* can generate synch, follow-up, delay request, and delay response messages to communicate time-related information for synchronizing clocks in the system 1200. In at least one embodiment, the PTP layer 108-*a* can include one or more controllers or daemons that are used to execute the instructions of the PTP layer 108-*a*. In at least one embodiment, PTP layer 108-*b* is configured to receive packets or messages and synchronize a clock of device 112 accordingly. For example, the PTP layer 108-*b* can receive a synch message and respond with a delay request to perform time synchronization handshakes. In at least one embodiment, the PTP layer 108-*a* can transmit packets and request a response with a timestamp from the PTP layer 108-*b*. Similarly, the PTP layer 108-*b* can transmit packets and request a response with a time stamp from PTP layer 108-*a*.

In at least one embodiment, driver 114-*a* is configured to convert PTP messages or packets into a control block (e.g., control block 235 as described with reference to FIG. 2) that is transmitted via the physical layer as described with reference to FIG. 2. In that, the driver 114-*a* is configured to receive PTP messages or packets having a first format and convert the PTP messages or packets into control blocks having a second format. In some embodiments, the PTP layer 108-*a* is unaware of the translation—e.g., the PTP layer 108-*a* is not aware the PTP packets or messages are being converted. In at least one embodiment, the PTP layer 108-*a* is configured to instruct the physical layer 116-*a* what control blocks to transmit—e.g., instruct the physical layer 116-*a* to transmit bits having a determined sequence associated with a control block. In at least one embodiment, the driver 114-*a* can convert PTP messages or packets to control blocks to perform round trip time (RTT) measurements or transmit pseudo-PPS signals. In at least one embodiment, the driver 114-*a* can instruct the physical layer 116-*a* to transmit messages, including a third portion of bits that correspond to synchronization information included in the PTP packets or messages. In some embodiments, the PTP layer 108-*a* is aware the PTP packets or messages are being converted. In such embodiments, the PTP layer 108-*a* can provide instructions to the driver 114-*a* for translating the PTP messages or packets into the control blocks.

In at least some embodiments, physical layer 116-*a* is configured to transmit control or data blocks (e.g., data blocks 205 as described with reference to FIG. 2) across the communication network 108 via a physical layer to device 112. For example, the physical layer 116-*a* can include input/output (I/O) buffers, parallel-to-serial and serial-to-parallel converters, impedance matching circuitry, logic circuitry, etc. to transmit control blocks or data blocks to device 112. In at least one embodiment, physical layer 116-*b* is configured to receive control or data blocks across the communication network 108. In at least one embodiment, the physical layer 116-*b* can include input/output (I/O) buffers, parallel-to-serial and serial-to-parallel converters, impedance matching circuitry, logic circuitry, etc. to receive the control blocks or data blocks. In at least one embodiment, the physical layer 116-*b* is configured to transmit received data or control blocks to driver 114-*b*.

In at least one embodiment, driver 114-*b* is configured to convert control blocks having the second format into PTP messages or packets having the first format. In that, the driver 114-*b* can convert the control blocks back to the original PTP messages or packets generated and transmitted by PTP layer 108-*a*. In at least one embodiment, the PTP layer 108-*b* can be unaware of the driver 114-*b* converting the control blocks to the PTP messages or packets—e.g., the software layer or application layer associated with the PTP of device 112 can be unaware of the translation. In at least one embodiment, the PTP layer 108-*b* can be aware of the translation by the driver 114-*b*—e.g., the PTP layer 108-*b* can be aware that the driver 114 is converting control blocks to the PTP messages or packets.

In at least one embodiment, converting the PTP messages or packets into the control blocks can reduce an amount of data transmitted over the communication network 108 (e.g., over the link or wire coupling device 110 to device 112). That is, rather than sending the PTP messages or packets, device 110 can transmit control blocks that utilize the communication network 108 less frequently. Accordingly, a higher PTP message rate can be used even if a total amount of data communicated on communication network 108 is the same. In at least one embodiment, timestamping of physical layer messages (e.g., of the control blocks) consumes less resources than timestamping PTP messages or packets, improving the overall accuracy of the solution. For example, some solutions use "head of the line blocking" when transmitting a PTP message to reduce internal timestamping disruptions but such methods are unnecessary when utilizing the control blocks, which can reduce usage of communication network 108.

Figure 13:
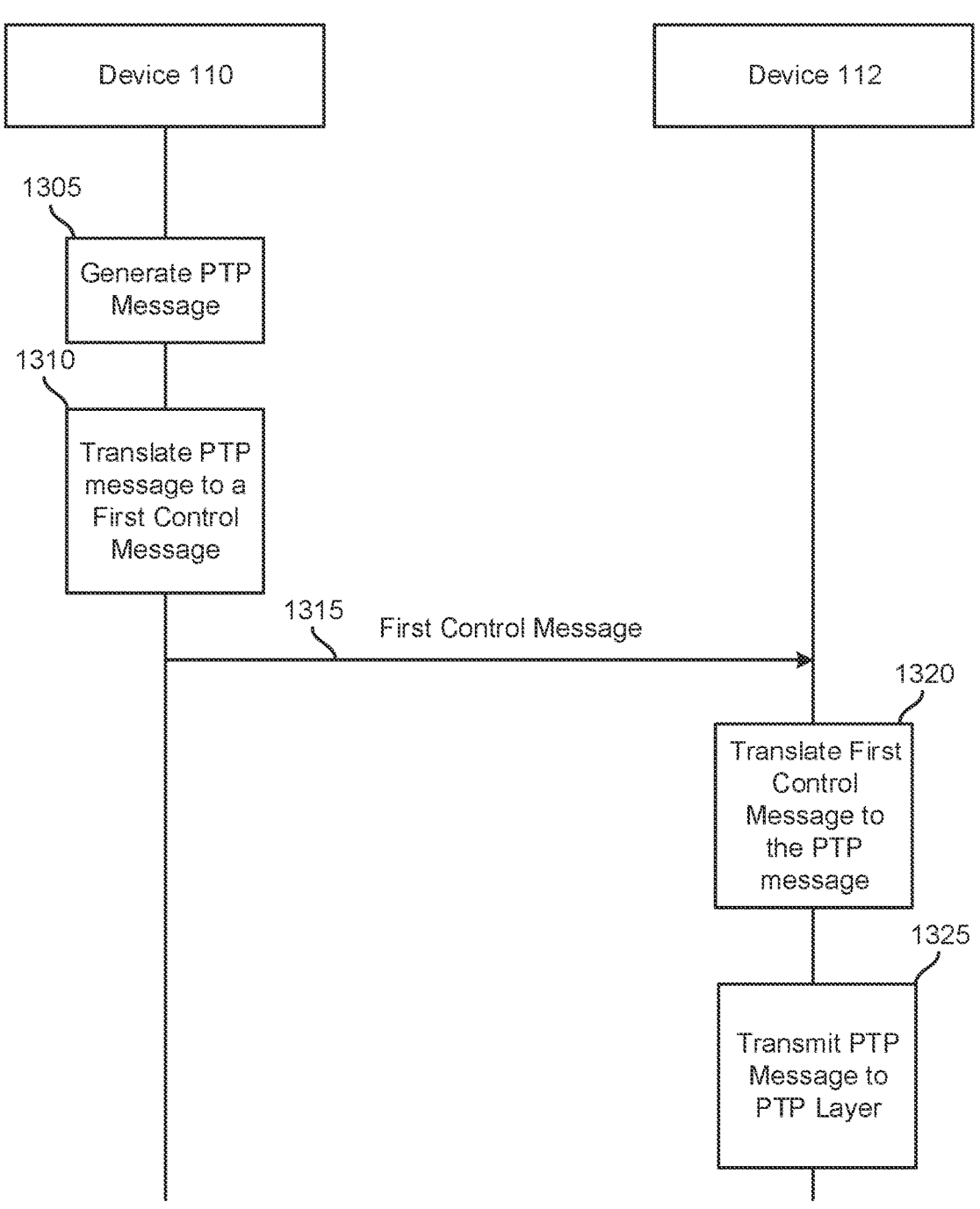
FIG. 13 is an example diagram for converting synchronization information, in accordance with at least some embodiments.

FIG. 13 illustrates an example diagram 1300 for converting precision time protocol (PTP) messages to control blocks (e.g., control blocks 235 as described with reference to FIG. 2) transmitted via a physical layer according to at least one example embodiment. The methods of diagram 1300 can be performed by processing logic comprising hardware, software, firmware, or any combination thereof. In at least one embodiment, the methods of diagram 1000 are performed by device 110 and device 112 as described with reference to FIG. 12. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 1305, device 110 can generate a PTP message. For example, a PTP layer 108-*a* of the device 110 can generate a PTP packet or message for a time synchronization operation or determine time synchronization information. For example, the PTP layer 108-*a* can generate a PTP message to initiate a time synchronization handshake as described with reference to FIG. 11—e.g., generate a synchronization message to initiate the synchronization handshake. In some embodiments, the PTP layer 108-*a* can generate a delay response or delay response as described with reference to FIG. 11. In at least one embodiment, the PTP layer 108-*a* can generate the PTP message or packet to determine a round trip time (RTT) measurement or to transmit a pseudo-PPS signal.

At operation 1310, device 110 can translate the PTP message to a first control block. In some embodiments, the driver 114-*a* of device 110 can translate the PTP message having a first format into a control block having a second format, where the first control block is transmitted via the physical layer 116 to perform synchronization operations as described with reference to FIG. 2. In some embodiments, the PTP message can be translated into several control blocks—e.g., the information of a single PTP message can cause device 110 to transmit several control blocks to convey the information. In at least one embodiment, the device 110 can generate the first control block to transmit the information of the PTP message via the physical layer 116. In at least one embodiment, the driver 114-*a* can generate the first control block to include a first portion of bits that indicate the first message is a control block—e.g., the first control block can include a header '10' to indicate the first message is a control block. The device 110 can further generate the first control block to include a second portion of bits that indicate a type of the first control block—e.g., the device 110 can generate the first control block to include a type 250 that indicates the type of information included in the PTP message—e.g., whether the control block is associated with a synchronization handshake, an RTT measurement, a pseudo-PPS signal, etc. In some embodiments, the device 110 can generate the control block to include a third portion of bits that includes information about the PTP message. For example, the driver 114-*a* can generate the first control block to include any of the following information: time of day, time offset, RTT measurement, and/or information regarding any known or unknown inaccuracies associated with the device 110, time the first control block is transmitted, a time a previous control block was received, that the message is a request for a pseudo-PPS signal that is to be responded to with a pseudo-PPS signal an 'n' number of times per second, etc.

At operation 1315, the device 110 can transmit the first control block to device 112 via the link—e.g., from physical layer 116-*a* to physical layer 116-*b*. In at least one embodiment, physical layer 116-*b* can process the incoming first control block upon receipt. For example, the physical layer 116-*b* can receive data and determine that the data is associated with a control block responsive to determining the header is '10.' Further, physical layer 116-*b* can determine a type associated with the first control block—e.g., the physical layer 116-*b* can recover the bits associated with the type and determine a synchronization operation to perform or determine a response to transmitting back to the device 110. For example, the physical layer 116-*b* can process the first control block and determine whether the message is associated with a pseudo-PPS signal, an RTT measurement, or associated with performing a synchronization handshake. Additionally, the physical layer 116-*b* can process the first control block and recover the bits of data corresponding to the third portion—e.g., determine the time of day, a time offset, RTT measurement, and/or information regarding any known or unknown inaccuracies associated with the device 110, time the first control block is transmitted, a time a previous control block was received, that the message is a request for a pseudo-PPS signal that is to be responded to with a pseudo-PPS signal an 'n' number of times per second, etc. In some embodiments, the physical layer 116-*b* can further determine a time associated with receiving the first control block and store the time. In some embodiments, the physical layer 116-*b* can transmit the control block to the driver 114-*b*.

At operation 1320, driver 114-*b* of device 112 can translate the first control block back to the PTP message. For example, the driver 114-*b* can convert the second format associated with the control block to the first format associated with the PTP message. In at least one embodiment, the driver 114-*b* recovers the original PTP message generated by the PTP layer 108-*a*.

At operation 1325, the driver 114-*b* can transmit the translated PTP message to the PTP layer 108-*b*. In such embodiments, the PTP layer 108-*b* can receive the PTP message and initiate the operation indicated by the PTP message—e.g., timestamp the packet, determine the RTT measurement, execute the synchronization handshake, etc.

Figure 14:
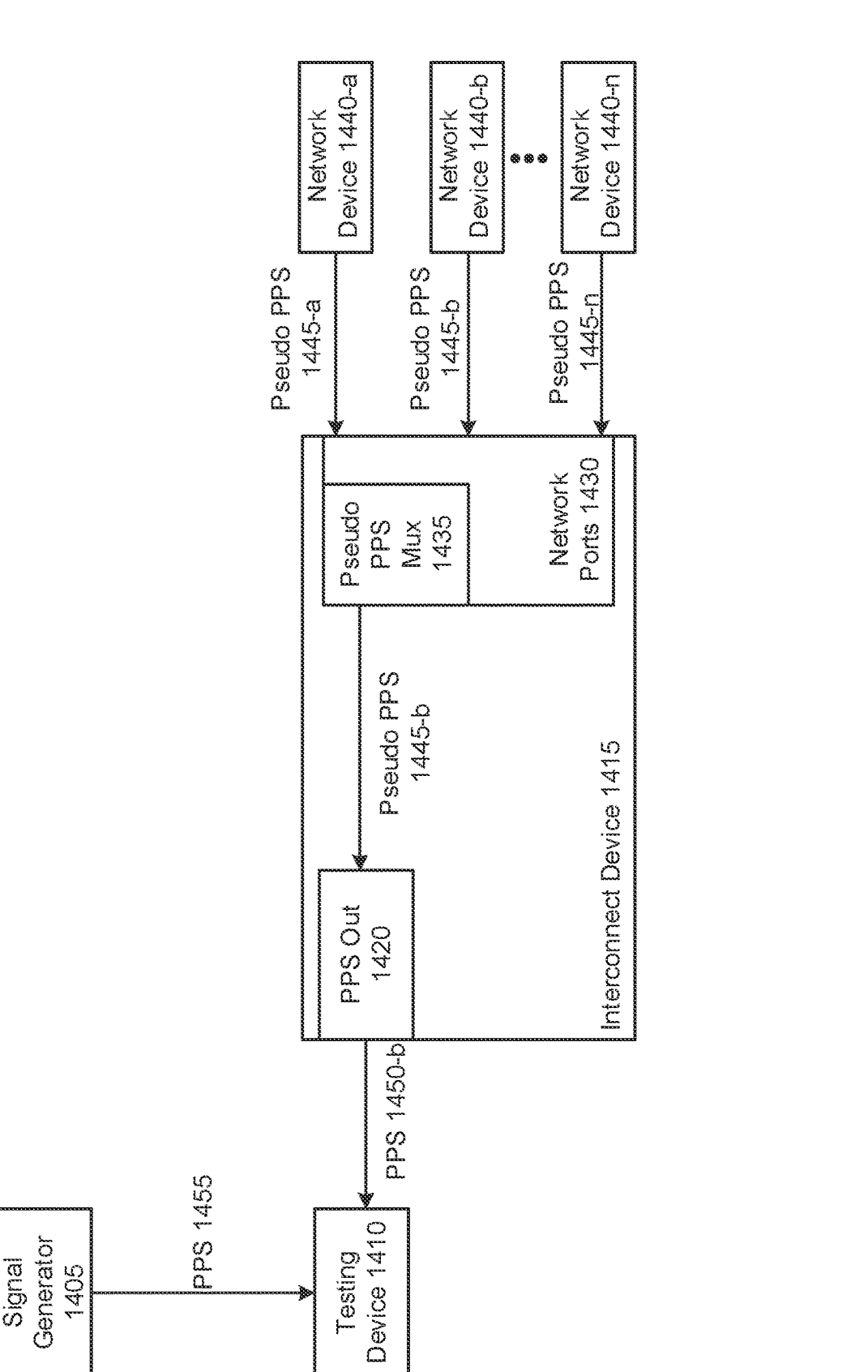
FIG. 14 is an example communication system for time synchronization, in accordance with at least some embodiments.
Figure 15:
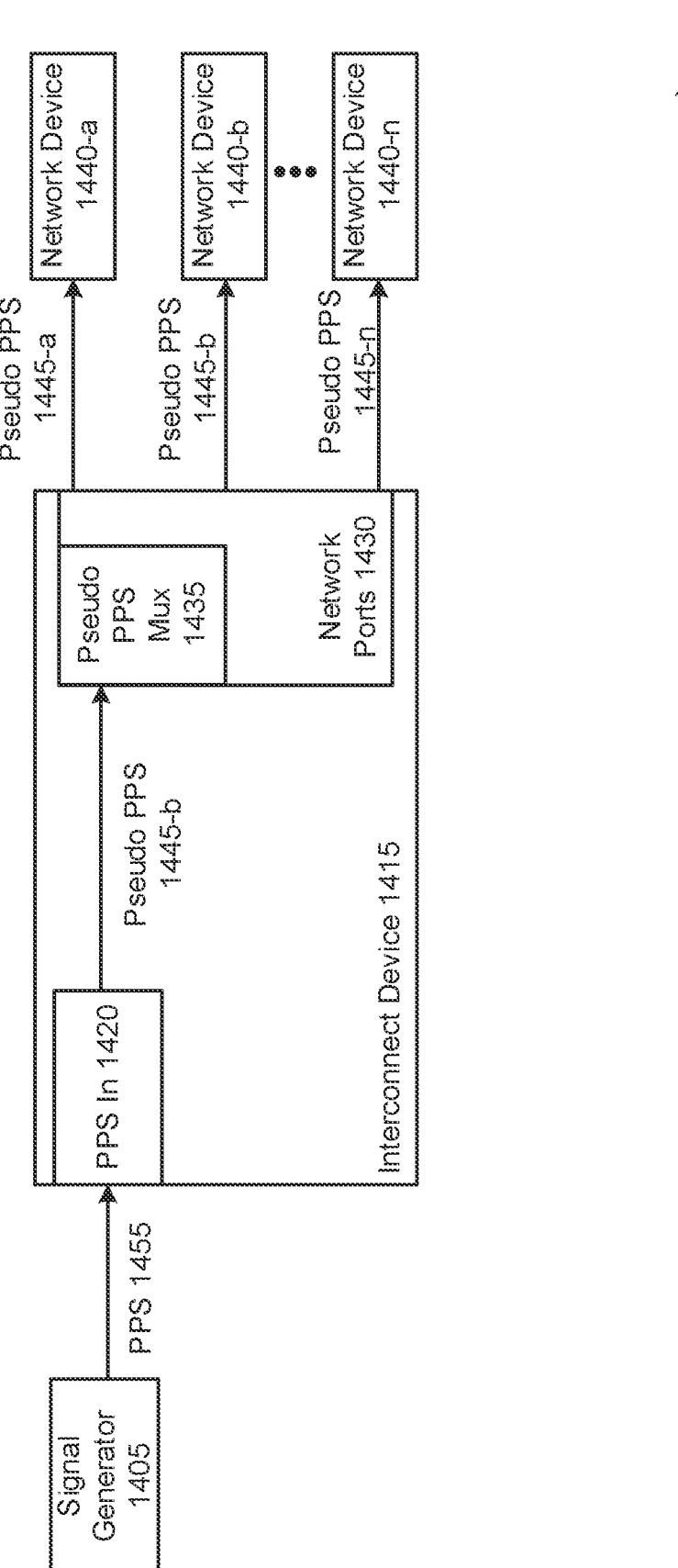
FIG. 15 is an example communication system for time synchronization, in accordance with at least some embodiments.
Figure 16:
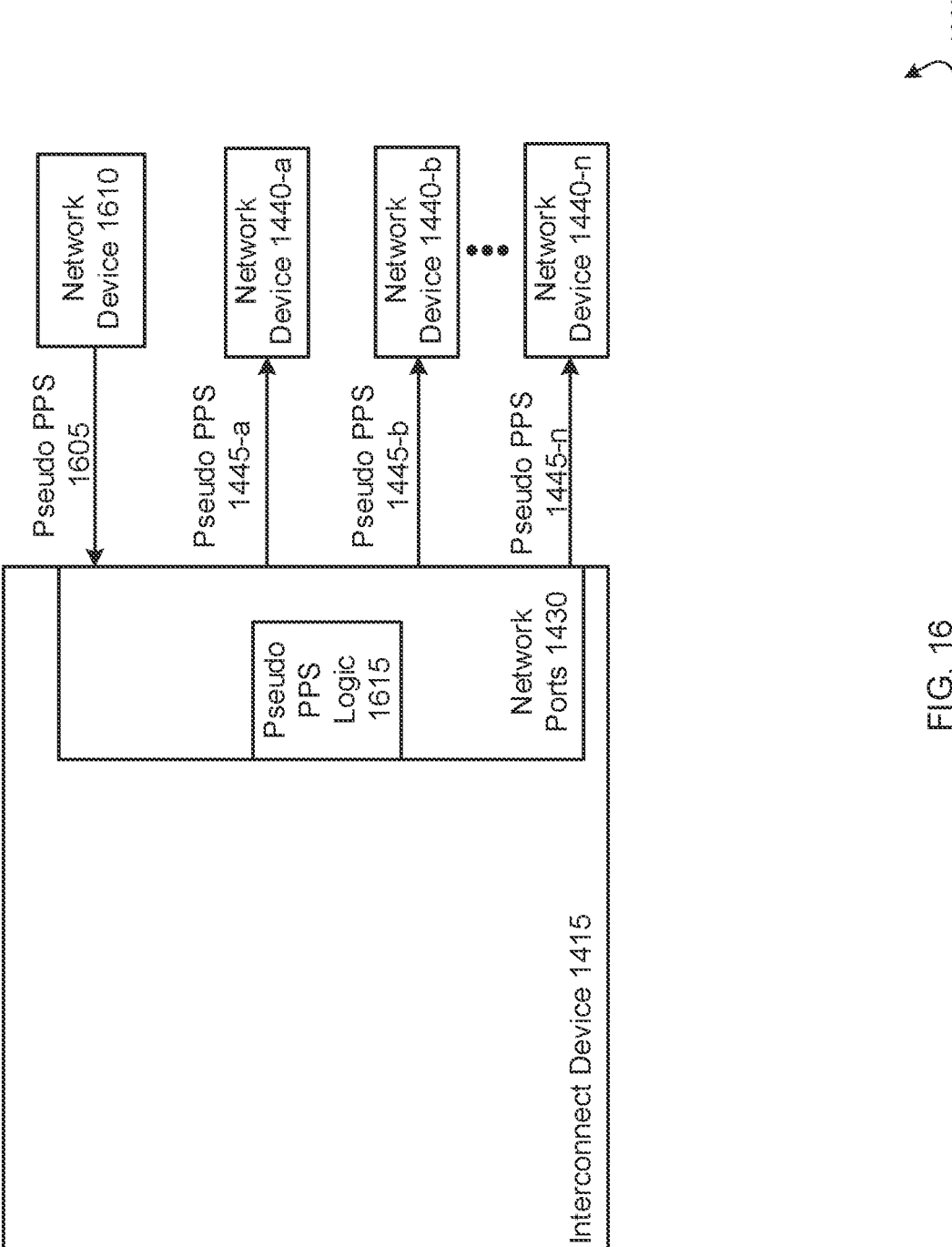
FIG. 16 illustrates an example communication system for time synchronization, in accordance with at least some embodiments.

FIG. 14 illustrates an example communication system 1400 according to at least one example embodiment. The system 1400 includes an interconnect device 1415 (e.g., a network switch, a network adapter, a network interface controller (NIC), any other device coupled with multiple other devices or includes multiple ports, a CPU, or an example of interconnect device 505 as described with reference to FIG. 5) and network devices 1440 (e.g., network devices 1440-*a*, 1440-*b* . . . 1440-*n*), each of which may be an example of network device 520 as described with reference to FIG. 5. In at least one embodiment, the interconnect device 1415 and network devices 1440 can be examples of devices 110 or devices 112 as discussed with reference to FIG. 1. In at least one embodiment, the interconnect device 1415 can include network ports 1430. In one embodiment, the interconnect device 1415 can include a pseudo pulse per second (PPS) multiplexer 1435 in the network ports 1430. In at least one embodiment, the interconnect device 1415 includes a PPS out component 1420. In some embodiments, the interconnect device 1415 can be coupled with a testing device 1410 (e.g., an oscilloscope or PPS analyzer). It should be noted that the testing device 1410 is an optional component. In some embodiments, the testing and comparisons described herein and with reference to FIGS. 15-16, are performed at the interconnect device itself. In at least one embodiment, the testing device 1410 is coupled with a signal generator 1405 (e.g., a global navigation satellite system (GNSS) or GPS receiver, or a node that is accurately synchronized with a precision time protocol (PTP)).

In at least one embodiment, interconnect device 1415 is configured to communicate with one or more network devices 1440. For example, the interconnect device 1415 can include network ports 1430, where each network device 1440 is coupled to a different port of the network ports 1430. In some embodiments, the interconnect device 1415 can be synchronized to a clock with a high level of accuracy (e.g., synchronized to a signal generator 1405 or to a GPS receiver). In at least one embodiment, the interconnect device 1415 is configured to synchronize the network devices 1440 (e.g., the interconnect device 1415 can be a primary time-synchronization device). In such embodiments, the interconnect device 1415 can generate pseudo-PPS signals and transmit one or more pseudo-PPS signals to each network device as described with reference to FIG. 4. In at least one embodiment, the interconnect device 1415 is configured to determine a synchronization quality of network devices 1440. In such embodiments, the interconnect device 1415 can request each network device 1440 periodically transmit pseudo-PPS signals 1445 so that the interconnect device 1415 can monitor a synchronization quality of each network device 1440.

In at least one embodiment, the interconnect device 1415 can facilitate determining a quality of synchronization of a remote network device 1440-*a* compared with a signal generator 1405 (e.g., determine the synchronization of a network device 1440 with a highly accurate analog PPS signal 1455 generated by the signal generator 1405). In such embodiments, the interconnect device 1415 can select a network device 1440 for the synchronization check with the signal generator 1405 or receive instructions to determine a synchronization quality of a respective network device 1440. For example, the interconnect device 1415 can select (e.g., or otherwise receive instructions to select) network device 1440-b for the synchronization quality check. In such embodiments, the interconnect device 1415 can instruct the network device 1440-b to generate a pseudo-PPS signal 1445-b. In at least one embodiment, the request can be a control block with a header '10' and a type that indicates the control block is a request to transmit a pseudo-PPS signal 1445 to compare with the signal generator 1405.

In at least one embodiment, network devices 1440 are configured to generate a control block (e.g., a pseudo-PPS signal 1445) responsive to a request transmitted by the interconnect device 1415—e.g., a request to transmit pseudo-PPS signals 1445 for synchronization quality checks. For example, network device 1440-b is configured to generate a control block that includes the header '10' to indicate the message is a control block and a type 250 to indicate the second control block is associated with a pseudo-PPS signal 1445-b. In some embodiments, the network device 1440-b can generate the second control block to include a third portion of data bits that indicate one of a time of day, a time offset, an RTT measurement, a one-way delay between transmitting a signal from network device 1440-b to interconnect device 1415, and/or any known or unknown inaccuracies respective to the network device 1440-b.

In some embodiments, the pseudo-PPS multiplexer 1435 is configured to receive a PPS signal 1445 from each network device 1440. The pseudo-PPS multiplexer 1435 is configured to select a pseudo-PPS signal 1445 (e.g., pseudo signal 1445-b) from all of the pseudo-PPS signals 1445 received and route the selected PPS signal 1445 to the PPS out component 1420. For example, when the network device 1440-b is selected for the comparison, the pseudo-PPS multiplexer 1435 is configured to route the pseudo-PPS 1445-b received from the network device 1440-b to the PPS out component 1420.

In at least one embodiment, the PPS out component 1420 is configured to receive a pseudo-PPS signal 1445 from the pseudo-PPS multiplexer 1435—e.g., the PPS out component 1420 can receive the pseudo-PPS signal 1445-b from the pseudo-PPS multiplexer 1435. In at least one embodiment, the PPS out component 1420 is configured to trigger a real PPS signal 1450 in accordance with the information received from the pseudo-PPS signal 1445-b. For example, the PPS out component 1420 can receive the pseudo-PPS signal 1445-b and determine a physical delay of transmitting the signal from the network device 1440-b to the interconnect device 1415—e.g., determine incoming data has a header '10' with a type indicating a pseudo-PPS signal and a third portion of bits indicating the one-way delay information. In at least one embodiment, the PPS out component 1420 can also determine a time the pseudo-PPS signal 1445-b is transmitted before an actual second passes or wraparounds from the third portion of bits—e.g., the time the network device 1440-b transmits the pseudo-PPS signal 1445-b before an actual second passes. In at least one embodiment, the PPS out component 1420 can determine when an actual second will pass (e.g., when the second will wraparound) and generate a real PPS signal 1450 based on the calculation: actual wraparound=time pseudo PPS signal

1445-b transmitted–physical delay, where the actual wraparound is how long is left until a second wraparound or pass—e.g., the actual wraparound indicates a time the PPS out component 1420 should wait or before transmitting the real PPS signal 1450. Accordingly, the PPS component 1420 can transmit an actual PPS signal at the actual wraparound—e.g., if the physical delay is 15 nanoseconds and the network device 1440-b transmitted the pseudo-PPS signal 1445-b 100 nanoseconds before the second wraps around (e.g., the time the pseudo-PPS signal 1445-b is transmitted), the PPS out component 1420 can wait for 85 nanoseconds before triggering the real PPS signal 1450-b when the real second wraps around. In at least one embodiment, the PPS out component 1420 can generate a real PPS signal 1450 for any pseudo-PPS signal 1445 received from any of the network devices 1440 using the information in the respective pseudo-PPS signal 1445. This can enable any remote network device 1440-b to be compared with or tested with a PPS signal 1455 from the signal generator 1405.

In at least one embodiment, signal generator 1405 is configured to generate an analog PPS signal 1455 every second. In at least one embodiment, the signal generator 1405 can transmit the PPS signal 1455 to the testing device 1410.

In some embodiments, the testing device 1410 is configured to compare the PPS signal 1455 received from the signal generator 1405 with the PPS signal 1450-b received from the switch. In some embodiments, the testing device 1410 can compare when a real second passes at a respective network device 1440 versus when a real second passes at the signal generator 1405 (e.g., compare when the real second passes at the network device 1440-b to the real second passing at the signal generator 1405). In at least one embodiment, the testing device 1410 can transmit the comparison back to the interconnect device 1415. In such embodiments, the interconnect device 1415 can determine errors or a synchronization quality of the respective network device 1440 upon receiving the comparison (e.g., determine whether a real second passes at a same time at both the signal generator 1405 and network device 1440-b). In at least one embodiment, if the interconnect device 1415 determines a respective network device 1440 is not synchronized with respect to a real second passing at the signal generator 1405, the interconnect device 1415 can resynchronize the respective network device 1440.

FIG. 15 illustrates an example communication system 1500 according to at least one example embodiment. In some embodiments, system 1500 includes components that are examples of components as described with reference to FIG. 14. For example, system 1500 includes an interconnect device 1415 (e.g., a network switch, a network adapter, any other device coupled with multiple other devices, or an example of interconnect device 505 as described with reference to FIG. 5) and network devices 1440 (e.g., network devices 1440-a, 1440-b . . . 1440-n), each of which may be an example of network device 520 as described with reference to FIG. 5. In at least one embodiment, the interconnect device 1415 and network devices 1440 can be examples of devices 110 or devices 112 as discussed with reference to FIG. 1. In at least one embodiment, the interconnect device 1415 can include network ports 1430. In one embodiment, the interconnect device 1415 can include a pseudo pulse per second (PPS) multiplexer 1435 in the network ports 1430. In one embodiment, the interconnect device 1415 can include a PPS in component 1420. In some embodiments, the interconnect device 1415 can be coupled with a signal generator 1405 (e.g., a signal generator, a GPS receiver, a node synchronized with precision time protocol (PTP)).

In at least one embodiment, interconnect device 1415 is configured to communicate with one or more network devices 1440. For example, the interconnect device 1415 can include network ports 1430, where each network device 1440 is coupled to a different port of the network ports 1430. In some embodiments, the interconnect device 1415 can be synchronized to a clock with a high level of accuracy (e.g., synchronized to a signal generator 1405 or to a GPS receiver). In at least one embodiment, the interconnect device 1415 is configured to synchronize the network devices 1440 (e.g., the interconnect device 1415 can be a primary time-synchronization device). In some embodiments, the interconnect device 1415 is configured to synchronize the network devices 1440 to a PPS signal 1455 received from a signal generator 1405. For example, signal generator 1405 is configured to transmit a PPS signal 1455 every second. In at least one embodiment, the signal generator 1405 is configured to transmit the PPS signal 1455 to the interconnect device 1415.

In some embodiments, the interconnect device 1415 can select a network device 1440 to synchronize with the PPS signal 1455 from the signal generator 1405 or receive instructions to select a respective network device 1440. For example, the interconnect device 1415 can select (e.g., or otherwise receive instructions to select) network device 1440-b for synchronization to the signal generator 1405. In at least one embodiment, the PPS in component 1420 is configured to receive the PPS signal 1455 from the signal generator 1405. In at least one embodiment, the PPS in component 1420 can generate a pseudo-PPS signal 1445 for a respective network device 1440 during the synchronization of the respective network device 1440. For example, the PPS in component 1420 can generate a pseudo-PPS signal 1445-b for selected network device 1440-b. For example, the PPS in component 1420 can generate a control block that includes the header '10' to indicate the message is a control block and a type 250 to indicate the control block is associated with a pseudo-PPS signal. In some embodiments, the PPS in component 1420 can generate the control block to include a third portion of data bits that indicate one of a time of day, a time offset, an RTT measurement, a one-way delay for transmitting a signal from interconnect device 1415 to network device 1440-b, a time the PPS signal 1455 is received, and/or any known or unknown inaccuracies respective to the network device 1440-b. In at least one embodiment, the interconnect device 1415 can determine the one-way delay for transmitting a signal from interconnect device 1415 to network device 1440-b by performing a round trip time (RTT) measurement as described with reference to FIG. 3.

In at least one embodiment, the pseudo-PPS multiplexer 1435 is configured to route a received pseudo-PPS signal 1445 from the PPS in component 1420 to a respective network device 1440-b. For example, the pseudo-PPS multiplexer 1435 can route the pseudo-PPS signal 1445-b generated by the PPS in component 1420 to the network device 1440-b.

In at least one embodiment, network devices 1440 are configured to receive respective pseudo-PPS signals 1445 and synchronize their clocks accordingly. For example, network device 1440-b can receive data and determine the data is a control block associated with a pseudo-PPS signal based on receiving the header '10' and a type 250 indicating the control block is associated with a pseudo-PPS signal 1445-b. In some embodiments, the network device 1440-b can receive a third portion of data bits in the control block that indicates one of a time of day, a time offset, an RTT measurement, a one-way delay for transmitting a signal from interconnect device 1415 to network device 1440-b, a time the PPS signal 1455 is received, and/or any known or unknown inaccuracies respective to the network device 1440-b. In at least one embodiment, the network device 1440-b can synchronize its clock based on receiving the time the PPS signal 1455 is received, the one-way delay for transmitting a signal from interconnect device 1415 to network device 1440-b, and any known inaccuracies. For example, the network device 1440-b can determine the PPS signal 1455 was received at 7:00:01, and there is a physical delay of 15 nanoseconds for transmitting the signal from the interconnect device 1415 to the network device 1440-b. Accordingly, the network device 1440-b can synchronize its clock (e.g., synchronize the clock to 7:00:01 plus the physical delay (e.g., and plus any indicated for processing the PPS signal 1455 at the interconnect device 1415 as indicated in the pseudo-PPS signal 1445-b)). By using the control blocks and pseudo-PPS signal 1445, the system 1500 can synchronize a remote network device 1440 to a signal generator 1405.

FIG. 16 illustrates an example communication system 1600 according to at least one example embodiment. In some embodiments, system 1600 includes components that are examples of components as described with reference to FIG. 14. For example, system 1600 includes an interconnect device 1415 (e.g., a network switch, a network adapter, any other device coupled with multiple other devices, or an example of interconnect device 505 as described with reference to FIG. 5) and network devices 1440 (e.g., network devices 1440-a, 1440-b . . . 1440-n), each of which may be an example of network device 520 as described with reference to FIG. 5. In at least one embodiment, the interconnect device 1415 and network devices 1440 can be examples of devices 110 or devices 112 as discussed with reference to FIG. 1. In at least one embodiment, the interconnect device 1415 can include network ports 1430. In one embodiment, the interconnect device 1415 can include a pseudo pulse per second (PPS) logic 1615 in the network ports 1430. In one embodiment, the interconnect device 1415 can be coupled with network device 1610.

In at least one embodiment, interconnect device 1415 is configured to communicate with one or more network devices 1440. For example, the interconnect device 1415 can include network ports 1430, where each network device 1440 is coupled to a different port of the network ports 1430. In at least one embodiment, the interconnect device 1415 is configured to synchronize the network devices 1440 (e.g., the interconnect device 1415 can be a primary time-synchronization device to network devices 1440). In some embodiments, the interconnect device 1415 can be coupled with a network device 1610. In at least one embodiment, the network device 1610 can have a clock that is more accurate than a clock of the interconnect device 1415. For example, network device 1610 can have a more accurate oscillator than the interconnect device 1415. In some embodiments, the network device 1610 can be an example of a signal generator (e.g., signal generator 1405) or a GPS receiver. In either embodiment, the interconnect device 1415 can be configured to be synchronized with respect to the network device 1610. In such embodiments, the interconnect device 1415 can be a secondary device on one of its network ports 1430—e.g., a secondary device to network device 1610. Accordingly, the interconnect device 1415 can be an example of a boundary clock (e.g., a secondary device on one port and a primary time-synchronization device on the remaining ports).

In at least one embodiment, network device 1610 is configured to synchronize the interconnect device 1415. In at least one embodiment, the network device 1610 is configured to generate a first control block comprising synchronization information for the interconnect device 1415. For example, network device 1610 is configured to generate the first control block (e.g., pseudo-PPS signal 1605) to include the header '10' to indicate the message is a control block and a type 250 to indicate the first control block is associated with a pseudo-PPS signal. In some embodiments, the network device 1610 can generate the first control block to include a third portion of data bits that indicate one of a time of day, a time offset, an RTT measurement, and/or any known or unknown inaccuracies respective to the network device 1610. In some embodiments, the network device 1610 can communicate with the interconnect device 1415 using a precision time protocol (PTP). In that, the network device 1610 can synchronize the interconnect device 1415 using the control blocks via the physical layer, the PTP, or a combination thereof.

In at least one embodiment, interconnect device 1415 is configured to synchronize its clock to network device 1610 based on receiving the pseudo-PPS signal 1605. For example, the interconnect device 1415 can receive data and determine the incoming data has a header '10' (e.g., is a control block) with a type indicating a pseudo-PPS signal (e.g., the pseudo-PPS signal 1605). In at least one embodiment, the interconnect device 1415 can also determine a third portion of bits indicating the time of day, a time offset, an RTT measurement, and/or any known or unknown inaccuracies respective to the network device 1610. In at least one embodiment, the interconnect device 1415 can use the information to synchronize its clock as described with reference to FIG. 4—e.g., the interconnect device 1415 can use the time of day, a time offset, an RTT measurement, and/or any known or unknown inaccuracies respective to the network device 1610 to synchronize its clock.

In at least one embodiment, the interconnect device 1415 is configured to synchronize the network devices 1440 after the switch is synchronized with the network device 1610. For example, the pseudo-PPS logic 1615 can generate pseudo-PPS signals 1445 to synchronize each respective network device 1440. For example, the pseudo-PPS logic 1615 can generate a pseudo-PPS signal 1445-*a* to synchronize network device 1440-*a*. In at least one embodiment, the interconnect device 1415 can generate second control blocks (e.g., pseudo-PPS signals 1445) to include the header '10' to indicate the message is a control block and a type 250 to indicate the second control block is associated with a pseudo-PPS signal. In some embodiments, the network device 1610 can generate the second control block to include a third portion of data bits that indicate one of a time of day, a time offset, an RTT measurement, and/or any known or unknown inaccuracies respective to the interconnect device 1415. In some embodiments, the interconnect device 1415 can communicate with the network devices 1445 using a precision time protocol (PTP). In that, the interconnect device 1415 can synchronize the network devices 1440 using the control blocks via the physical layer, the PTP, or a combination thereof.

In at least one embodiment, network devices 1440 are configured to synchronize their clocks to interconnect device 1415 based on receiving respective pseudo-PPS signals 1445. For example, each network device 1440 can receive data and determine the incoming data has a header '10' (e.g., is a control block) with a type indicating a pseudo-PPS signal (e.g., the respective pseudo-PPS signal 1445). In at least one embodiment, the network device 1440 can also determine a third portion of bits indicating the time of day, a time offset, an RTT measurement, and/or any known or unknown inaccuracies respective to the interconnect device 1415. In at least one embodiment, each network device 1440 can use the information to synchronize its clock as described with reference to FIG. 4—e.g., each network device 1440 can use the time of day, a time offset, an RTT measurement, and/or any known or unknown inaccuracies respective to the interconnect device 1415 to synchronize its clock.

FIG. 17 illustrates an example communication system 1700 according to at least one example embodiment. In some embodiments, system 1700 includes components that are examples of components as described with reference to FIG. 14. For example, system 1700 includes an interconnect device 1415 (e.g., a network switch, a network adapter, any other device coupled with multiple other devices, or an example of interconnect device 505 as described with reference to FIG. 5) and network devices 1440 (e.g., network devices 1440-*a*, 1440-*b* . . . 1440-*n*), each of which may be an example of network device 520 as described with reference to FIG. 5. In at least one embodiment, the interconnect device 1415 and network devices 1440 can be examples of devices 110 or devices 112 as discussed with reference to FIG. 1. In at least one embodiment, the interconnect device 1415 can include network ports 1430. In one embodiment, the interconnect device 1415 can include a pseudo pulse per second (PPS) logic 1615 in the network ports 1430.

In at least one embodiment, interconnect device 1415 is configured to communicate with one or more network devices 1440. For example, the interconnect device 1415 can include network ports 1430, where each network device 1440 is coupled to a different port of the network ports 1430. In some embodiments, an operation (e.g., data transfer) can require a first network device 1440 to be synchronized with a second network device 1440. In such embodiments, the interconnect device 1415 is configured to facilitate synchronizing the first network device 1440 to a second network device 1440. For example, the interconnect device 1415 can facilitate a synchronization of remote network device 1440-*n* to remote network device 1440-*a*.

To synchronize the network device 1440-*n* to network device 1440-*a*, the network device 1440-*a* is configured to generate a first control block (e.g., a pseudo-PPS signal 1705). For example, the network device 1440-*a* can generate the first control block to include the header '10' to indicate the message is a control block and a type 250 to indicate the first control block is associated with a pseudo-PPS signal (e.g., pseudo-PPS signal 1705). In some embodiments, the network device 1440-*a* can generate the first control block to include a third portion of data bits that indicate one of a time of day, a time offset, an RTT measurement, and/or any known or unknown inaccuracies respective to the network device 1440-*a*, and instructions that the pseudo-PPS signal 1705 is to synchronize network device 1440-*n*. In at least an embodiment, the network device 1440-*a* is configured to transmit the pseudo-PPS signal 1705 to the interconnect device 1415.

In at least some embodiments, the interconnect device 1415 can receive data and determine the incoming data has a header '10' (e.g., is a control block) with a type indicating a pseudo-PPS signal (e.g., the pseudo-PPS signal 1705). In at least one embodiment, interconnect device 1415 can determine a third portion of bits indicating the time of day, a time offset, an RTT measurement, and/or any known or unknown inaccuracies respective to the network device 1440-*a*, and that the control block is for the network device 1440-*n*. In at least one embodiment, the pseudo-PPS logic 1615 can generate a second control block that includes the information of the pseudo-PPS signal 1705. In some embodiments, the pseudo-PPS logic 1615 can also generate the second control block to include a one-way delay of transmitting a message to network device 1440-*n*. In some embodiments, the interconnect device 1415 can generate the second control block to also include an amount of time it took to process the pseudo-PPS signal 1705 and generate the pseudo-PPS signal 1710. For example, the interconnect device 1415 can generate the second control block to include the header '10' to indicate the message is a control block and a type 250 to indicate the second control block is associated with a pseudo-PPS signal (e.g., pseudo-PPS signal 1710). In some embodiments, the interconnect device 1415 can generate the second control block to include a third portion of data bits that indicate one of a time of day, a time offset, an RTT measurement, and/or any known or unknown inaccuracies respective to the network device 1440-*a*, the one-way delay of transmitting the signal from interconnect device 1415 to network device 1440-*n*, and an amount of time the interconnect device 1415 took to process the pseudo-PPS signal 1705. In at least an embodiment, the interconnect device 1415 is configured to transmit the pseudo-PPS signal 1710 to the network device 1440-*n*.

In at least some embodiments, the network device 1440-*n* can receive data and determine the incoming data has a header '10' (e.g., is a control block) with a type indicating a pseudo-PPS signal (e.g., the pseudo-PPS signal 1710). In at least one embodiment, the network device 1140 can also determine a third portion of data bits that indicate one of a time of day, a time offset, an RTT measurement, and/or any known or unknown inaccuracies respective to the network device 1440-*a*, the one-way delay of transmitting the signal from interconnect device 1415 to network device 1440-*n*, and an amount of time the interconnect device 1415 took to process the pseudo-PPS signal 1705. In at least one embodiment, the network device 1440-*n* is configured to synchronize its clock according to the information received in the pseudo-PPS signal 1710. For example, the network device 1440-*n* can determine an amount of delay for transmitting a signal between the network device 1440-*a* and network device 1440-*n* by determining an amount of time it took for the message to travel between the network device 1440-*a* and network device 1440-*n* and subtracting the amount of time the interconnect device 1415 took to process the pseudo-PPS signal 1705. By transmitting the control blocks in the physical layer, the system 1700 can synchronize two remote network devices 1440 with each other.

Figure 18:
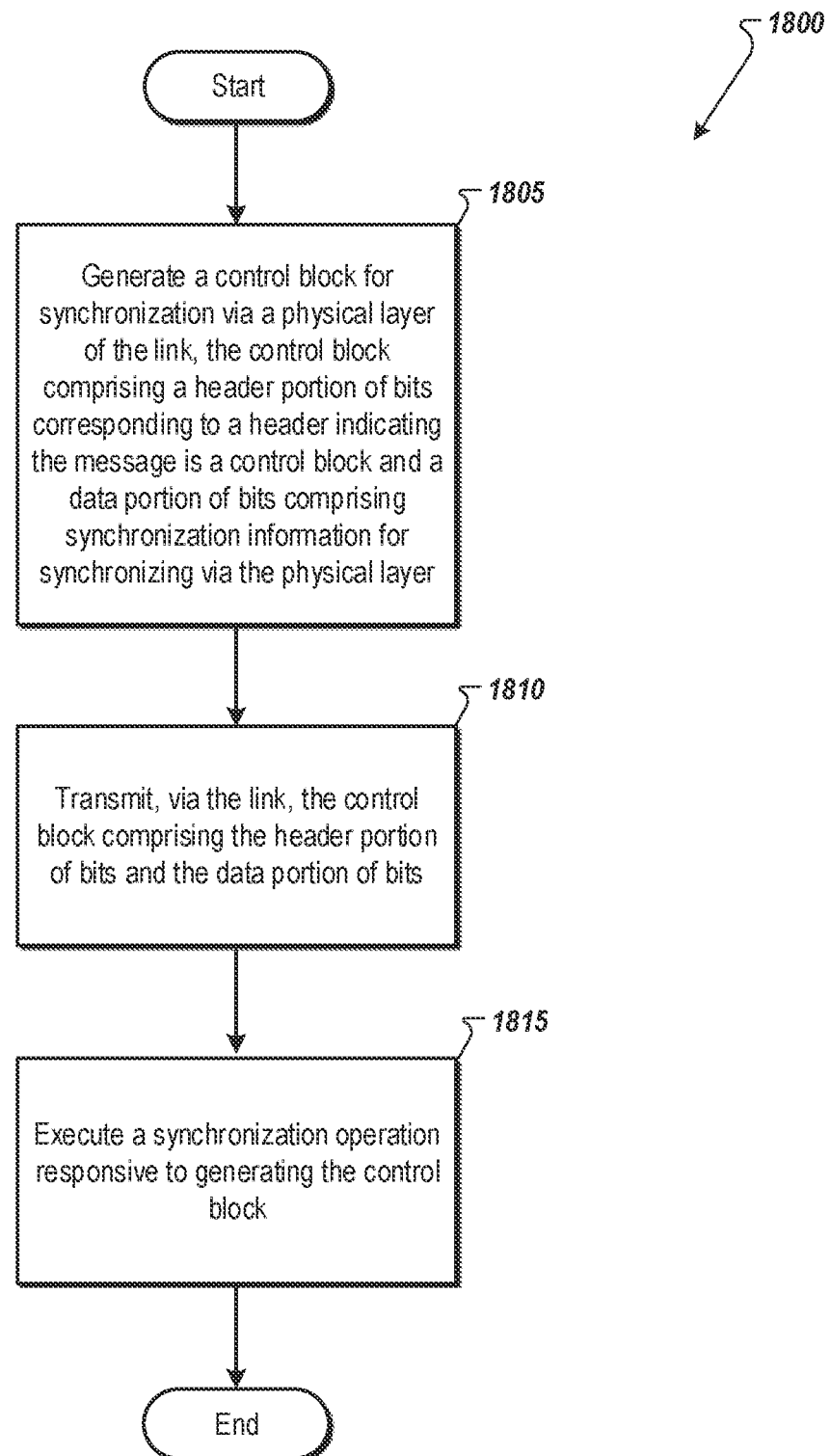
FIG. 18 illustrates an example method for synchronization via a physical layer, in accordance with at least some embodiments.

FIG. 18 illustrates a flow diagram of a method 1800 for synchronization via the physical layer. The method 1800 can be performed by processing logic comprising hardware, software, firmware, or any combination thereof. In at least one embodiment, the method 1800 is performed by the device 110 or device 112 of FIG. 1, a interconnect device 505 or network device 520 as described with reference to FIG. 5, or by interconnect device 1415 and network devices 1440 as described with reference to FIG. 14. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 1805, processing logic can generate, at a device coupled to a link and comprising a transmitter, a control block for synchronization via a physical layer of the link, the control block including a first portion of bits corresponding to a header indicating the message is a control block (e.g., a header '10' as described with reference to FIG. 2) and a second portion of bits including synchronization information for synchronizing via the physical layer (e.g., a type 250 or the data portion 265 as described with reference to FIG. 2). In at least one embodiment, the link (e.g., communication channel 108) is an example of at least one of a peripheral component interconnect express (PCIe) link, Ethernet link, universal serial bus (USB) link, universal flash storage (UFS) link, an InfiniBand (IB) link, an NVLink, a display port, or a high-definition multimedia interface (HDMI). In at least one embodiment, the control block includes a third portion of bits indicating a type of control information. In at least one embodiment, either the data portion of bits or the type portion of bits indicates at least one of a time, phase, or frequency of a clock of the device. In at least one embodiment, the time portion of bits indicates a time of day or an indication of an amount of time elapsed—e.g., an amount of time elapsed since a round second.

At operation 1810, processing logic can transmit, via the link, the control block comprising the first portion of bits and the second portion of bits. In some embodiments, the device can transmit one or more data packets, each data packet comprising a plurality of data blocks (e.g., data blocks 205 as described with reference to FIG. 2), where each data block of the plurality of data blocks comprises a second set of bits corresponding to a second header indicating the message is a data block—e.g., a header '01' as described with reference to FIG. 2. In some embodiments, the processing logic can interleave the control block for the synchronization of the physical layer during transmission of the one or more data packets. For example, the processing logic can transmit a control block in between transmitting data blocks of the data packet—e.g., briefly pause data packet transmission to transmit the control block.

At operation 1815, the processing logic is to execute a synchronization operation responsive to generating the control block. In some embodiments, the type portion of bits indicates to perform a round trip time (RTT) measurement. In such embodiments, the second portion of bits indicates a first time and a first delay. As described with reference to FIG. 2, the processing log can transmit a control block to initiate an RTT measurement to determine a time it takes for a signal to travel between the device and a second device (e.g., device 112). In such embodiments, the device can receive second data via the link after transmitting the control block. In at least one embodiment, the processing logic can determine the second data is a second control block comprising a third portion of bits indicating a second time, a third time, and a fourth time associated with transmission of the second data responsive to receiving the second data—e.g., the processing logic can determine the data is associated with a control block based on receiving a header '10.' In at least one embodiment, the processing logic can determine the RTT measurement based at least in part on the first time, the second time, the third time, and the fourth time—e.g., based on the first time the control block is transmitted, a second time the control block is received by the second device, a third time the control block is transmitted by the second device (e.g., or a time the second device took to process the control block), and the fourth time when the second control block is received by the device. In at least one embodiment, the processing logic can adjust a clock associated with the device responsive to determining the RTT measurement—e.g., adjust the clock to synchronize with the second device as described with reference to FIG. 3.

In at least one embodiment, the type portion of bits indicates the control block is a pseudo pulse per second (pseudo-PPS) signal—e.g., the processing logic can transmit pseudo-PPS signals as described with reference to FIG. 4. In at least one embodiment, the type portion of bits indicates inaccuracies associated with transmitting the pseudo-PPS signal. In at least one embodiment, the processing logic can transmit one or more second control blocks one or more times per second—e.g., the processing logic can transmit additional pseudo-PPS signals one or more times per second. In at least one embodiment, the second portion of bits indicates a time of day (TOD) and a delay offset. In some embodiments, the second portion of bits further comprise round trip time (RTT) measurement, a second delay offset, or an error range associated with the pseudo-PPS—e.g., the processing logic can include a time of day, a time offset, an RTT measurement, and/or any known or unknown inaccuracies respective to the device as described with reference to FIG. 4. In at least some embodiments, processing logic can receive third data comprising the first portion of bits, a second portion of bits, and a fourth portion of bits. The processing logic can process the third data and determine the third data is associated with a control block based on header '10.' In some embodiments, processing logic can determine a quality of synchronization of the device responsive to receiving the third data. For example, the processing logic can receive a pseudo-PPS signal and determine a quality of synchronization responsive to receiving the pseudo-PPS signal.

In at least one embodiment, the device includes one or more links and is coupled with one or more additional devices. In such embodiments, the processing logic is to receive, from each device of the one or more additional devices, a fourth data comprising the first portion of bits, the third portion of bits, and a fifth portion of bits indicating a third TOD and a third delay offset of each respective one or more additional devices. In some embodiments, the processing logic is to determine a quality of synchronization of each device of the one or more additional devices responsive to receiving the fourth data. That is, the processing logic can receive fourth data and determine the fourth data is a control block with a header '10' and associated with a pseudo-PPS signal based on the third portion of bits indicating the type. In at least one embodiment, the pseudo-PPS signal from each device can include their respective delay offsets. In such embodiments, the processing logic can determine the synchronization quality of each device as described with reference to FIG. 5.

In some embodiments, the processing logic can determine delay information associated with each device of the one or more additional devices. In at least one embodiment, the processing logic can determine the delay information associated with each device of the one or more additional devices is substantially similar—e.g., the processing logic can determine the delay at each device of the one or more additional devices is the same as described with reference to FIG. 7. In such embodiments, the processing logic can determine its own internal clock is asynchronous. Accordingly, the processing logic can adjust a first clock responsive to determining that each delay associated with each device is substantially similar—e.g., the processing logic can adjust its internal clock based on determining that the device is asynchronous. In at least one embodiment, the processing logic can synchronize itself with the one or more additional devices as described with reference to FIG. 9. For example, the processing logic can determine a synchronized time from each pseudo-PPS signal (e.g., fourth data) received from the one or more additional devices. In some embodiments, the processing logic can determine the synchronized time by determining an average offset of the pseudo-PPS signals received. In at least one embodiment, the processing logic can use the determined synchronized time for a duration until the device is resynchronized—e.g., the processing logic can use the ensemble timing solution generated from the received pseudo-PPS signals temporarily until the device is resynchronized. In at least one embodiment, the processing logic can provide an indication to an application layer that the first clock is unsynchronized, responsive to determining that each delay associated with each device is substantially similar—e.g., the processing logic can inform a precision time protocol (PTP) layer of the device that the device is asynchronous. For example, the device can determine a time substantially synchronous with the one or more additional devices and adjust the first clock to the time. In some embodiments, the processing logic can transmit one or more timestamps to the application layer, wherein the application layer determines whether the device is synchronized or unsynchronized. In some embodiments, the device can transmit a second indication that one or more of the additional devices are unsynchronized.

Figure 19:
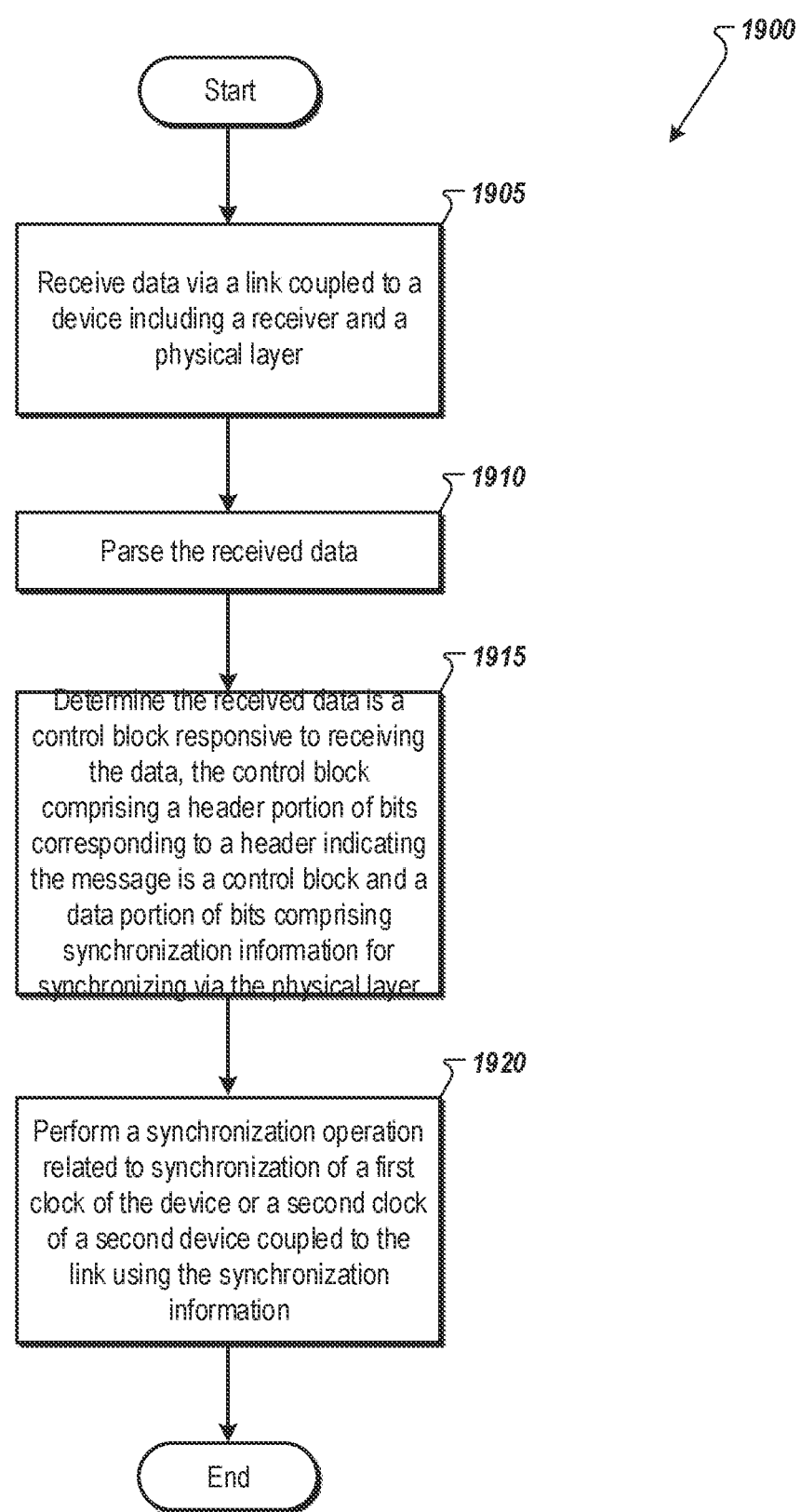
FIG. 19 illustrates an example method for synchronization via a physical layer, in accordance with at least some embodiments.

FIG. 19 illustrates a flow diagram of a method 1900 for synchronization via the physical layer. The method 1900 can be performed by processing logic comprising hardware, software, firmware, or any combination thereof. In at least one embodiment, the method 1900 is performed by the device 110 or device 112 of FIG. 1, an interconnect device 505 or network device 520 as described with reference to FIG. 5, or by interconnect device 1415 and network devices 1440 as described with reference to FIG. 14. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 1905, processing logic can receive data via a link coupled to a device, including a receiver and a physical layer.

At operation 1910, processing logic can parse the received data.

At operation 1915, processing logic can determine received data is a control block including a first portion of bits corresponding to a header indicating the control block is a control block and a second portion of bits including synchronization information for synchronizing via the physical layer—e.g., the processing logic can receive a header '10' and either a type 250 or data portion 265. In at least one embodiment, the control block further comprises a third portion of bits indicating a type of control information. In at least one embodiment, the processing logic can determine a control type associated with the control block responsive to receiving the third portion of bits, where the device is to perform the synchronization operation responsive to determining the control type.

At operation 1920, the processing logic can perform a synchronization operation related to synchronization of a first clock of the device or a second clock of a second device coupled to the link using the synchronization information. For example, the processing logic can receive a control block indicating to perform an RTT measurement as described with reference to FIG. 3. In such embodiments, the processing logic can determine a second time associated with receiving the control block. In some embodiments, the processing logic can also determine a third time to process the control block. In such embodiments, the processing logic can generate a second control block to respond to the control block received, where the second control block includes the information for completing the RTT measurement. For example, the processing logic can transmit a second control block comprising the first portion of bits indicating the second message is a second control block and comprising a third portion of bits indicating the second time, third time, and a fourth time associated with transmitting the second control block.

In at least one embodiment, the processing logic can determine the control block is associated with a pseudo pulse per second (PPS) signal—e.g., the processing logic can determine the type of the control block that indicates the control block is a pseudo-PPS signal. In at least one embodiment, the processing logic can receive one or more additional control blocks—e.g., one or more additional pseudo-PPS signals with a header '10' and a type indicating the control block is a pseudo-PPS signal. In such embodiments, the additional one or more control blocks are received one or more times per second—e.g., the pseudo-PPS signal is received one or more times per second. In at least one embodiment, the processing logic is to synchronize the first clock or the second clock of the second device responsive to receiving data corresponding to one or more additional control blocks.

In at least one embodiment, the processing logic can transmit a third control block comprising the first portion of bits and a third portion of bits indicating the control block is a pseudo-PPS signal. For example, the processing logic can generate a control block with a header '10' and a type indicating the control block is a pseudo-PPS signal. In some embodiments, the processing logic can transmit a second control block, including the first portion of bits, to a second device.

In some embodiments, the second portion of bits indicates a time of day (TOD) and a delay offset. In at least one embodiment, the processing logic can transmit a second control block comprising a third portion of bits indicating a second TOD and a second delay offset. For example, the processing logic can generate another pseudo-PPS signal to transmit to the second device. In such embodiments, the processing logic can generate a control block with a synchronized header '10' indicating the message is a control block and a type indicating the message is a pseudo pulse per second signal.

In at least one embodiment, the processing logic can record a timestamp associated with receiving the data. In some embodiments, the processing logic can record a plurality of timestamps associated with receiving a plurality of data, each data comprising the first portion of bits and a third portion of bits indicating the data corresponds to a control block that is a pseudo pulse per second (pseudo-PPS) signal. In such embodiments, the processing logic can transmit the plurality of timestamps to an application layer. In some embodiments, the processing logic can synchronize the second clock in response to transmitting the plurality of timestamps to the application layer. For example, the processing logic can timestamp a control block like a PTP message as described with reference to FIG. 10. In some embodiments, the device includes a first component. In such embodiments, the first component is to receive a pulse per second signal (PPS) from a global navigation satellite system. In some embodiments, the processing logic can receive the plurality of timestamps and adjust the first clock responsive to receiving the PPS and the plurality of timestamps. For example, the processing logic can adjust the first clock to reduce a frequency of the first clock. In that, the processing logic can use the timestamps to improve the accuracy of the first clock—e.g., request a resynchronization and receive a PPS signal from a signal generator. For example, the processing logic can adjust the first clock by adjusting a time of the first clock.

In some embodiments, the processing logic can determine the data is a control block by determining a first bit of the data has a first value indicating the data includes at least one control block (e.g., the header 210-*e* as described with reference to FIG. 2B and the 256*b*/256*b* line encoding scheme). In such embodiments, the processing logic can determine a second value for a second portion of bits, the second portion of bits indicating blocks of the data that are control blocks (e.g., the indicator 270 as described with reference to FIG. 2B).

FIG. 20 illustrates a flow diagram of a method 2000 for synchronization via the physical layer. The method 2000 can be performed by processing logic comprising hardware, software, firmware, or any combination thereof. In at least one embodiment, the method 2000 is performed by a device 110 or device 112 of FIG. 1, an interconnect device 505 or network device 520 as described with reference to FIG. 5, or by interconnect device 1415 and network devices 1440 as described with reference to FIG. 14. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 2005, processing logic generates a first control block for synchronization via a physical layer of a link coupled to a device, the first control block including a first portion of bits corresponding to a header indicating the message is a control block and a type portion of bits indicating to perform a synchronization handshake—e.g., a synchronization handshake as described with reference to FIG. 11. In at least one embodiment, the first control block further comprises a third portion of bits corresponding to a time of day (TOD).

At operation 2010, the processing logic transmits, via the link, the first control block, including the first portion of bits and the second portion of bits.

At operation 2015, the processing logic executes the synchronization handshake. For example, the processing logic can receive data and parse the data. In at least one embodiment, the processing logic can determine the received data is a second control block (e.g., delay request) responsive to receiving the data—e.g., the processing logic can determine the message has a header '10' indicating the message is a control block. In some embodiments, the processing logic can store the third timestamp associated with receiving the data. In at least one embodiment, the processing logic can generate a third control block for the synchronization handshake via the physical layer, the third control block comprising the header portion and a time portion indicating the third timestamp—e.g., the device can generate a control block with a header '10' indicating the message is a control block and include a type indicating the message is a delay response. In some embodiments, the processing logic can transmit the third control block to a second device.

In at least one embodiment, the processing logic can receive, at a driver coupled to an application layer and the physical layer, a request to perform a synchronization handshake, where the request conforms to a first format. In some embodiments, the processing logic can update, at the driver, the request from the first format to a second format different than the first format. In at least one embodiment, the processing logic can generate the first control block responsive to updating the request from the first format to the second format. For example, the processing logic can convert a PTP message to the control block as described with reference to FIGS. 12 and 13.

Figure 21:
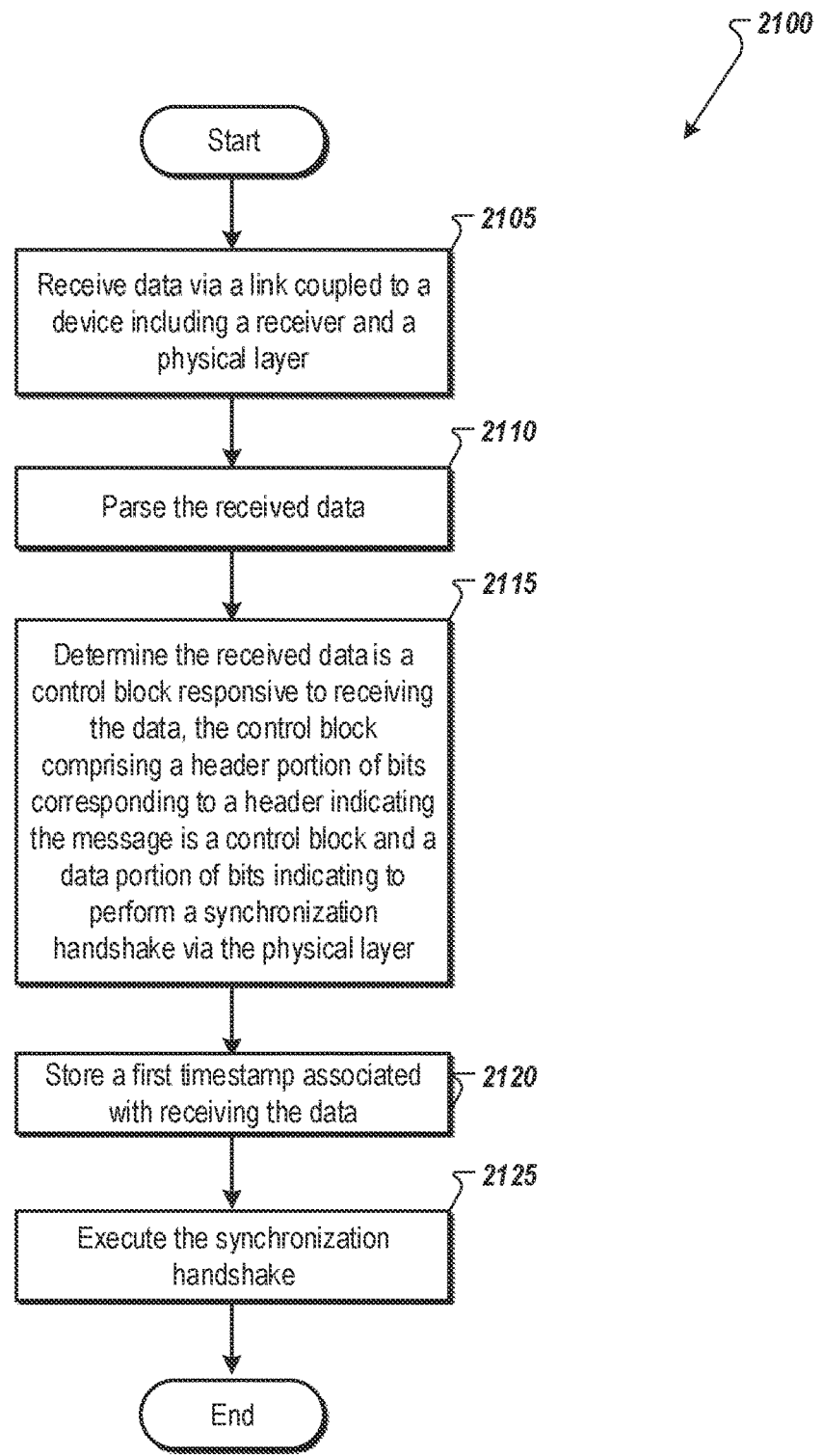
FIG. 21 illustrates an example method for synchronization via a physical layer, in accordance with at least some embodiments.

FIG. 21 illustrates a flow diagram of a method 2100 for synchronization via the physical layer. The method 2100 can be performed by processing logic comprising hardware, software, firmware, or any combination thereof. In at least one embodiment, the method 2100 is performed by a device 110 or device 112 of FIG. 1, an interconnect device 505 or network device 520 as described with reference to FIG. 5, or by interconnect device 1415 and network devices 1440 as described with reference to FIG. 14. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 2105, the processing logic is to receive data via a link coupled to a device, including a receiver and a physical layer.

At operation 2110, the processing logic is to parse the received data.

At operation 2115, the processing logic is to determine the received data is a control block responsive to receiving the data, the control block comprising a header portion of bits corresponding to a header indicating the control block is a control block and a type portion of bits indicating to perform a synchronization handshake via the physical layer.

At operation 2120, the processing logic is to store a first time stamp associated with receiving the data.

At operation 2125, the processing logic is to execute the synchronization handshake. For example, the processing logic is to generate a second control block comprising the first portion of bits and a third portion of bits indicating the first timestamp and a second timestamp corresponding to storing the first timestamp—e.g., the processing logic can generate a delay request as described with reference to FIG. 11. In at least one embodiment, the processing logic receives second data. In some embodiments, the processing logic is to parse the second data. In at least one embodiment, the processing logic can determine the second data is a third control block responsive to receiving the data, the third control block comprising the header portion of bits and a time portion of bits indicating a third timestamp corresponding to a second device receiving the second control blocks. In some embodiments, the processing logic can store a fourth timestamp associated with receiving the second data.

In at least one embodiment, the processing logic can execute the synchronization handshake responsive to storing the fourth timestamp. In some embodiments, the processing logic can execute the synchronization handshake by setting a time, adjusting a time, adjusting a phase, or adjusting a frequency. In at least one embodiment, the processing logic can perform the execution of the synchronization handshake at a software application layer of the device. In some embodiments, the processing logic can determine a delay and offset as described with reference to FIG. 11. For example, the first control block comprises a fifth portion indicating a fourth timestamp associated with transmitting the first control block. In such embodiments, the processing logic determines a first difference between the fourth timestamp and the first timestamp. In at least one embodiment, the processing logic can determine a second difference between the third timestamp and the second timestamp. In some embodiments, the processing logic can determine a delay associated with a first clock of the device by determining an average of the first difference and the second difference. In at least one embodiment, the processing logic can determine an offset associated with the first clock by determining a difference between the first timestamp, the fourth timestamp, and the delay.

In some embodiments, the processing logic can convert, at a driver of the device, the control block into a response having a first format different than a second format associated with the control block. In at least one embodiment, the processing logic can transmit, via the driver, the response to an application layer of the device responsive to converting the control block into the response having the first format—e.g., processing logic can convert the control block to a precision time protocol (PTP) message as described with reference to FIGS. 12 and 13.

Figure 22:
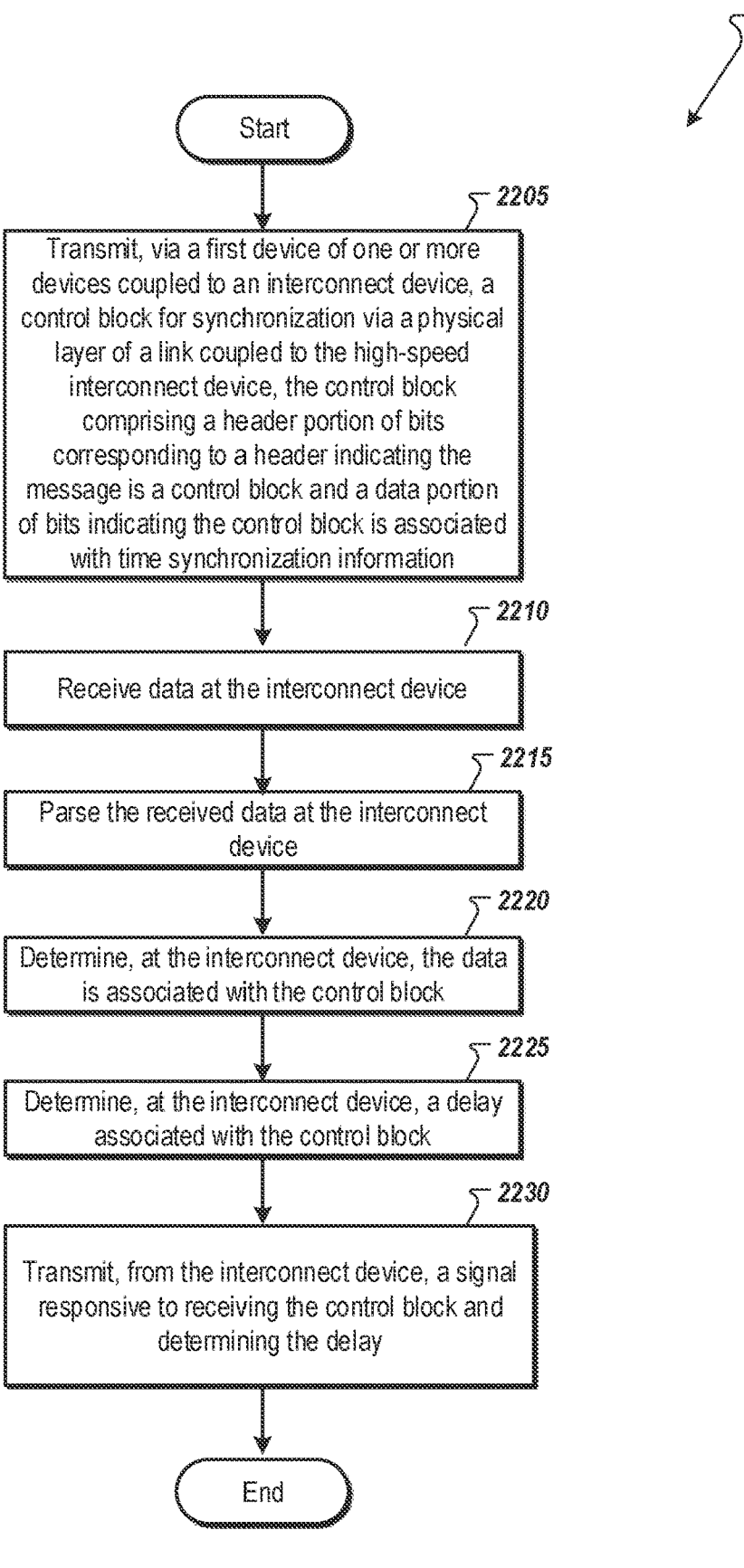
FIG. 22 illustrates an example method for synchronization via a physical layer, in accordance with at least some embodiments.

FIG. 22 illustrates a flow diagram of a method 2200 for synchronization via the physical layer. The method 2200 can be performed by processing logic comprising hardware, software, firmware, or any combination thereof. In at least one embodiment, the method 2200 is performed by a device 110 or device 112 of FIG. 1, an interconnect device 505 or network device 520 as described with reference to FIG. 5, or by interconnect device 1415 and network devices 1440 as described with reference to FIG. 14. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

At operation 2205, processing logic can transmit, via a first device of one or more devices coupled to a interconnect device, a control block for synchronization via a physical layer of a link coupled to the interconnect device, the control block comprising a header portion of bits corresponding to a header indicating the message is a control block and a data portion of bits indicating the control block is associated with time synchronization information—e.g., the processing logic can transmit a message having a header '10' indicating the message is a control block and a type indicating the message includes time synchronization information. In at least one embodiment, the control block includes a third portion of bits indicating a time the respective control block is transmitted—e.g., transmit a time the pseudo-PPS signal was transmitted before the round second passes. In at least one embodiment, the interconnect device is a network switch, or a network interface controller (NIC), or a central processing unit (CPU), or any other device with two or more ports. In one embodiment, the time synchronization information includes a pseudo pulse per second (pseudo-PPS) signal or a time of day (TOD).

At operation 2210, processing logic can receive data at the network device.

At operation 2215, the processing logic can parse the received data at the interconnect device.

At operation 2220, the processing logic can determine, at the interconnect device, that the data is associated with the control block. For example, the processing logic can determine the data includes a header '10' and a type that indicates the message is a pseudo-PPS signal.

At operation 2225, the processing logic can determine, at the interconnect device, a delay associated with the physical layer transmitting the control block. For example, the processing logic can determine a third portion of data indicating the physical delay as described with reference to FIG. 14. In at least one embodiment, the processing logic can determine an actual wraparound (e.g., when to transmit the PPS signal) as described with reference to FIG. 14—e.g., the processing logic can receive a time the pseudo-PPS signal was sent before a round second passes or wraps around and determine how long to wait to transmit the real PPS signal. In at least one embodiment, the processing logic is to determine a difference between the time and the delay (e.g., between the wrap-around time and the physical delay). In some embodiments, the processing logic is to determine a second time to transmit the PPS signal responsive to determining the difference between the time and the delay, where the interconnect device is to transmit the PPS signal at the second time—e.g., the interconnect device can wait for the determined difference before transmitting the PPS signal.

At operation 2230, the processing logic can transmit, from the interconnect device, a pulse per second (PPS) signal responsive to receiving the control block and determining the delay.

In at least one embodiment, the system includes a testing device coupled to the interconnect device and a signal generator (e.g., GNSS or GPS). In some embodiments, the processing logic can, at the testing device, receive the PPS signal from the interconnect device. In at least one embodiment, the processing logic is to, at the testing device, receive a second PPS signal from the signal generator and compare the PPS signal with the second PPS signal. In at least one embodiment, the processing logic is to, from the testing device, transmit the comparison of the PPS signal and the second PPS signal to the interconnect device. In at least one embodiment, the processing logic can determine, at the interconnect device, that the PPS signal is different from the second PPS signal. In such embodiments, the processing logic can transmit a second control block comprising the first portion of bits and a time portion of bits indicating initiation of a synchronization operation at the first device—e.g., the processing logic can initiate an operation to resynchronize the device.

In at least one embodiment, the processing logic can perform an operation as described with reference to FIG. 15. For example, the processing logic can receive, at the interconnect device from the signal generator, a third PPS signal. In at least one embodiment, the processing logic can update the third PPS signal responsive to determining the delay associated with the physical layer—e.g., the processing logic can determine a delay associated with transmitting a signal from the interconnect device to the device and a time to process the third PPS signal as described with reference to FIG. 15. In at least one embodiment, the processing logic can generate and transmit a second control block comprising the first portion of bits and a type portion of bits to initiate a synchronization operation at the first device—e.g., the processing logic can transmit the pseudo-PPS signal to synchronize the device with the PPS signal from the GNNS receiver. In at least one embodiment, the second control block includes a fifth portion of bits indicating the delay and the second PPS signal. In such embodiments, the processing logic is to, at the first device, receive the second control block (e.g., receive data and determine the data is a second control block based on a header '10'). In at least one embodiment, the processing logic can adjust a clock of the first device responsive to receiving the delay and the second PPS signal.

In at least one embodiment, the processing logic can transmit, to a second device of the one or more devices, a second control block comprising the first portion of bits and a third portion of bits indicating the delay and a time received from the first device. For example, the processing logic can synchronize a first remote device coupled to the interconnect device to a second remote device coupled to the interconnect device as described with reference to FIG. 17. In at least one embodiment, the processing logic is to receive data at the second device. In at least one embodiment, the processing logic can determine the data is the second control block in response to receiving the data—e.g., the processing logic can determine the data includes a header '10' indicating the data is a control block. In at least one embodiment, the processing logic can synchronize a clock of the second device to the first device in response to receiving the delay and the time.

In at least one embodiment, the processing logic can at the interconnect device, receive, from each device of the one or more devices, a set of second data, each data comprising a second control block, wherein the second control blocks comprise the first portion, the second portion, and a third portion indicating a time each respective second control block is transmitted—e.g., the processing logic can determine each device is transmitting a pseudo-PPS signal based on a header '10' and a type indicating the message is a pseudo-PPS signal. In at least one embodiment, the processing logic is to determine an average time from the respective time indicated in each second control block responsive to receiving the set of second data—e.g., the processing logic is to create a timing synchronization from the incoming pseudo-PPS signals as described with reference to FIG. 8.

In some embodiments, the processing logic can transmit, to each device of the one or more devices, a second set of third control blocks, each third control block comprising the header portion of bits and a time portion of bits indicating the average time and to initiate a synchronization operation. For example, the processing logic can receive time synchronization information from a device of the one or more devices coupled to the interconnect device and use it to synchronize the remaining devices as described with reference to FIG. 16.

In at least one embodiment, the processing logic can transmit, to the first device of the one or more devices, a second control block comprising the first portion of bits and a third portion of bits associated with a synchronization operation. In at least one embodiment, the processing logic can transmit, to a second device of the one or more devices, a packet associated with the synchronization operation, wherein the second control block has a first format, and the packet has a second format different from the first format. For example, the processing logic can communicate with the one or more devices coupled to the interconnect device either via the physical layer signaling (e.g., control blocks) or via a second format or protocol (e.g., via a precision time protocol (PTP)).

Figure 23:
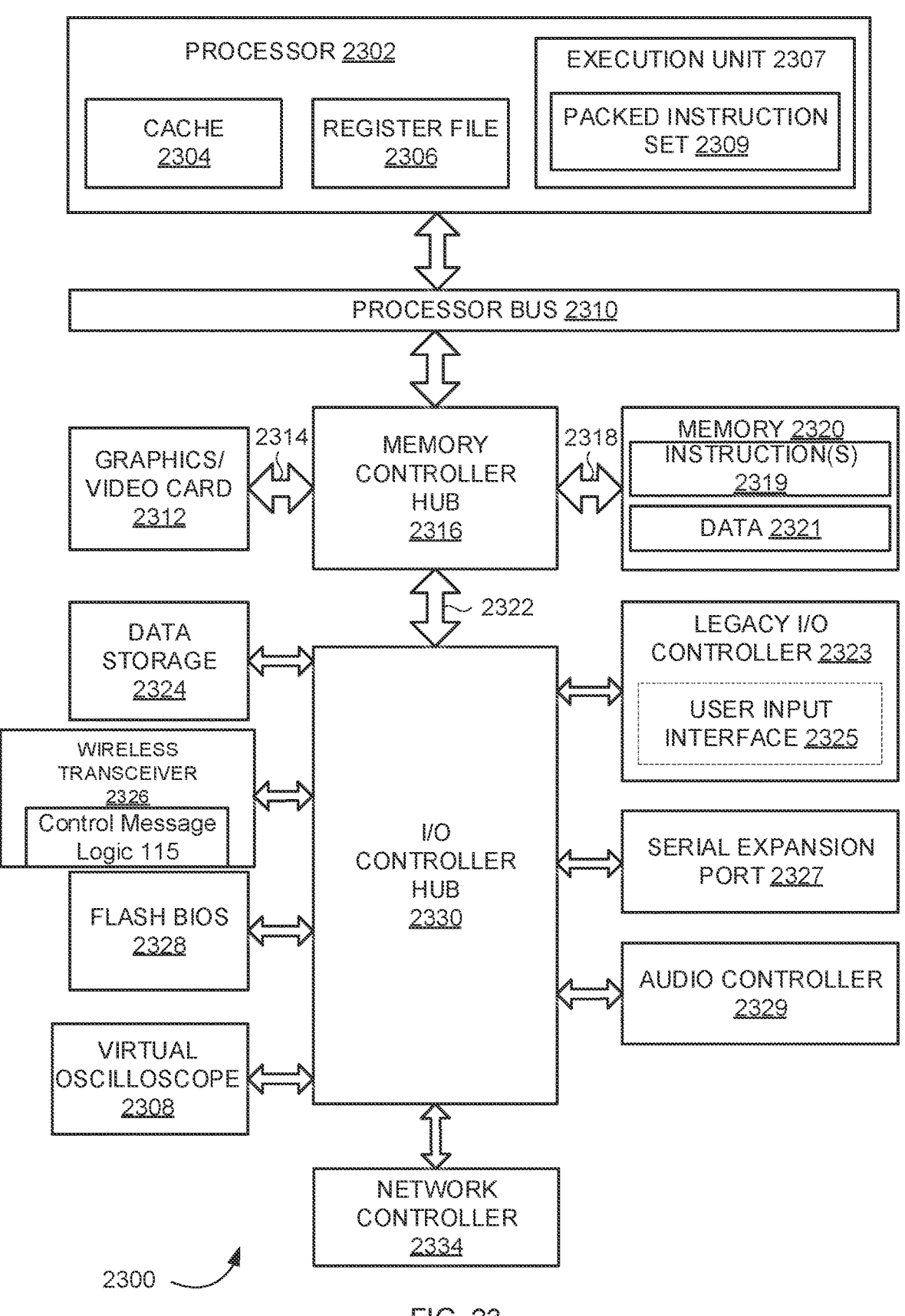
FIG. 23 illustrates an example computer system, in accordance with at least some embodiments.

FIG. 23 illustrates a computer system 2300 in accordance with at least one embodiment. In at least one embodiment, computer system 2300 may be a system with interconnected devices and components, an SOC, or some combination thereof. In at least one embodiment, computer system 2300 is formed with a processor 2302 that may include execution units to execute an instruction. In at least one embodiment, computer system 2300 may include, without limitation, a component, such as processor 2302, to employ execution units including logic to perform algorithms for processing data. In at least one embodiment, computer system 2300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes, and the like) may also be used. In at least one embodiment, computer system 2300 may execute a version of the WINDOWS®' operating system available from Microsoft Corporation of Redmond, Wash., although other operating systems (UNIX and Linux for example), embedded software, and/or graphical user interfaces, may also be used.

In at least one embodiment, computer system 2300 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 2300 may be used in devices such as graphics processing units (GPUs), network adapters, central processing units and network devices such as switches (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 2300 may include, without limitation, processor 2302 that may include, without limitation, one or more execution units 2307 that may be configured to execute a Compute Unified Device Architecture ("CUDA") program (CUDA® is developed by NVIDIA Corporation of Santa Clara, CA). In at least one embodiment, a CUDA program is at least a portion of a software application written in a CUDA programming language. In at least one embodiment, computer system 2300 is a single processor desktop or server system. In at least one embodiment, computer system 2300 may be a multiprocessor system. In at least one embodiment, processor 2302 may include, without limitation, a CISC microprocessor, a RISC microprocessor, a VLIW microprocessor, a processor implementing a combination of instruction sets, or any other processor device, such as a digital signal processor, for example. In at least one embodiment, processor 2302 may be coupled to a processor bus 2310 that may transmit data signals between processor 2302 and other components in computer system 2300.

In at least one embodiment, processor 2302 may include, without limitation, a Level 1 ("L1") internal cache memory ("cache") 2304. In at least one embodiment, processor 2302 may have a single internal cache or multiple levels of internal cache. In at least one embodiment, cache memory may reside external to processor 2302. In at least one embodiment, processor 2302 may also include a combination of both internal and external caches. In at least one embodiment, a register file 2306 may store different types of data in various registers including, without limitation, integer registers, floating point registers, status registers, and an instruction pointer register.

In at least one embodiment, execution unit 2307, including, without limitation, logic to perform integer and floating point operations, also resides in processor 2302. Processor 2302 may also include a microcode ("ucode") read only memory ("ROM") that stores microcode for certain macro instructions. In at least one embodiment, an execution unit of processor 2302 may include logic to handle a packed instruction set 2309. In at least one embodiment, by including packed instruction set 2309 in an instruction set of a general-purpose processor 2302, along with associated circuitry to execute instructions, operations used by many multimedia applications may be performed using packed data in a general-purpose processor 2302. In at least one embodiment, many multimedia applications may be accelerated and executed more efficiently by using the full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 2300 may include, without limitation, a memory 2320. In at least one embodiment, memory 2320 may be implemented as a DRAM device, an SRAM device, flash memory device, or other memory device. Memory 2320 may store instruction(s) 2319 and/or data 2321 represented by data signals that may be executed by processor 2302.

In at least one embodiment, a system logic chip may be coupled to processor bus 2310 and memory 2320. In at least one embodiment, the system logic chip may include, without limitation, a memory controller hub ("MCH") 2316, and processor 2302 may communicate with MCH 2316 via processor bus 2310. In at least one embodiment, MCH 2316 may provide a high bandwidth memory path 2318 to memory 2320 for instruction and data storage and for storage of graphics commands, data and textures. In at least one embodiment, MCH 2316 may direct data signals between processor 2302, memory 2320, and other components in computer system 2300 and to bridge data signals between processor bus 2310, memory 2320, and a system I/O 2322. In at least one embodiment, a system logic chip may provide a graphics port for coupling to a graphics controller. In at least one embodiment, MCH 2316 may be coupled to memory 2320 through high bandwidth memory path 2318, and graphics/video card 2312 may be coupled to MCH 2316 through an Accelerated Graphics Port ("AGP") interconnect 2314.

In at least one embodiment, computer system 2300 may use system I/O 2322 that is a proprietary hub interface bus to couple MCH 2316 to I/O controller hub ("ICH") 2330. In at least one embodiment, ICH 2330 may provide direct connections to some I/O devices via a local I/O bus. In at least one embodiment, a local I/O bus may include, without limitation, a high-speed I/O bus for connecting peripherals to memory 2320, a chipset, and processor 2302. Examples may include, without limitation, an audio controller 2329, a firmware hub ("flash BIOS") 2328, a transceiver 2326, a data storage 2324, a legacy I/O controller 2323 containing a user input interface 2325 and a keyboard interface, a serial expansion port 2327, such as a USB, and a network controller 2334. Data storage 2324 may comprise a hard disk drive, a floppy disk drive, a CD-ROM device, a flash memory device, or other mass storage device. In an embodiment, the transceiver 2326 includes a constrained FFE 2308.

In at least one embodiment, FIG. 23 illustrates a system, which includes interconnected hardware devices or "chips" in a transceiver 2326 (e.g., the transceiver 2326 includes a chip-to-chip interconnect including the first device 110 and second device 112 as described with reference to FIG. 1). In at least one embodiment, FIG. 23 may illustrate an exemplary SoC. In at least one embodiment, devices illustrated in FIG. 23 may be interconnected with proprietary interconnects, standardized interconnects (e.g., PCIe), or some combination thereof and utilize a GRS link. In at least one embodiment, one or more components of system 2300 are interconnected using compute express link ("CXL") interconnects. In an embodiment, the transceiver 2326 can include control block logic 115 as described with reference to FIG. 1. In such embodiments, control block logic can transmit control blocks via a physical layer of the computer system 2300, where the control blocks include time and frequency information for synchronization operations as described with reference to FIGS. 2-23.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. In at least one embodiment, a set of non-transitory computer-readable storage media comprises multiple non-transitory computer-readable storage media, and one or more of the individual non-transitory storage media of the multiple non-transitory computer-readable storage media lack all of the code while the multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of the present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from a providing entity to an acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an inter-process communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in the appended claims is not necessarily limited to the specific features or acts described. Rather, specific features and acts are disclosed as exemplary forms of implementing the claims.

What is claimed is:

1. A system comprising:
   a device coupled to a link and comprising a transmitter, the device to:
   generate a control block for synchronization via a physical layer of the link, the control block comprising (i) a header portion of bits corresponding to a header indicating a control block type and (ii) a data portion of bits comprising synchronization information for synchronizing via the physical layer;
   interleave the control block between two of a plurality of data blocks of a data packet; and
   transmit, via the link, the data packet and the control block.

2. The system of claim 1, wherein each data block of the plurality of data blocks comprises a second set of bits corresponding to a second header indicating a data block type.

3. The system of claim 1, wherein the link is at least one of a peripheral component interconnect express (PCIe) link, Ethernet link, universal serial bus (USB) link, universal flash storage (UFS) link, an InfiniBand (IB) link, an NVLink, a display port, or a high-definition multimedia interface (HDMI).

4. The system of claim 1, wherein the control block further comprises a type portion of bits indicating a type of control information.

5. The system of claim 4, wherein either the data portion of bits or the type portion of bits indicates at least one of a time, phase, or frequency of a clock of the device.

6. The system of claim 4, wherein the type portion of bits indicates a time of day or an indication of an amount of time elapsed.

7. The system of claim 4, wherein:
   the type portion of bits indicates to perform a round trip time (RTT) measurement; and
   the data portion of bits indicates a first delay.

8. The system of claim 7, wherein the device is further to:
   receive second data via the link;
   determine that the second data is a second control block comprising a time portion of bits indicating a first time and a second time associated with processing the control block before transmitting the second data; and
   determine the RTT measurement based at least in part on the first time and the second time.

9. The system of claim 8, wherein the device is further to:
   adjust a clock associated with the device responsive to determining the RTT measurement.

10. The system of claim 4, wherein the type portion of bits indicates the control block is a pseudo pulse per second (pseudo-PPS) signal.

11. The system of claim 10, wherein the type portion of bits further indicates inaccuracies associated with transmitting the pseudo-PPS signal.

12. The system of claim 10, wherein the device is further to:

transmit one or more second control blocks one or more times per second.

13. The system of claim 10, wherein the data portion of bits indicates a time of day (TOD).

14. The system of claim 10, wherein the data portion of bits indicates a delay offset associated with transmission of the pseudo-PPS signal.

15. The system of claim 14, wherein the data portion of bits further comprises round trip time (RTT) measurement, a second delay offset, or an error range associated with the pseudo-PPS signal.

16. The system of claim 15, wherein the device is to:

receive third data comprising the header portion of bits, the data portion of bits; and determine a quality of synchronization of the device responsive to receiving the third data.

17. The system of claim 16, wherein the device comprises one or more links and is coupled to one or more additional devices, the device further to:

receive, from each device of the one or more additional devices, fourth data comprising the header portion of bits, the type portion of bits, and a second data portion of bits indicating a third TOD or pseudo-PPS signal and a third delay offset of each respective one or more additional devices; and determine a quality of synchronization of each device of the one or more additional devices responsive to receiving the fourth data.

18. The system of claim 17, wherein the device is further to:

determine delay information associated with each device of the one or more additional devices;

determine that the delay information associated with each device of the one or more additional devices is substantially similar; and adjust a first clock responsive to determining that each delay associated with each device is substantially similar.

19. The system of claim 18, wherein to adjust the first clock, the device is to:

determine a time substantially synchronous with the one or more additional devices; and adjust the first clock to the time.

20. The system of claim 18, wherein the device is further to:

transmit an indication to an application layer that the first clock is unsynchronized responsive to determining that each delay associated with each device is substantially similar.

21. The system of claim 20, wherein the device is to:

transmit one or more timestamps to the application layer, wherein the application layer is to determine whether the device is synchronized or unsynchronized.

22. The system of claim 21, wherein the device is to:

transmit a second indication that one or more of the additional devices is unsynchronized.

23. A system comprising:

a device coupled with a link and comprising a receiver and a physical layer, the device to:

receive data via the link;

parse the data into a plurality of blocks comprising a plurality of data blocks and a control block interleaved between two of the plurality of data blocks;

determine that one of the plurality of blocks is the control block, the control block comprising (i) a header portion of bits corresponding to a header indicating a control block type and (ii) a data portion of bits comprising synchronization information for synchronizing via the physical layer; and perform a synchronization operation related to synchronization of a first clock of the device or a second clock of a second device coupled to the link using the synchronization information.

24. The system of claim 23, wherein the control block further comprises a type portion of bits indicating a type of control information.

25. The system of claim 24, wherein the device is further to:

determine a control type associated with the control block responsive to receiving the type portion of bits, wherein the device is to perform the synchronization operation responsive to determining the control type.

26. The system of claim 23, wherein perform the synchronization operation, the second device is further to:

determine a second time associated with receiving the control block;

determine a third time to process the control block; and transmit a second message comprising the header portion of bits indicating the second message is a second control block and comprising a time portion of bits indicating the second time, third time, and a fourth time associated with transmitting the second control block.

27. The system of claim 23, wherein the device is to synchronize the first clock or the second clock of the second device responsive to receiving data corresponding to one or more additional control blocks, wherein the additional one or more control blocks are received one or more times per second.

28. The system of claim 23, wherein the device is to:

transmit, via the link, a third control block comprising the header portion of bits and a type portion of bits indicating the control block is a pseudo pulse per second (PPS) signal.

29. The system of claim 23, wherein the device is to transmit a second control block comprising the header portion of bits to a second device.

30. The system of claim 23, wherein the data portion of bits indicates a time of day (TOD) and a delay offset, and wherein the device is to:

transmit a second control block comprising a time portion of bits indicating a second TOD and a second delay offset.

31. The system of claim 23, wherein the device is to:

record a timestamp associated with receiving the data;

record a plurality of timestamps associated with receiving a plurality of data, each data comprising the header portion of bits and a type portion of bits indicating the data corresponds to a control block that is a pseudo pulse per second (pseudo-PPS) signal;

transmit the plurality of timestamps to an application layer; and synchronize the second clock in response to transmitting the plurality of timestamps to the application layer.

32. The system of claim 31, wherein the device comprises a first component, the first component to:

receive a pulse per second (PPS) signal from a global navigation satellite system;

receive the plurality of timestamps; and adjust the first clock responsive to receiving the PPS signal and the plurality of timestamps.

33. The system of claim 32, wherein to adjust the first clock, the device is to:

reduce a frequency of the first clock.

34. The system of claim 32, wherein to adjust the first clock, the device is to:

adjust a time of the first clock.

35. The system of claim 23, wherein to determine that one of the plurality of blocks is the control block type, the device is further to:

determine that a first bit of the data has a first value indicating the data includes at least one control block; and determine a second value for a second portion of bits, the second portion of bits indicating which of the plurality of blocks of the data are control blocks.

36. The system of claim 23, wherein the device is further to:

adjust a clock responsive to receiving the control block.

37. A method comprising:

generating, at a device coupled to a link and comprising a transmitter, a control block for synchronization via a physical layer of the link, the control block comprising (i) a header portion of bits corresponding to a header indicating a control block type and (ii) a data portion of bits comprising synchronization information for synchronizing via the physical layer;

interleaving the control block between two of a plurality of data blocks of a data packet; and transmitting, via the link, the data packet and the control block.

38. A method comprising:

receiving, at a device coupled to a link and comprising a receiver and a physical layer, data via the link;

parsing the data into a plurality of blocks comprising a plurality of data blocks and a control block interleaved between two of the plurality of data blocks;

determining that one of the plurality of blocks is the control block, the control block comprising (i) a header portion of bits corresponding to a header indicating a control block type and (ii) a data portion of bits comprising synchronization information for synchronizing via the physical layer; and performing a synchronization operation related to synchronization of a first clock of the device or a second clock of a second device coupled to the link using the synchronization information.

* * * * *